(12) United States Patent
Mortensen et al.

(10) Patent No.: US 11,853,239 B2
(45) Date of Patent: Dec. 26, 2023

(54) HARDWARE ACCELERATOR CIRCUITS FOR NEAR STORAGE COMPUTE SYSTEMS

(71) Applicant: WESTERN DIGITAL TECHNOLOGIES, INC., San Jose, CA (US)

(72) Inventors: Mikael Mortensen, Milpitas, CA (US); Grant Mackey, Laguna Hills, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/717,533

(22) Filed: Apr. 11, 2022

(65) Prior Publication Data

US 2023/0325328 A1    Oct. 12, 2023

(51) Int. Cl.
  *G06F 16/24*    (2019.01)
  *G06F 13/16*    (2006.01)

(52) U.S. Cl.
  CPC ...... *G06F 13/1673* (2013.01); *G06F 13/1689* (2013.01)

(58) Field of Classification Search
  CPC .................................................. G06F 13/1673
  USPC ........................................................ 710/105
  See application file for complete search history.

(56) References Cited

U.S. PATENT DOCUMENTS

| | | | |
|---|---|---|---|
| 6,272,497 B1 * | 8/2001 | Mendenhall | G06T 5/20 707/999.102 |
| 7,433,877 B2 | 10/2008 | Chen et al. | |
| 8,051,085 B1 | 11/2011 | Srinivasan et al. | |
| 8,819,045 B2 | 8/2014 | Dhulipala et al. | |
| 2003/0112904 A1 * | 6/2003 | Fuller | H04B 1/7093 375/E1.018 |
| 2003/0194012 A1 | 10/2003 | Sakai et al. | |
| 2004/0044791 A1 | 3/2004 | Pouzzner | |
| 2006/0112157 A1 * | 5/2006 | Song | H03H 17/06 708/300 |
| 2007/0050515 A1 * | 3/2007 | Fallon | G06F 16/2365 709/231 |

(Continued)

OTHER PUBLICATIONS

Palkar et al., "Filter Before Your Parse: Faster Analytics on Raw Data with Sparser", Proceedings of the VLDB Endowment, vol. 11, No. 11, Aug. 2018.

(Continued)

*Primary Examiner* — Titus Wong
(74) *Attorney, Agent, or Firm* — Vierra Magen Marcus LLP

(57) ABSTRACT

An apparatus is provided that includes a memory system that includes a memory controller coupled to a storage device capable of streaming data at a first data rate. The memory controller is configured to read a first amount of input data from the storage device at an input data rate equals the first data rate, and provide the first amount of input data at the input data rate to a hardware circuit. The hardware circuit is configured to filter the first amount of input data to provide a second amount of output data at an output data rate, the second amount of output data less than the first amount of input data, the output data rate less than the input data rate. The hardware circuit filters the first amount of input data without repeatedly moving data back and forth between the storage device, a memory buffer, and the hardware circuit.

19 Claims, 19 Drawing Sheets

(56) References Cited

U.S. PATENT DOCUMENTS

| | | | |
|---|---|---|---|
| 2008/0043111 A1* | 2/2008 | Anderson | H04L 67/565 |
| | | | 348/211.3 |
| 2009/0141566 A1* | 6/2009 | Arsovski | G11C 7/1006 |
| | | | 365/189.15 |
| 2009/0210412 A1 | 8/2009 | Oliver et al. | |
| 2010/0088315 A1* | 4/2010 | Netz | G06F 16/24561 |
| | | | 707/E17.014 |
| 2010/0287137 A1* | 11/2010 | Lyakhovitskiy | G06F 16/10 |
| | | | 707/805 |
| 2011/0040771 A1* | 2/2011 | Gilyadov | G06F 13/385 |
| | | | 707/754 |
| 2013/0166554 A1* | 6/2013 | Yoon | G06F 40/177 |
| | | | 707/737 |
| 2013/0346428 A1* | 12/2013 | Viehland | G06F 16/245 |
| | | | 707/756 |
| 2014/0052743 A1* | 2/2014 | Schauer | G06F 16/2455 |
| | | | 707/754 |
| 2015/0006857 A1 | 1/2015 | Kuo | |
| 2015/0109153 A1 | 4/2015 | Wu et al. | |
| 2015/0169655 A1* | 6/2015 | Gupta | G06F 16/254 |
| | | | 707/602 |
| 2016/0055208 A1* | 2/2016 | Beavin | G06F 16/24544 |
| | | | 707/716 |
| 2016/0350385 A1* | 12/2016 | Poder | G06F 16/2455 |
| 2017/0185647 A1* | 6/2017 | Billington | G06F 16/9535 |

OTHER PUBLICATIONS

Gagolewski, "stringi: Fast and Portable Character String Processing in R", Sep. 17, 2020, https://stringi.gagolewski.com.

Shin et al., "Regular Expression Filtering on Multiple q-Grams", IEICE Transf. Inf. & Syst., vol. E101-D, No. 1, Jan. 2018.

U.S. Appl. No. 17/486,310, filed Sep. 27, 2021.

Office Action dated Jan. 18, 2023 in U.S. Appl. No. 17/486,310.

Response to Office Action dated Apr. 16, 2023 in U.S. Appl. No. 17/486,310.

\* cited by examiner

FIG. 4E

| $CN_l$ | start byte | byte width |
|---|---|---|
| 0 | 0 | 2 |
| 1 | 3 | 3 |
| 2 | 7 | 2 |
| 3 | 10 | 2 |
| 0 | 13 | 2 |
| 1 | 16 | 3 |
| 2 | 20 | 2 |
| 3 | 23 | 1 |
| 0 | 25 | 2 |
| 1 | 28 | 3 |
| 2 | 32 | 2 |
| 3 | 35 | 3 |
| 0 | 39 | 2 |
| 1 | 42 | 3 |
| 2 | 46 | 2 |
| 3 | 49 | 3 |
| 0 | 53 | 2 |
| 1 | 56 | 3 |
| 2 | 60 | 2 |
| 3 | 63 | 2 |
| 0 | 66 | 2 |
| 1 | 69 | 3 |
| 2 | 73 | 2 |
| 3 | 76 | 2 |

FIG. 4C

| input rows | $CN_l$ 0 | 1 | 2 | 3 | | |
|---|---|---|---|---|---|---|
| $r_0$ | P | A | P | H | 1 | 3 |
| $r_1$ | C | O | C | D | 1 | 8 |
| $r_2$ | N | Y | J | F | K | A | 1 | 0 | 4 |
| $r_3$ | C | O | D | E | N | U | A | 1 | 7 |
| $r_4$ | C | O | D | E | N | D | L | 4 | 2 |
| $r_5$ | N | Y | L | G | A | A | A | 8 | 6 |

FIG. 4D

| input rows | $CN_l$ 0 | 1 | 2 | 3 | | |
|---|---|---|---|---|---|---|
| $r_0$ | $B_0$ | $B_1$ | $B_2$ | | | |
| $r_1$ | $B_3$ | $B_4$ | $B_5$ | $B_7$ | $B_8$ | $B_{10}$ $B_{11}$ |
| $r_2$ | $B_{13}$ | $B_{14}$ | $B_{16}$ | $B_{17}$ | $B_{18}$ | $B_{21}$ $B_{22}$ $B_{23}$ |
| $r_3$ | $B_{25}$ | $B_{26}$ | $B_{28}$ | $B_{29}$ | $B_{30}$ | $B_{35}$ $B_{36}$ $B_{37}$ |
| $r_4$ | $B_{39}$ | $B_{40}$ | $B_{42}$ | $B_{43}$ | $B_{44}$ | $B_{49}$ $B_{50}$ $B_{51}$ |
| | $B_{53}$ | $B_{54}$ | $B_{56}$ | $B_{57}$ | $B_{58}$ | $B_{63}$ $B_{64}$ |
| $r_5$ | $B_{66}$ | $B_{67}$ | $B_{69}$ | $B_{70}$ | $B_{71}$ | $B_{76}$ $B_{77}$ |

FIG. 4F

| $R_{F1}$ | | $CN_{F1}$ | | | | |
|---|---|---|---|---|---|---|
| | | 0 | 1 | 1 | 2 | |
| 0 | P | A | D | L | 3 | |
| 1 | C | O | D | L | 8 | |
| 2 | N | Y | A | L | 1 | 0 | 4 |
| 3 | C | O | A | L | 1 | 1 | 7 |
| 4 | C | O | D | L | 4 | 2 | |
| 5 | N | Y | A | A | 8 | 6 | |

FIG. 4G

| $R_{F2}$ | | $CN_{F2}$ | |
|---|---|---|---|
| | | 0 | 1 |
| 0 | D | L | 8 |
| 1 | U | A | 1 | 1 | 7 |
| 2 | D | L | 4 | 2 |

FIG. 4H

| | $CN_{F3}$ |
|---|---|
| | 0 | 8 | 42 |
| $R_{F3}$ | 0 | 1 |

| $R_{F1}$ | $CN_{F1}$ | first filtered content | MNM1 | m1 | mb1 | RS1 |
|---|---|---|---|---|---|---|
| 0 | 0 | PA | 0 | [0] = 1 | [0] = 0 | 0 |
| 0 | 1 | DL | 0 | [1] = 0 | [1] = 1 | 0 |
| 0 | 2 | 13 | 0 | [2] = 0 | [2] = 1 | 0 |
| 1 | 0 | CO | 1 | [3] = 1 | [3] = 0 | 1 |
| 1 | 1 | DL | 0 | [4] = 0 | [4] = 1 | 0 |
| 1 | 2 | 8 | 0 | [5] = 0 | [5] = 1 | 0 |
| 2 | 0 | NY | 0 | [6] = 1 | [6] = 0 | 0 |
| 2 | 1 | AA | 0 | [7] = 0 | [7] = 1 | 0 |
| 2 | 2 | 104 | 0 | [8] = 0 | [8] = 1 | 0 |
| 3 | 0 | CO | 1 | [9] = 1 | [9] = 0 | 1 |
| 3 | 1 | UA | 0 | [10] = 0 | [10] = 1 | 0 |
| 3 | 2 | 117 | 0 | [11] = 0 | [11] = 1 | 0 |
| 4 | 0 | CO | 1 | [12] = 1 | [12] = 0 | 1 |
| 4 | 1 | DL | 0 | [13] = 0 | [13] = 1 | 0 |
| 4 | 2 | 42 | 0 | [14] = 0 | [14] = 1 | 0 |
| 5 | 0 | NY | 0 | [15] = 1 | [15] = 0 | 0 |
| 5 | 1 | AA | 0 | [16] = 0 | [16] = 1 | 0 |
| 5 | 2 | 86 | 0 | [17] = 0 | [17] = 1 | 0 |

FIG. 4I

| $R_{F2}$ | $CN_{F2}$ | second filtered content | MNM2 | m2 | mb2 | RS2 |
|---|---|---|---|---|---|---|
| 0 | 0 | DL | 1 | [0] = 1 | [0] = 0 | 1 |
| 0 | 1 | 8 | 0 | [1] = 0 | [1] = 1 | 0 |
| 1 | 0 | UA | 0 | [2] = 1 | [2] = 0 | 0 |
| 1 | 1 | 117 | 0 | [3] = 0 | [3] = 1 | 0 |
| 2 | 0 | DL | 1 | [4] = 1 | [4] = 0 | 1 |
| 2 | 1 | 42 | 0 | [5] = 0 | [5] = 1 | 0 |

FIG. 4J

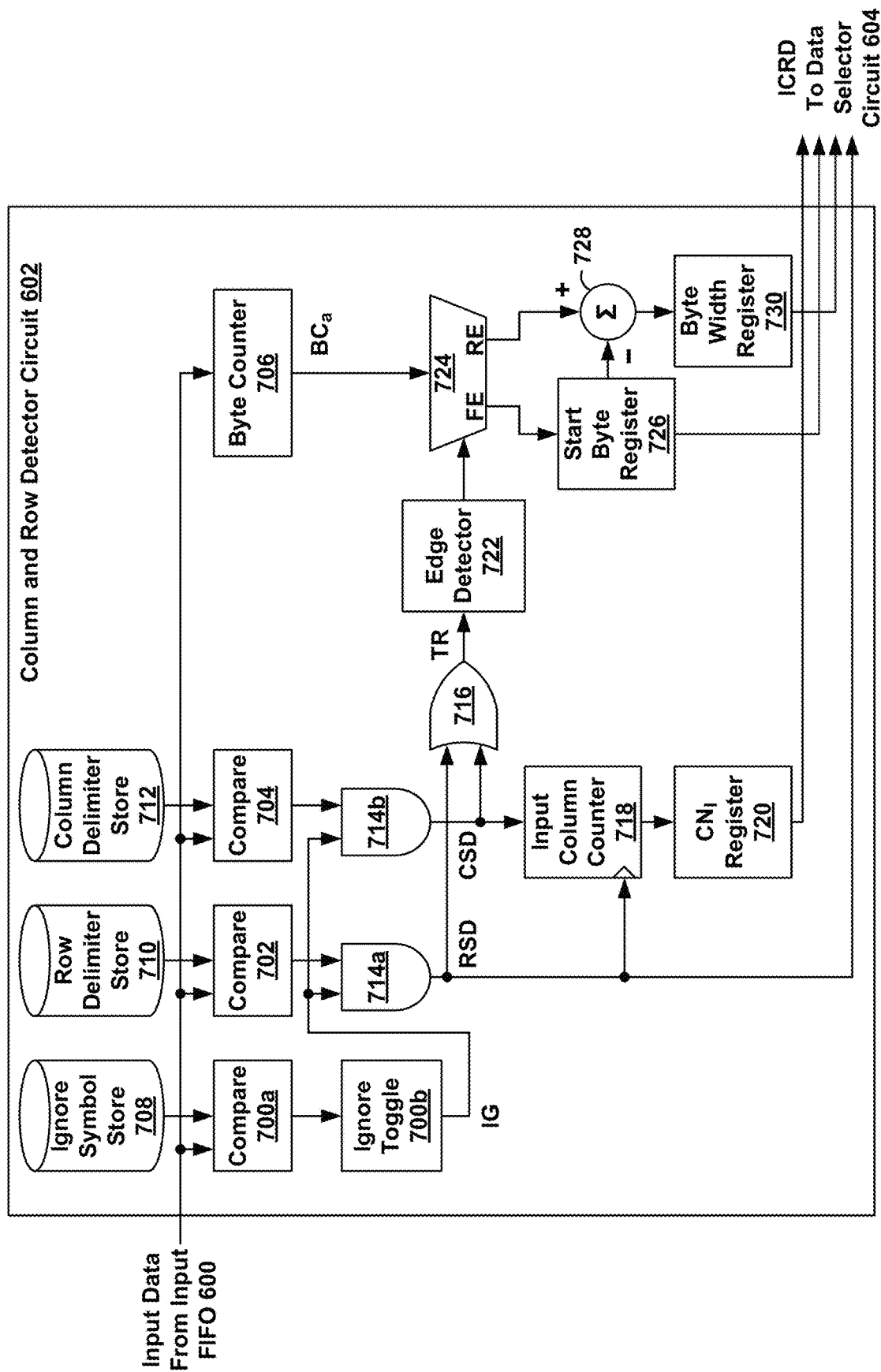
FIG. 7A1

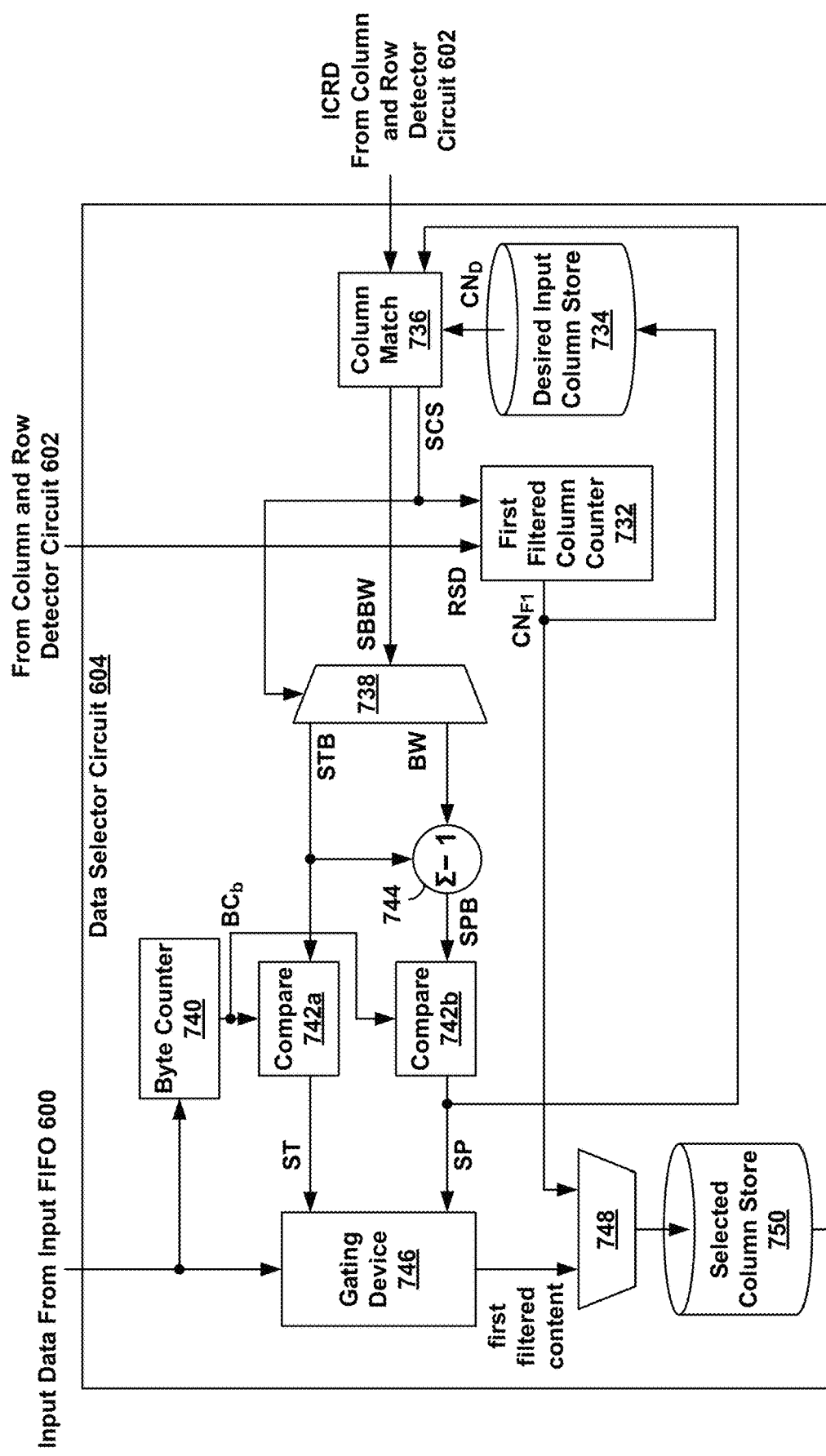
FIG. 7A2

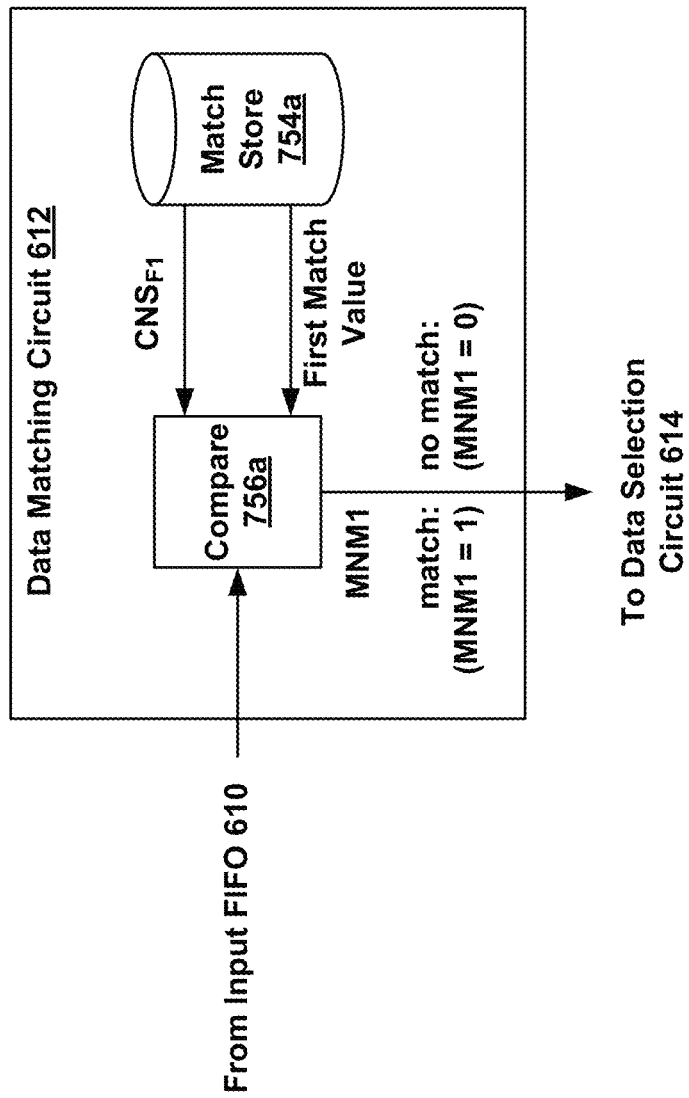
FIG. 7B1

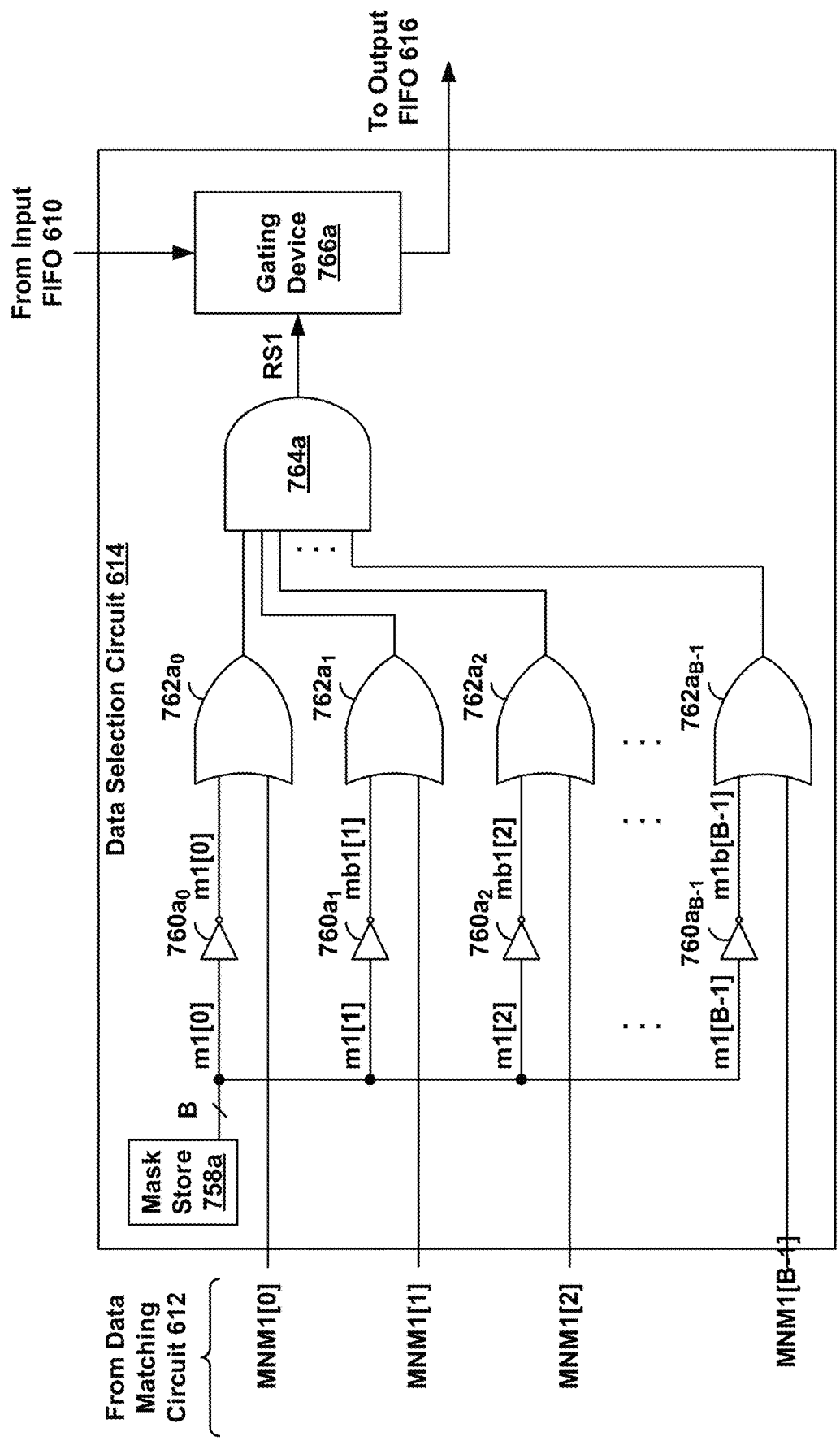
FIG. 7B2

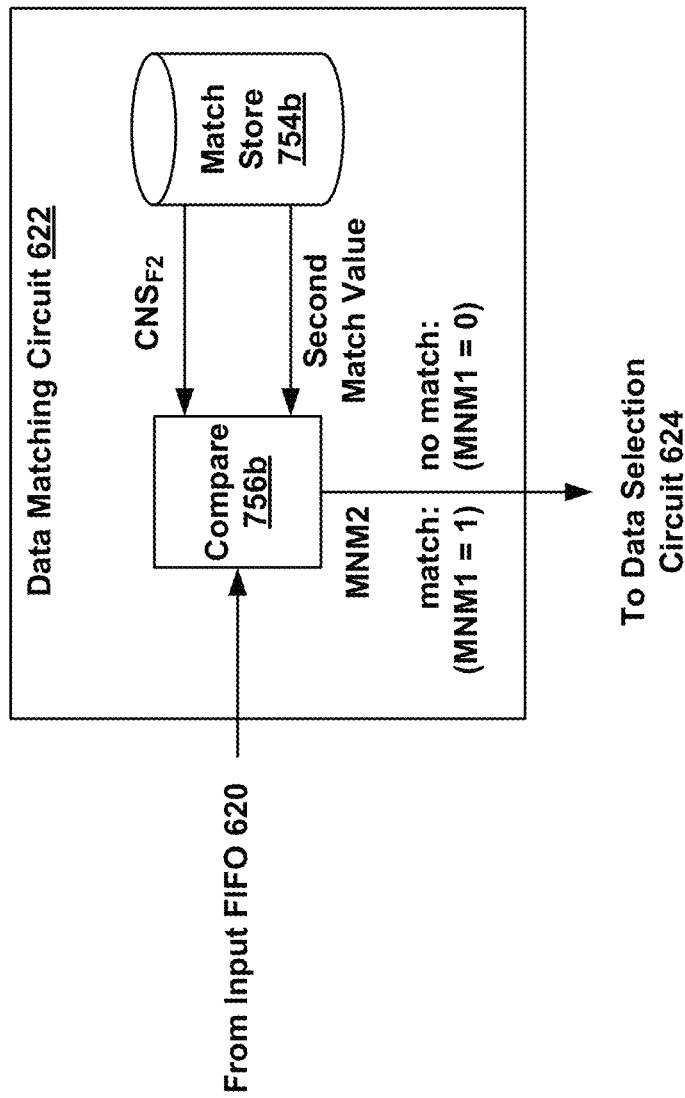
FIG. 7C1

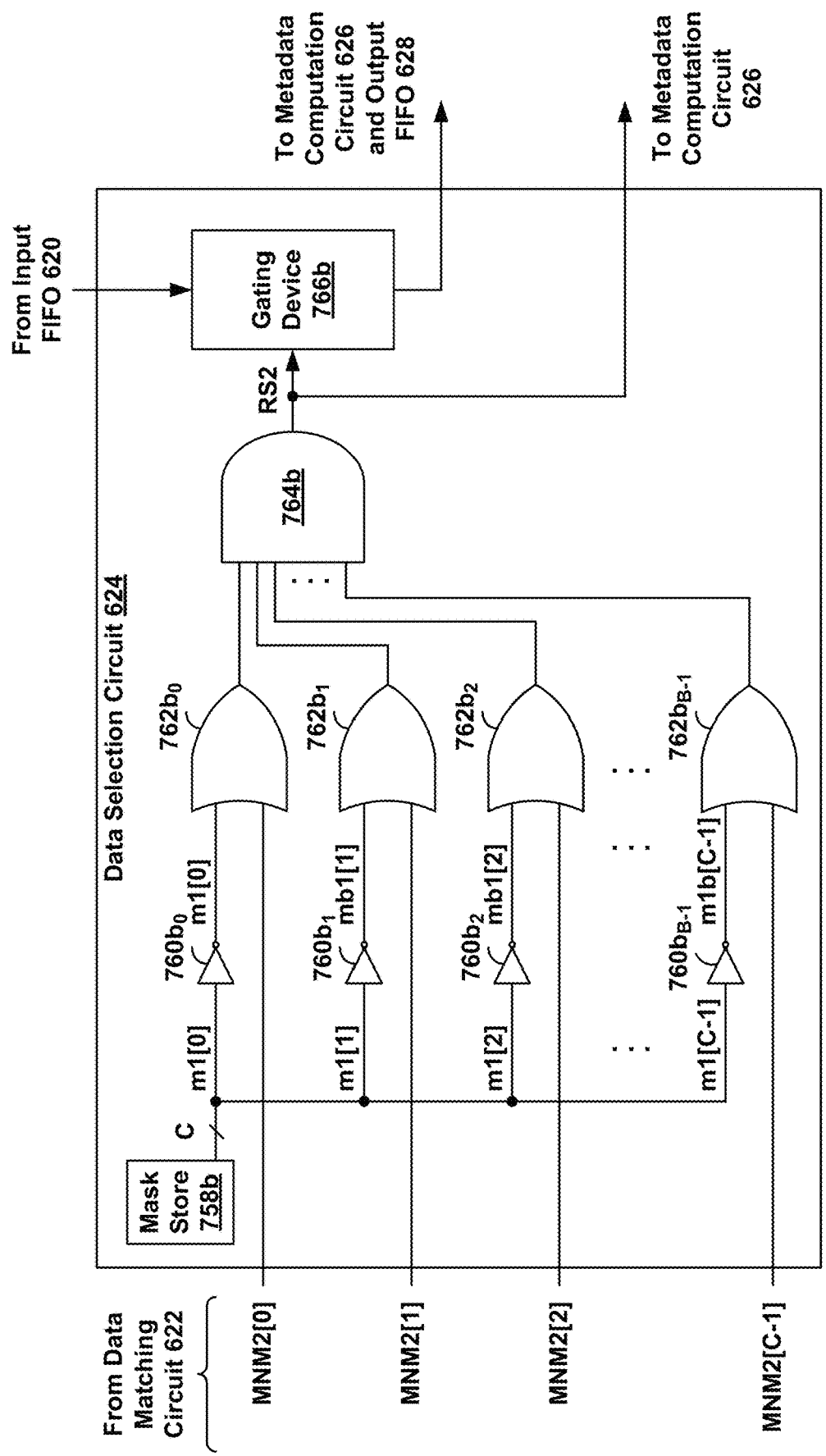
FIG. 7C2

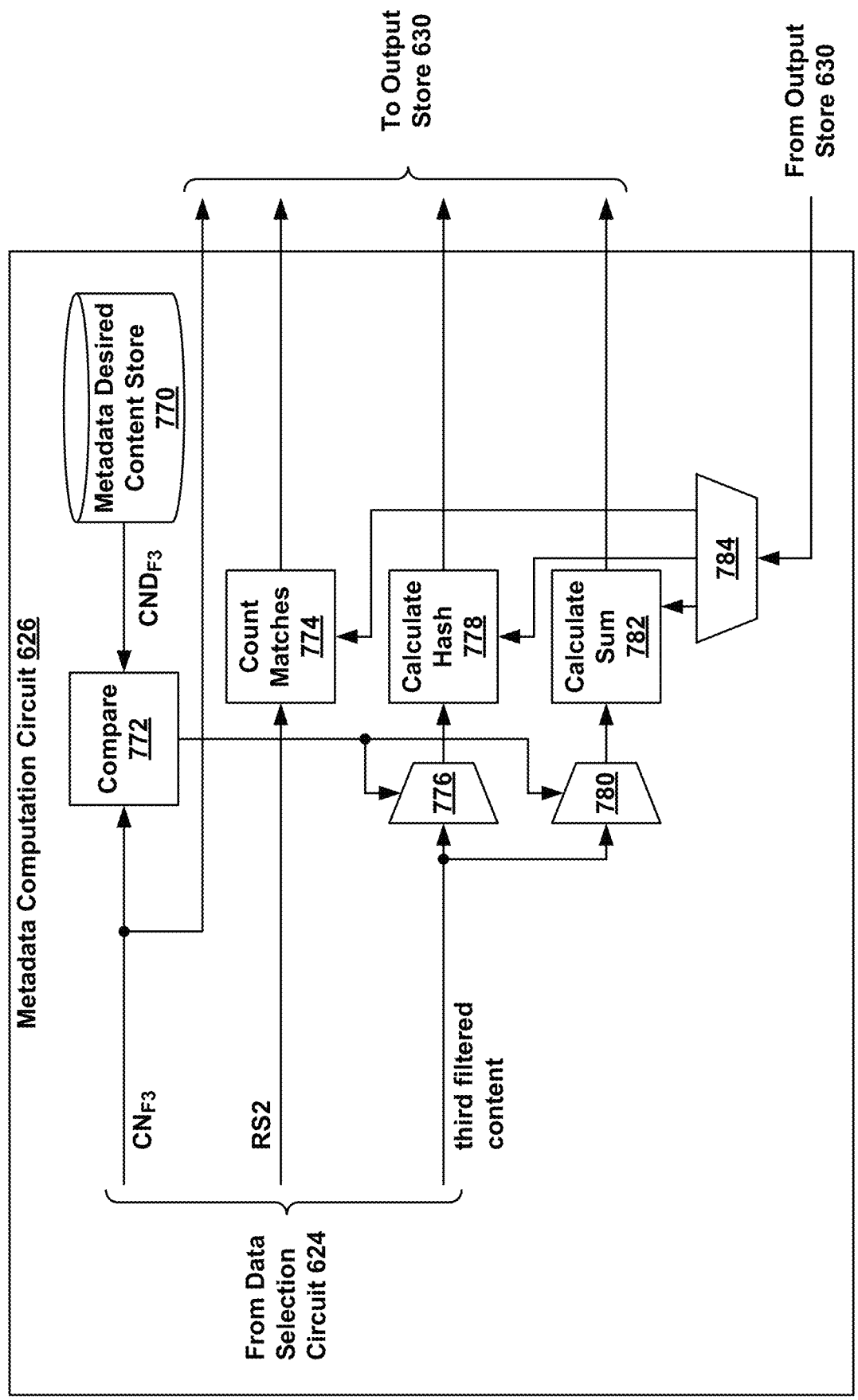
FIG. 7C3

FIG. 8

HARDWARE ACCELERATOR CIRCUITS FOR NEAR STORAGE COMPUTE SYSTEMS

BACKGROUND

A host device coupled to a memory system such as a solid state drive (SSD) may execute a software application that searches data stored on the SSD. For example, a host device may want to locate particular data or a subset of data stored on the drive. Conventionally, such searching is performed on the host device. In particular, the host device requests data (e.g., from a database file) to be searched, a memory controller in the SSD reads data from the database file from nonvolatile memory (e.g., NAND memory arrays), transfers the read data to the host device, and the host device executes various functions to determine if any data in the database file matches search criteria.

Although such search techniques achieve the desired result, transferring large quantities of data between a storage system and the host device to perform searching is costly and inefficient. In particular, moving large quantities of data between a storage system and a host device consumes a large amount of energy and is quite expensive.

In addition, the data rate at which storage media such as SSDs can stream data (referred to herein as a "drive data rate") is quite high (e.g., approaching 10 GB/second). A cloud storage system may include 32 SSDs, and thus may be capable of streaming data at a data rate of about 320 GB/second, which is much higher than the available bandwidth of even the fastest network ports. Moreover, processors in host devices have a bandwidth that is much lower than the data rate of SSD storage systems, and thus the processors cannot keep up with the incoming data, let alone perform any searching functions on the data.

One proposed solution to these problems uses "computational storage" (sometimes also referred to as "near storage compute systems") to filter the data read from the SSD to reduce the amount of data transferred to the host device for searching, and also reduce the data rate for transferring such data. In such a proposed solution, a host device issues a search request (e.g., a SQL select command) to a memory system (e.g., an SSD) to search for particular data or a subset of data stored on the drive (e.g., in a database file).

After receiving the search request, a controller in the SSD reads the desired database file from the nonvolatile memory, and buffers the retrieved data in DRAM. CPU cores in the controller retrieve the buffered data from the DRAM and perform a filtering function on the retrieved data. In theory, such a proposed solution may filter the data and reduce the amount of data that is transferred to the host for final search processing.

Although this proposed solution avoids moving all of the data from the SSD to the host, the technique requires continually moving data back and forth between the CPU cores and DRAM to perform the filtering function. In addition, the CPU cores in the controller would need to be large, expensive and require a lot of power to handle the data rate coming from the nonvolatile memory. Cost and power constraints on the SSD make this solution impractical. Alternatively, CPU cores that are smaller, less expensive and consume less power could be used in the controller, but such CPU cores would be slow, and thus a large amount of additional DRAM would be required. The same cost and power constraints on the SSD also make this solution impractical.

Thus, designing a near storage compute system that can operate at the drive data rate and reduce the amount of data that must be transferred to a host device, but also fit within limited cost and power constraints is quite difficult.

BRIEF DESCRIPTION OF THE DRAWINGS

Like-numbered elements refer to common components in the different figures.

FIG. 4C depicts a table of identified input rows and identified input columns for the example byte stream of FIG. 4B.

FIG. 4D depicts another table of identified input rows and identified input columns for the example byte stream of FIG. 4B.

FIG. 4E depicts corresponding input column number, start byte and byte width associated with each input column of the example byte stream of FIG. 4B and the example table of FIG. 4D.

FIG. 4F depicts example first filtered content and corresponding first filtered column numbers for the example byte stream of FIG. 4B.

FIG. 4G depicts example second filtered content and corresponding second filtered column numbers for the example byte stream of FIG. 4B.

FIG. 4H depicts example third filtered content for the example byte stream of FIG. 4B.

FIG. 4I depicts example first records of first filtered content and corresponding first filtered column numbers for the example byte stream of FIG. 4B.

FIG. 4J depicts example second records of second filtered content and corresponding second filtered column numbers for the example byte stream of FIG. 4B.

FIG. 7A1 is a simplified block diagram of an embodiment of the example Column and Row Detector Circuit of FIG. 6A.

FIG. 7A2 is a simplified block diagram of an embodiment of the example Data Selector Circuit of FIG. 6A.

FIG. 7B1 is a simplified block diagram of an embodiment of the example Data Matching Circuit of FIG. 6B.

FIG. 7B2 is a simplified block diagram of an embodiment of the example Data Selection Circuit of FIG. 6B.

FIG. 7C1 is a simplified block diagram of an embodiment of the example Data Matching Circuit of FIG. 6C.

FIG. 7C2 is a simplified block diagram of an embodiment of the example Data Selection Circuit of FIG. 6C.

FIG. 7C3 is a simplified block diagram of an embodiment of the example Metadata Computation Circuit of FIG. 6C.

FIG. 8 depicts another example byte stream.

DETAILED DESCRIPTION

Technology is described for near storage compute systems that include a hardware accelerator circuit that can operate at the drive data rate and reduce the amount of data that must be transferred to a host device for host device searches of data stored on a memory system such as an SSD.

In embodiments, a memory controller reads a first amount of input data from a storage device (e.g., an SSD) at an input data rate, and provides the first amount of input data at the input data rate to a hardware accelerator circuit. In embodiments, the hardware accelerator circuit is configured to filter the first amount of input data to provide a second amount of output data at an output data rate, the second amount of output data less than the first amount of input data, the output data rate less than the input data rate. In embodiments, the hardware accelerator circuit provides the output data to a host device for further search processing. In embodiments, the input data rate is the data rate at which storage media such as SSDs can stream data.

Figure 1:
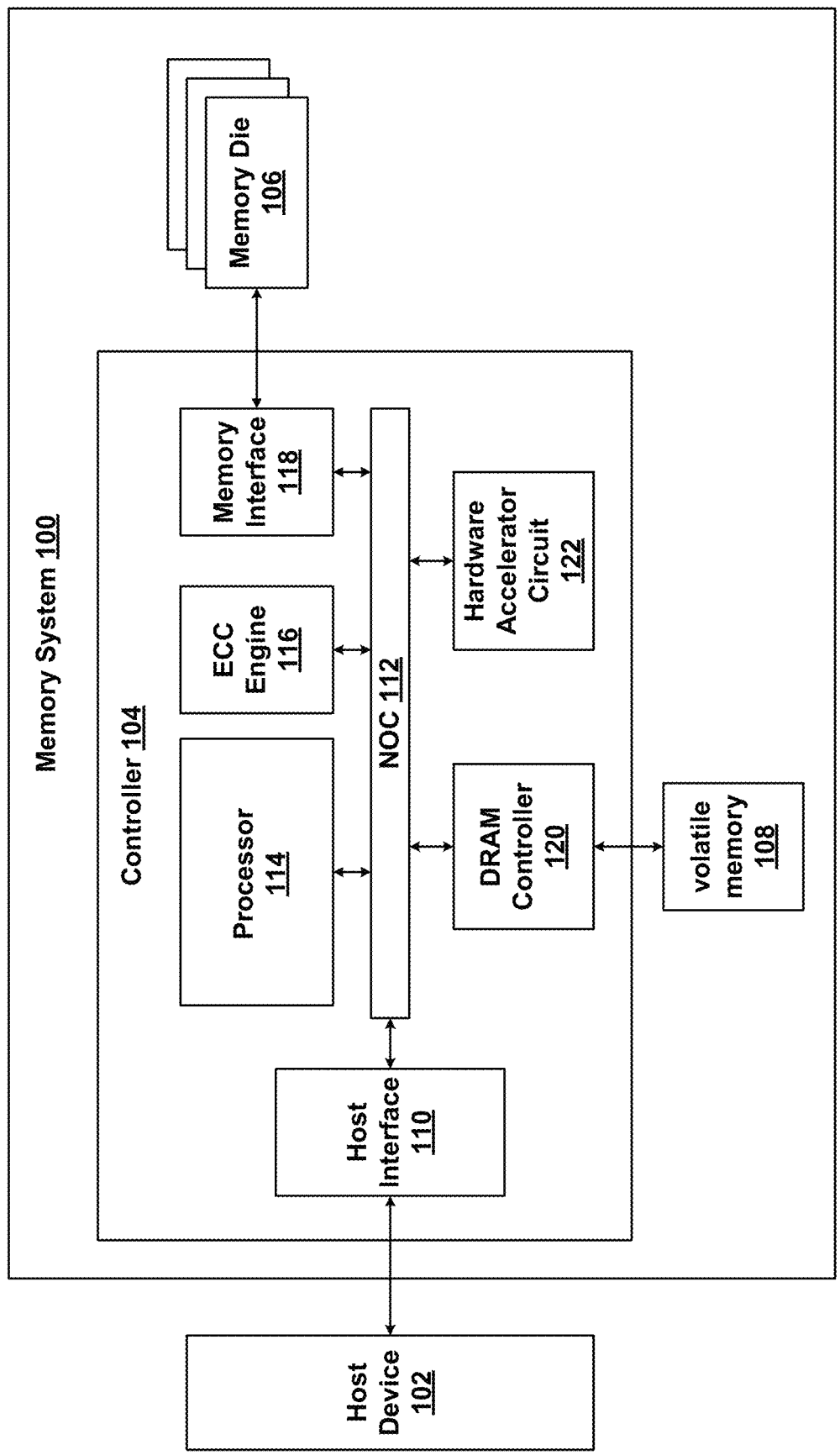
FIG. 1 is a block diagram depicting one embodiment of a memory system.

FIG. 1 is a block diagram of an embodiment of a memory system 100 that implements the described technology. In an embodiment, memory system 100 is an SSD. Memory system 100 also can be a memory card, USB drive or other type of storage system. The proposed technology is not limited to any one type of memory system. Memory system 100 is connected to host 102, which can be a computer, server, electronic device (e.g., smart phone, tablet or other mobile device), appliance, or another apparatus that uses memory and has data processing capabilities. In some embodiments, host 102 is separate from, but connected to, memory system 100. In other embodiments, memory system 100 is embedded within host 102.

The components of memory system 100 depicted in FIG. 1 are electrical circuits. Memory system 100 includes a controller 104 connected to one or more memory die 106 and local high speed volatile memory 108 (e.g., DRAM). The one or more memory die 106 each include a plurality of non-volatile memory cells. More information about the structure of each memory die 106 is provided below. Local high speed volatile memory 108 is used by controller 104 to perform certain functions.

Controller 104 includes a host interface 110 that is connected to and in communication with host 102. In one embodiment, host interface 110 provides a PCIe interface. Other interfaces can also be used, such as SCSI, SATA, etc. Host interface 110 is also connected to a network-on-chip (NOC) 112, which is a communication subsystem on an integrated circuit. In other embodiments, NOC 112 can be replaced by a bus. A processor 114, an ECC engine 116, a memory interface 118, a DRAM controller 120 and a hardware accelerator circuit 122 are connected to and in communication with NOC 112.

Processor 114 performs the various controller memory operations, such as programming, erasing, reading, as well as memory management processes. In an embodiment, processor 114 is programmed by firmware. In other embodiments, processor 114 is a custom and dedicated hardware circuit without any software. In an embodiment, processor 114 also implements a translation module, as a software/firmware process or as a dedicated hardware circuit.

In an embodiment, ECC engine 116 performs error correction. For example, ECC engine 116 performs data encoding and decoding, as per the implemented ECC technique. In one embodiment, ECC engine 116 is an electrical circuit programmed by software. For example, ECC engine 116 can be a processor that can be programmed. In other embodiments, ECC engine 116 is a custom and dedicated hardware circuit without any software. In another embodiment, the function of ECC engine 116 is implemented by processor 114.

In an embodiment, memory interface 118 communicates with one or more memory die 106. In an embodiment, memory interface 118 provides a Toggle Mode interface. Other interfaces also can be used. In some example implementations, memory interface 118 (or another portion of controller 104) implements a scheduler and buffer for transmitting data to and receiving data from one or more memory die.

In an embodiment, DRAM controller 120 is used to operate and communicate with local high speed volatile memory 108 (e.g., DRAM). In other embodiments, local high speed volatile memory 108 can be SRAM or another type of volatile memory.

In an embodiment, in response to receiving a search command from host device 102, controller 104 reads data to be searched (e.g., a database file) from memory die 106 at a first data rate (e.g., a drive data rate). In an embodiment, and as described in more detail below, hardware accelerator circuit 122 includes electrical circuits that are configured to receive the read data from memory die 106 and perform one or more filtering operations on the read data. In an embodiment, hardware accelerator circuit 122 operates at the drive data rate. Without wanting to be bound by any particular theory, it is believed that hardware accelerator circuit 122 may reduce the amount of data transferred to host device 102 for completing the search command.

Figure 2:
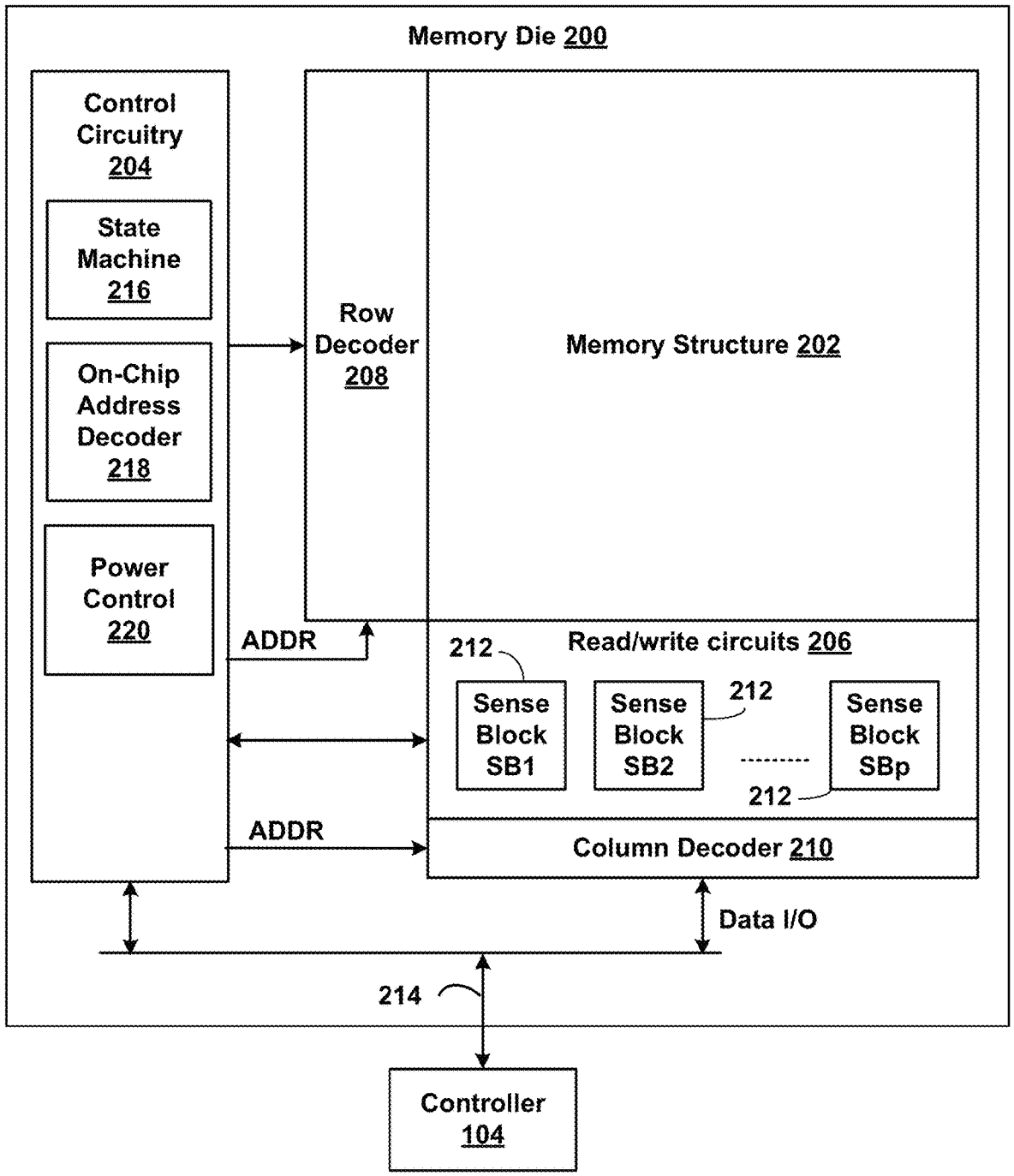
FIG. 2 is a block diagram of one embodiment of a memory die.

FIG. 2 is a functional block diagram of one embodiment of a memory die 200. Each of the one or more memory die 106 of FIG. 1 can be implemented as memory die 200 of FIG. 2. The components depicted in FIG. 2 are electrical circuits. In an embodiment, each memory die 200 includes a memory structure 202, control circuitry 204, and read/write circuits 206. Memory structure 202 is addressable by word lines via a row decoder 208 and by bit lines via a column decoder 210.

In an embodiment, read/write circuits 206 include multiple sense blocks 212 including SB1, SB2, . . . , SBp (sensing circuitry) and allow a page (or multiple pages) of data in multiple memory cells to be read or programmed (written) in parallel. In an embodiment, each sense block 212 includes a sense amplifier and a set of latches connected to the bit line. The latches store data to be written and/or data that has been read. In an embodiment, the sense amplifier of each sense block 212 includes bit line drivers. In an embodiment, commands and data are transferred between controller 104 and memory die 200 via lines 214. In an embodiment, memory die 200 includes a set of input and/or output (I/O) pins that connect to lines 214.

In an embodiment, control circuitry 204 cooperates with read/write circuits 206 to perform memory operations (e.g., write, read, erase, and others) on memory structure 202. In an embodiment, control circuitry 204 includes a state machine 216, an on-chip address decoder 218, and a power control module 220.

In an embodiment, state machine 216 provides die-level control of memory operations. In an embodiment, state machine 216 is programmable by software. In other embodiments, state machine 216 does not use software and is completely implemented in hardware (e.g., electrical circuits). In some embodiments, state machine 216 can be replaced by a microcontroller or microprocessor. In an embodiment, control circuitry 204 includes buffers such as registers, ROM fuses and other storage devices for storing default values such as base voltages and other parameters.

On-chip address decoder 218 provides an address interface between addresses used by controller 104 to the hardware address used by row decoder 208 and column decoder 210. Power control module 220 controls the power and voltages supplied to the word lines and bit lines during memory operations. Power control module 220 may include charge pumps for creating voltages.

For purposes of this document, control circuitry 204, read/write circuits 206, row decoder 208 and column decoder 210 comprise a control circuit for memory structure 202. In other embodiments, other circuits that support and operate on memory structure 202 can be referred to as a control circuit. For example, in some embodiments, controller 104 can operate as the control circuit or can be part of the control circuit. The control circuit also can be implemented as a microprocessor or other type of processor that is hardwired or programmed to perform the functions described herein.

In an embodiment, memory structure 202 is a three dimensional memory array of non-volatile memory cells. In an embodiment, memory structure 202 is a monolithic three dimensional memory array in which multiple memory levels are formed above a single substrate, such as a wafer. The memory structure may be any type of non-volatile memory that is formed in one or more physical levels of arrays of memory cells having an active area disposed above a silicon (or other type of) substrate. In one example, the non-volatile memory cells of memory structure 202 include vertical NAND strings with charge-trapping material such as described. A NAND string includes memory cells connected by a channel.

In another embodiment, memory structure 202 includes a two dimensional memory array of non-volatile memory cells. In an example, the non-volatile memory cells are NAND flash memory cells utilizing floating gates. Other types of memory cells (e.g., NOR-type flash memory) also can be used.

The exact type of memory array architecture or memory cell included in memory structure 202 is not limited to the examples above. Many different types of memory array architectures or memory cell technologies can be used to form memory structure 202. No particular non-volatile memory technology is required for purposes of the new technology described herein.

Other examples of suitable technologies for memory cells of the memory structure 202 include ReRAM memories, magnetoresistive memory (MRAM), phase change memory (PCM), and the like. Examples of suitable technologies for architectures of memory structure 202 include two dimensional arrays, three dimensional arrays, cross-point arrays, stacked two dimensional arrays, vertical bit line arrays, and the like.

One example of a cross point memory includes reversible resistance-switching elements arranged in cross point arrays accessed by X lines and Y lines (e.g., word lines and bit lines). In another embodiment, the memory cells may include conductive bridge memory elements. A conductive bridge memory element also may be referred to as a programmable metallization cell.

A conductive bridge memory element may be used as a state change element based on the physical relocation of ions within a solid electrolyte. In some cases, a conductive bridge memory element may include two solid metal electrodes, one relatively inert (e.g., tungsten) and the other electrochemically active (e.g., silver or copper), with a thin film of solid electrolyte between the two electrodes.

MRAM stores data using magnetic storage elements. The magnetic storage elements are formed from two ferromagnetic plates, each of which can hold a magnetization, separated by a thin insulating layer. One of the two plates is a permanent magnet set to a particular polarity; the other plate's magnetization can be changed to match that of an external field to store memory. A memory device is built from a grid of such memory cells. In one embodiment for programming, each memory cell lies between a pair of write lines arranged at right angles to each other, parallel to the cell, one above and one below the cell. When current is passed through them, an induced magnetic field is created.

Phase change memory (PCM) exploits the unique behavior of chalcogenide glass. One embodiment uses a GeTe—$Sb_2Te_3$ super lattice to achieve non-thermal phase changes by simply changing the coordination state of Germanium atoms with a laser pulse (or light pulse from another source). Therefore, the doses of programming are laser pulses. The memory cells can be inhibited from programming by blocking the memory cells from receiving the light.

A person of ordinary skill in the art will recognize that the technology described herein is not limited to a single specific memory structure, but covers many relevant memory structures within the scope of the technology as described herein and as understood by one of ordinary skill in the art.

Figure 3:
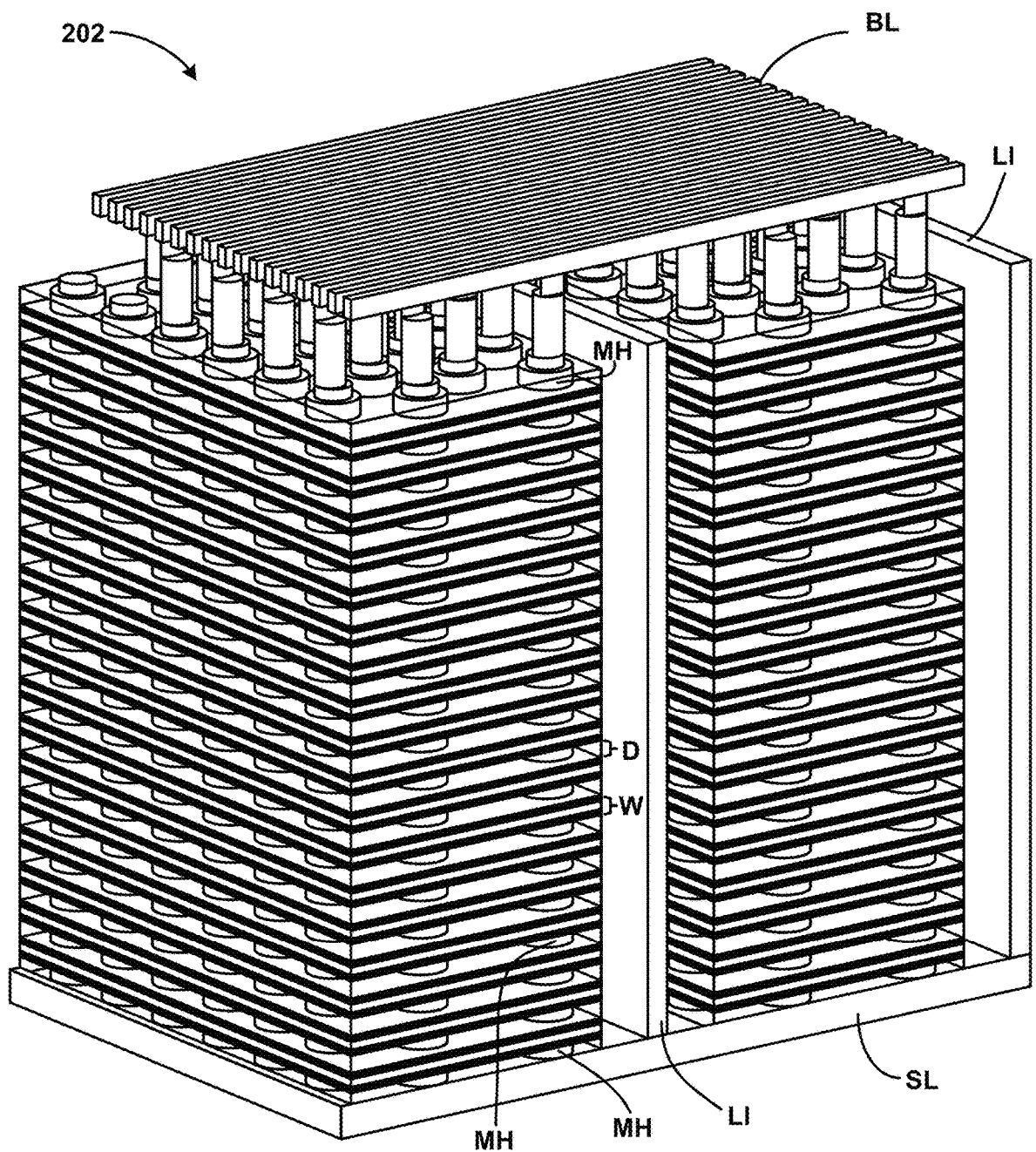
FIG. 3 is a perspective view of a portion of one embodiment of a three dimensional memory structure.

FIG. 3 is a perspective view of a portion of an embodiment of a three dimensional memory array that includes memory structure 202. In an embodiment, memory structure 202 includes multiple non-volatile memory cells. For example, FIG. 3 shows a portion of one block of memory cells. The structure depicted includes a set of bit lines BL positioned above a stack of alternating dielectric layers and conductive layers. For example purposes, one of the dielectric layers is marked as D and one of the conductive layers (also called word line layers) is marked as W.

The number of alternating dielectric layers and conductive layers can vary based on specific implementation requirements. One set of embodiments includes between 108-300 alternating dielectric layers and conductive layers. One example embodiment includes 96 data word line layers, 8 select layers, 6 dummy word line layers and 110 dielectric layers. More or less than 108-300 layers also can be used. In an embodiment, the alternating dielectric layers and conductive layers are divided into four regions by local interconnects LI. FIG. 3 shows two regions and two local interconnects LI.

A source line layer SL is below the alternating dielectric layers and word line layers. Memory holes are formed in the stack of alternating dielectric layers and conductive layers. For example, one of the memory holes is marked as MH. Note that in FIG. 3 the dielectric layers are depicted as see-through so that the reader can see the memory holes positioned in the stack of alternating dielectric layers and conductive layers.

In an embodiment, NAND strings are formed by filling the memory hole with materials including a charge-trapping material to create a vertical column of memory cells (also referred to as a memory column). In an embodiment, each memory cell can store one or more bits of data. In an embodiment, each memory hole MH is associated with and coupled to a corresponding one of bit lines BL. In an embodiment, each bit line BL is coupled to one or more memory holes MH.

As described above, a host device coupled to a memory system (e.g., an SSD) may request a search of data (e.g., in an input file) stored in the SSD. Conventionally, in response to such a search request a memory controller in the SSD reads data corresponding to the input file from nonvolatile memory, and transfers the read data to the host device. The host device then typically performs various operations to extract from the input file any relevant data and then perform some analysis on the extracted data. Transferring large amounts of data from a memory system to a host device for such search requests is costly and inefficient.

Figure 4A:
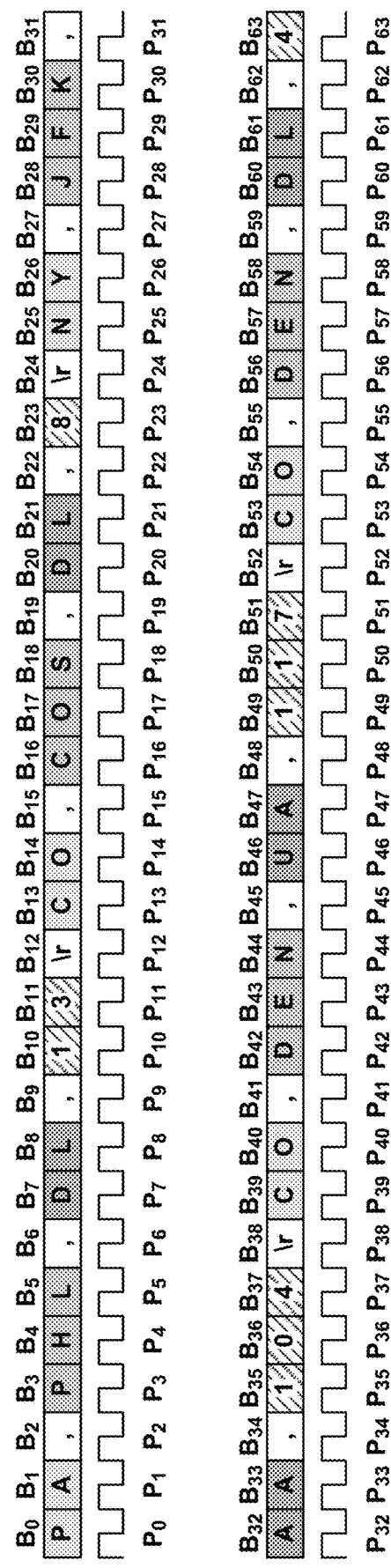
FIG. 4A depicts an example comma separated values file.

A simple example of such an input file that may be searched by a host device is a comma separated values (CSV) file. A CSV file includes a first number ($NR_f$) of records (or rows), with each record including a second number ($NC_f$) of fields (or columns), with the columns separated by commas. FIG. 4A depicts an example CSV file that may be stored in an SSD (e.g., memory system 100 of FIG. 1) coupled to a host device (e.g., host device 102 of FIG. 1). The example CSV file of FIG. 4A includes $NR_f=6$ rows, with each row including $NC_f=4$ columns.

For example, FIG. 4A may be a list of the most cancelled flights in the United States for a period of six consecutive days (one day per row). In each row, the value in the first column may specify a US state, the value in the second column may specify an airport code, the value in the third column may specify an airline code, and the value in the third column may specify a number of cancelled flights.

So for example, the first row specifies that on a first day, the maximum number of cancelled flights (13) was in Pennsylvania (PA) at Philadelphia International Airport (PHL) by Air Canada (AC). The second row specifies that on a second day, the maximum number of cancelled flights (8) was in Colorado (CO) at Colorado Springs Airport (COS) by Delta Airlines (DL), and so on.

Figure 4B:
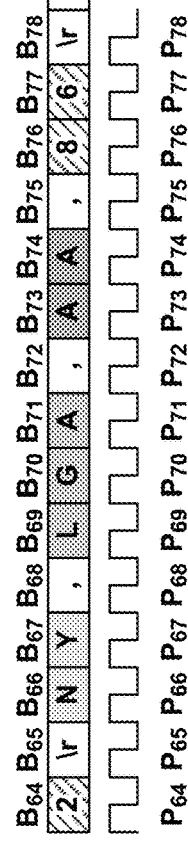
FIG. 4B depicts example bytes corresponding to the comma separated values file of FIG. 4A.

The CSV file depicted in FIG. 4A may be stored in the SSD as a sequence of bytes, with each byte representing a symbol (e.g., an ASCII encoded symbol). FIG. 4B depicts example bytes corresponding to the CSV file of FIG. 4A. In the illustrated example, the CSV file includes 79 bytes $B_0$-$B_{78}$, including alphanumeric characters, commas and carriage return symbols (\r). So, for example, byte $B_0$ is letter P, byte $B_1$ is letter A, byte $B_2$ is a comma, byte $B_{12}$ is a carriage return, and so on. Also depicted in FIG. 4B is an input clock signal having clock pulses $P_0, P_1, P_2, \ldots, P_{78}$, described in more detail below.

A user of the host device may request information regarding the data stored in the CSV file of FIG. 4A. For example, a user may want to determine an average number of cancelled flights by Delta Airlines in all Colorado airports during the time period included in the CSV file. To provide this information to the user, the host device would perform a search function to extract the relevant information from the input file.

Conventionally, the host would perform this search function by reading the entire input file as a byte stream from the SSD, extracting relevant information from the read file, and performing any necessary computations on the extracted data to determine a result.

In the example described above, the host may extract relevant information by identifying rows and columns of data in the byte stream, and identifying all rows in which the value in the first column is "CO" and the value in the third column is "DL" (rows 2 and 5). The host may then extract the value in the fourth column for each of rows 2 and 5 (e.g., 8 and 42, respectively), sum the two values (e.g., 8+42=50) and divide the sum by the number of days (e.g., 6) to provide the resulting average: 8.33.

In this simple example, to complete this search all 79 bytes of data are transferred from the SSD to the host device. If the input file included many more rows (e.g., tens or hundreds of thousands of rows) and each row included many more columns (e.g., hundreds of columns), the amount of data transferred from the SSD to the host device may easily become exceedingly large. In addition, processors in the host devices cannot keep up with the incoming data read from the SSD, let alone perform any searching functions on the data.

As described in more detail below, technology is described for a near storage compute system that includes hardware accelerator circuits that can perform some or all of a host-specified search function, and operate at the drive data rate. In embodiment, in response to a search request of an input file from a host device (e.g., host device 102 of FIG. 1), a memory controller (e.g., controller 104 of FIG. 1) in the SSD reads data corresponding to the input file from non-volatile memory.

In an embodiment, memory controller 104 includes hardware accelerator circuit 122 that is configured to receive the read data (a first amount of input data), perform some or all of the search function on the first amount of input data, and provide as output filtered data (a second amount of output data). In an embodiment, the second amount of output data is less than the first amount of input data. In an embodiment, controller 104 provides the second amount of output data from hardware accelerator circuit 122 to host device 102 to complete the search processing to produce a search result.

In another embodiment, controller 104 includes a data processor circuit configured to receive the second amount of output data from hardware accelerator circuit 122, complete the search processing, and provide the search result to host device 102. Without wanting to be bound by any particular theory, it is believed that the described technology reduces the amount of data of the input file required to be transferred from an SSD to host device 102 to perform a host device search request.

In an embodiment, memory controller 104 is configured to read a first amount of input data from a storage device (e.g., memory die 106) at an input data rate, and provide the first amount of input data at the input data rate to hardware accelerator circuit 122. In an embodiment, hardware accelerator circuit 122 is configured to filter the first amount of input data to provide a second amount of output data at an output data rate, the second amount of output data less than the first amount of input data, the output data rate less than the input data rate. In an embodiment, hardware accelerator circuit 122 filters the first amount of input data without repeatedly moving data back and forth between memory die 106, a memory buffer (e.g., DRAM), and hardware circuit 122.

Figure 5:
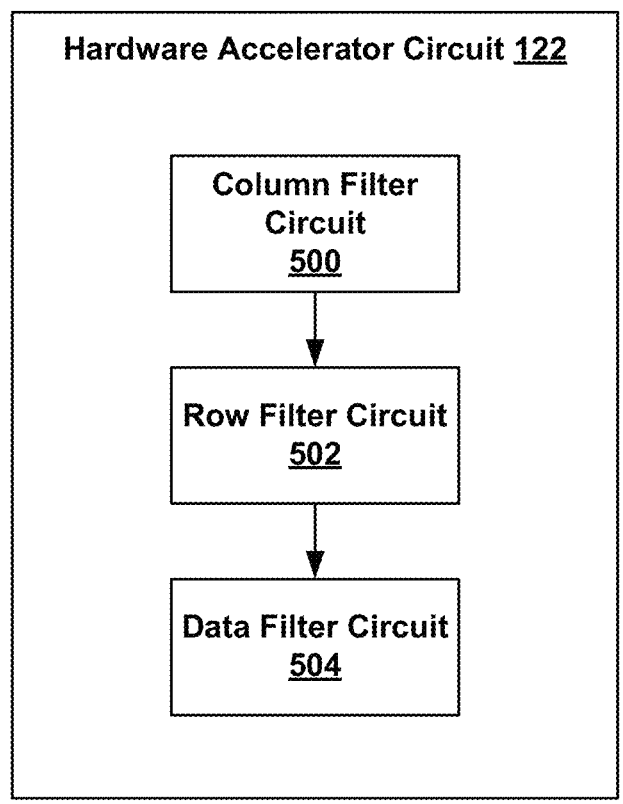
FIG. 5 depicts a simplified block diagram of an embodiment of a hardware accelerator circuit.

FIG. 5 depicts a simplified block diagram of an embodiment of hardware accelerator circuit 122 of FIG. 1. In an embodiment, hardware accelerator circuit 122 includes one or more electrical circuits. In an embodiment, hardware accelerator circuit 122 includes a Column Filter Circuit 500, a Row Filter Circuit 502 and a Data Filter Circuit 504. In an embodiment, Column Filter Circuit 500, Row Filter Circuit 502 and Data Filter Circuit 504 are electrical circuits.

Persons of ordinary skill in the art will understand that hardware accelerator circuit 122 may include additional, fewer and/or different electrical circuits than in the example embodiment of FIG. 5. For example, in other embodiments hardware accelerator circuit 122 also may include additional hardware circuits for performing compression/decompression and/or encoding/decoding of data stored on or retrieved from storage elements on memory die 106.

As described in more detail below, hardware accelerator circuit 122 receives a first amount of input data read from an input file, and filters the received input data to provide a second amount of output data less than the first amount of input data. In an embodiment, hardware accelerator circuit 122 receives the first amount of input data at an input data rate and provides the second amount of output data at an output data rate less than the input data rate. In an embodiment, the input data rate is a drive data rate of an SSD. In an embodiment, to simplify hardware accelerator circuit 122, more complex data reduction functions are reserved for an optional general purpose processor (or host device 102).

As depicted in the example database file of FIG. 4A, data are typically stored in a regular structure (e.g., rows and columns of data). Indeed, independent of storage methodology almost all data can be mapped to a two-dimensional equivalent (e.g., columns and rows). In an embodiment, hardware accelerator circuit 122 divides the filtering problem into multiple filtering stages, with each stage increasing in complexity and decreasing in data rate. For simplicity, the remaining discussion will use the term "input database file" to refer to the input file processed by hardware accelerator circuit 122.

In an embodiment, the initial filter stages are relatively coarse to enable relatively fast filtering. These initial filter stages reduce the amount of data flow passed to subsequent more complex stages. Without wanting to be bound by any particular theory, it is believed that this provides the subsequent more complex stages with sufficient time to perform their filter operations without requiring high device speed.

A database file typically includes various forms of data, including the content itself that is stored in the input database file plus other data that are components of the data structure itself (e.g., column delimiters, row delimiters, etc.). The following description uses the term "input content" to refer to the data stored in the input database file distinct from other data that may be included in the input database file. So in the example of FIG. 4A, the input content in the first row is "PA", "PHL", "DL", "13", the input content in the second row is "CO", "COS", "DL", "8", and so on.

The following description uses the term "cell" to refer to the content associated with a particular row and column of a database file. So in the example input database file of FIG. 4A, each row includes $NC_I$ input cells, and each column includes $NR_I$ input cells. The input cell located at the first row and first column includes the input content "PA", the input cell located at the fourth row and third column includes the input content "UA", and so on. The example input database of FIG. 4A includes a third number ($NE_I$) of input cells, where $NE_I=(NR_I \times NC_I)=24$.

As described in more detail below, in an embodiment Column Filter Circuit 500 is a first filter circuit that is configured to receive at the first data rate the first amount of input data and implement a first filter operation on the received input data to provide a second amount of first filtered data less than the first amount of input data.

As described in more detail below, in an embodiment Row Filter Circuit 502 is a second filter circuit configured to receive at a second data rate less than the first data rate the second amount of first filtered data and implement a second filter operation on the received first filtered data to provide a third amount of second filtered data less than the second amount of first filtered data.

As described in more detail below, in an embodiment Data Filter Circuit 504 is a third filter circuit configured to receive at a third data rate less than the second data rate the third amount of second filtered data and implement a third filter operation on the received second filtered data to provide a fourth amount of third filtered data less than the third amount of second filtered data.

In an embodiment, Column Filter Circuit 500 implements the first filter operation. In particular, in an embodiment Column Filter Circuit 500 receives the first amount of input data (the input database file), identifies the $NC_I$ input columns and $NR_I$ input rows in the received input database file, and associates a corresponding input column number with each identified input column of each identified row. In an embodiment, Column Filter Circuit 500 also receives first filtering criteria (e.g., from host device 102 of FIG. 1) that specifies the input content to be selected from the received input data and provided to Row Filter Circuit 502.

In an embodiment, the first filtering criteria includes a fourth number ($NC_D$) of desired input column numbers that specify the input columns whose input content is to be selected from the received input data and provided to Row Filter Circuit 502. In an embodiment, Column Filter Circuit 500 filters the received first amount of input data by selecting only input content from input columns whose associated input column numbers match the desired input column numbers. In an embodiment, Column Filter Circuit 500 provides first filtered columns of the selected input content.

In an embodiment, Column Filter Circuit 500 associates the first filtered columns of the selected input content with corresponding first filtered column numbers, and provides the selected input content as a second amount of first filtered content to Row Filter Circuit 502. In embodiments in which the number of desired input column numbers is less than the number of input columns (i.e., $NC_D<NC_I$) Column Filter Circuit 500 reduces the amount of data provided to Row Filter Circuit 502.

In an embodiment, hardware accelerator circuit 122 receives the input database file from one or more memory die (e.g., memory die 106 of FIG. 1) as a stream of bytes, such as the example byte stream of FIG. 4B. For simplicity, the remaining description will refer to the input data as an input byte stream. Persons of ordinary skill in the art will understand that the input data may be other forms of data, such as binary data. In an embodiment, Column Filter Circuit 500 receives the input byte stream at a first data rate, processes the received input data at the first data rate, and provides first filtered content at the first data rate.

In an embodiment, each byte in the input byte stream is one of a regular symbol (e.g., letters, numbers, special characters that form the content), a column delimiter symbol (e.g., a comma symbol ","), a row delimiter symbol (e.g., a carriage return symbol "\r"), or an ignore symbol (e.g., a double quote symbol " "" "). As used herein, in general a "regular symbol" is any symbol that is not a column delimiter symbol, a row delimiter symbol or an ignore symbol. For example, in FIG. 4B bytes $B_0$-$B_1$, $B_3$-$B_5$ are regular symbols, bytes $B_2$, $B_6$, $B_9$ are column delimiter symbols, and bytes $B_{12}$, $B_{24}$ are row delimiter symbols, and so on.

As described in more detail below, in some instances an input database file may include input cells having input content containing symbols (e.g., commas and carriage returns) that are also used as column delimiter symbols and a row delimiter symbols. In such instances, the input database file typically uses ignore symbols to prevent such input content from being incorrectly designated as a column delimiter symbol or a row delimiter symbol. For example, a comma symbol or a carriage return symbol located between two double quote symbols is intended to be construed as regular symbols and not a column delimiter symbol.

In an embodiment, Column Filter Circuit 500 searches the input byte stream for column delimiter symbols and row delimiter symbols to identify $NC_I$ input columns and $NR_I$ input rows. In an embodiment, Column Filter Circuit 500 also searches the input byte stream for ignore symbols to avoid incorrectly identifying column delimiter symbols and row delimiter symbols that are intended as regular symbols, and not intended to represent actual column delimiters and row delimiters.

In an embodiment, Column Filter Circuit 500 associates a corresponding input column number $CN_I$ with each identified input column in each identified row. In an embodiment, each identified input row includes a same number of columns (i.e., $NC_I$ columns), and Column Filter Circuit 500 associates the same input column number $CN_I$ with the same identified input column in each identified row. In an embodiment, Column Filter Circuit 500 begins at input column number $CN_I=0$, although another number may be used.

In an embodiment, each identified input column has corresponding input content. For example, FIG. 4C depicts a table of identified input rows ($r_0$-$r_5$) and identified input columns ($CN_I=0$-3) for the example byte stream of FIG. 4B. In the example of FIG. 4C, the identified input column associated with input column number $CN_I=0$ has corresponding input content "PA", "CO", "NY", "CO", "CO", "NY". Likewise, the identified input column associated with input column number $CN_I=1$ has corresponding input "PHL", "COS", "JFK", "DEN", "DEN", "LGA". Similarly, the identified input column associated with input column number $CN_I=2$ has corresponding input content "DL", "DL", "AA", "UA", "DL", "AA". Finally, the identified input column associated with input column number $CN_I=3$ has corresponding input content "13", "8", "104", "117", "42", "86".

In an embodiment, each identified input row has corresponding input content. In the example of FIG. 4C, identified input row $r_0$ has corresponding input content "PA", "PHL", "DL", "13", identified input row $r_1$ has corresponding input content "CO", "COS", "DL", "8", identified input row $r_2$ has corresponding input content "NY", "JFK", "AA", "104", identified input row $r_3$ has corresponding input content "CO", "DEN", "UA", "117", identified input row $r_4$ has corresponding input content "CO", "DEN", "DL", "42", and identified input row $r_5$ has corresponding input content "NY", "LGA", "AA", "86".

FIG. 4D depicts a table of $NR_I$ identified input rows $r_0$-$r_5$ and $NC_I$ identified input columns ($CN_I=0$-3). The table of FIG. 4D is the same as the table of FIG. 4C, except that the input content has been replaced with the corresponding byte numbers of FIG. 4B. So for example, identified input column number $CN_I=0$ in identified input row $r_0$ includes bytes $B_0$ and $B_1$ from the example byte stream of FIG. 4B. Similarly, identified input column number $CN_I=2$ in identified row $r_3$ includes bytes $B_{46}$ and $B_{47}$ from the example byte stream of FIG. 4B, and so on.

In an embodiment, each identified input column in each identified input row has a corresponding start byte and byte width. In an embodiment, Column Filter Circuit 500 determines the start byte and byte width of each identified input column in each identified input row. In an embodiment, Column Filter Circuit 500 associates the corresponding start byte and byte width of each identified input column with the corresponding input column number $CN_I$ associated with the identified input column.

FIG. 4E depicts corresponding input column number $CN_I$, start byte and byte width associated with each input column of the example byte stream of FIG. 4B and the example table of FIG. 4D. So for example, the first instance of input column number $CN_I=0$ has an associated start byte=0 and byte width=2, the first instance of input column number $CN_I=1$ has an associated start byte=3 and byte width=3, the first instance of input column number $CN_I=2$ has an associated start byte=7 and byte width=2, the first instance of input column number $CN_I=3$ has an associated start byte=10 and byte width=2, the second instance of input column number $CN_I=0$ has an associated start byte=13 and byte width=2, and so on.

In an embodiment Column Filter Circuit 500 receives (e.g., from host device 102 of FIG. 1) a first filtering criteria that specifies $NC_D$ desired input column numbers ($CN_D$) that specify the identified input columns whose input content is to be selected from the input byte stream and provided to Row Filter Circuit 502. In an embodiment, Column Filter Circuit 500 filters the input content by selecting input content of the identified input columns associated with input column numbers $CN_I$ that match the desired input column numbers $CN_D$.

In an embodiment, Column Filter Circuit 500 provides first filtered columns of the selected input content. In an embodiment, Column Filter Circuit 500 associates the first filtered columns of the selected input content with corresponding first filtered column numbers, and provides the selected input content as a second amount of first filtered content to Row Filter Circuit 502. In embodiments in which the number of desired input column numbers is less than the number of input columns (i.e., $NC_D<NC_I$), Column Filter Circuit 500 reduces the amount of data provided to Row Filter Circuit 502. That is, the second amount of first filtered content is less than the first amount of input data.

In the example described above, a user wants to determine from the database file depicted in FIG. 4A an average number of cancelled flights by Delta Airlines in all Colorado airports during the time period included in the CSV file. As described in more detail below, Column Filter Circuit 500, Row Filter Circuit 502 and Data Filter Circuit 504 may be used to perform some or all of this search function.

In an embodiment, Column Filter Circuit 500 receives as an input byte stream the example byte stream of FIG. 4B that includes $NC_I=4$ input columns. In an embodiment, host device 102 provides first filtering criteria to Column Filter Circuit 500. In this example, the input content of identified input column $CN_I=1$ (airport code) is not needed because the search specifies all Colorado airports.

Thus, for the example the first filtering criteria includes $NC_D=3$ desired input column numbers $CN_D=0, 2, 3$ (corresponding to US state, airline code and number of cancelled flights) that specify the identified input columns whose input content is to be selected from the input byte stream and provided to Row Filter Circuit 502.

In an embodiment, Column Filter Circuit 500 identifies input columns and input rows in the received input byte stream, and associates an input column number (e.g., $CN_I=0$, 1, 2, 3) with each identified input column. In an embodiment, Column Filter Circuit 500 determines for each identified input row a corresponding start byte and byte width of each identified input column. In an embodiment, Column Filter Circuit 500 associates the corresponding start byte and byte width of each identified input column with the corresponding input column number $CN_I$ associated with the identified input column, such as the information in FIG. 4E.

In an embodiment, Column Filter Circuit 500 filters the input content by selecting input content of the identified input columns associated with input column numbers $CN_I$ that match desired input column numbers $CN_D=0, 2, 3$. In an embodiment, Column Filter Circuit 500 provides the selected input content as first filtered content to Row Filter Circuit 502. Thus, in the example described above, Column Filter Circuit 500 selects the input content of the identified input columns associated with input column numbers $CN_I$=0, 2, 3, and provides the selected input content as first filtered content to Row Filter Circuit 502.

In an embodiment, Column Filter Circuit 500 provides first filtered columns of the first filtered content. In an embodiment, Column Filter Circuit 500 associates the first filtered columns of the first filtered content with corresponding first filtered column numbers $CN_{F1}$, and provides the first filtered content and corresponding first filtered column numbers $CN_{F1}$ to Row Filter Circuit 502. In an embodiment, a number of first filtered column numbers $CN_{F1}$ is equal to a number of desired input column numbers $CN_D$ (i.e., $NC_D$). FIG. 4F depicts the first filtered content and corresponding first filtered column numbers $CN_{F1}$ for the example described above.

Thus, in this example there are $NC_D$=3 first filtered column numbers $CN_{F1}$=0, 1, 2. The first filtered content of the first filtered column associated with first filtered column number $CN_{F1}$=0 is "PA", "CO", "NY", "CO", "CO", "NY", the first filtered content of the first filtered column associated with first filtered column number $CN_{F1}$=1 is "DL", "DL", "AA", "UA", "DL", "AA", and the first filtered content of the first filtered column associated with first filtered column number $CN_{F1}$=2 is "13", "8", "104", "117", "42", "86". Thus, the first filtered content of the first filtered columns associated with first filtered column numbers $CN_{F1}$=0, 1 and 2 correspond to US state, airline code and number of cancelled flights, respectively.

In an embodiment, Column Filter Circuit 500 provides first records $R_{F1}$ of first filtered content to Row Filter Circuit 502. In an embodiment, a number of first records $R_{F1}$ of first filtered content is equal to the number of identified input rows ($NR_I$). In an embodiment, each first record $R_{F1}$ includes first filtered content selected from the corresponding identified input row.

In an embodiment, each first record $R_{F1}$ includes $NC_D$ first filtered columns, and each first filtered column includes $NR_I$ first filtered cells. In an embodiment, Column Filter Circuit 500 provides first filtered content that includes a fifth number ($NE_{F1}$) of first filtered cells, where $NE_{F1}$=($NR_I \times NC_D$). In embodiments, the fifth number of first filtered cells is less than the third number of input cells (i.e., $NE_{F1}$<$NE_I$).

In the example of FIG. 4F, each first record $R_{F1}$ includes $NC_D$=3 first filtered columns, and each column includes $NR_I$=6 first filtered cells. The first filtered cell located at first record $R_{F1}$=1 and first filtered column number $CN_{F1}$=1 includes first filtered content "DL", the first filtered cell located at first record $R_{F1}$=5 and first filtered column number $CN_{F1}$=2 includes first filtered content "86", and so on. In this example, the fifth number B=6×3=18 of first filtered cells is less than the third number $NE_I$=24 of input cells.

Referring again to the example of FIG. 4F, first record $R_{F1}$=0 includes first filtered content "PA", "DL", "13" (selected from identified input row $r_0$), first record $R_{F1}$=1 includes first filtered content "CO", "DL", "8" (selected from identified input row $r_1$), first record $R_{F1}$=2 includes first filtered content "NY", "AA", "104" (selected from identified input row $r_2$), first record $R_{F1}$=3 includes first filtered content "CO", "UA", "117" (selected from identified input row $r_3$), first record $R_{F1}$=4 includes first filtered content "CO", "DL", "42" (selected from identified input row $r_4$), and first record $R_{F1}$=5 includes first filtered content "NY", "AA", "86" (selected from identified input row $r_5$).

In this example, Column Filter Circuit 500 implements the first filter operation by filtering the input content to include only content of the identified input columns associated with input column numbers $CN_I$ that match desired input column numbers $CN_D$, and reduces the amount of content transferred from Column Filter Circuit 500 to Row Filter Circuit 502.

In an embodiment, Hardware Accelerator Circuit 122 receives a first amount of input data from one or more memory die (e.g., memory die 106 of FIG. 1) at the first data rate. In an embodiment, Column Filter Circuit 500 receives the first amount of input data from one or more memory die 106 at the first data rate, implements a first filter operation on the received input data at the first data rate, and provides a second amount of first filtered content (data) less than the first amount of input data at the first data rate.

In an embodiment, Row Filter Circuit 502 implements the second filter operation. In particular, in an embodiment Row Filter Circuit 502 receives the second amount of first filtered content from Column Filter Circuit 500 at a second data rate lower than the first data rate. In an embodiment, Row Filter Circuit 502 also receives (e.g., from host device 102 of FIG. 1) a second filtering criteria that specifies the content to be selected from the first filtered content and provided to Data Filter Circuit 504.

In an embodiment, the second filtering criteria includes a specified first filtered column number $CN_{S1}$ and a corresponding specified First Match Value. In an embodiment, the specified First Match Value is a desired value of first filtered content in the first filtered column associated with the specified first filtered column number $CN_{S1}$.

Persons of ordinary skill in the art will understand that second filtering criteria may include additional or different match criteria, such as a match length that specifies a length (e.g., number of bytes) of the first filtered content to be matched, a content type (e.g., string, integer, float, etc.) of the first filtered content to be matched, or other match criteria.

In an embodiment, for each first record $R_{F1}$, Row Filter Circuit 502 searches the first filtered column associated with the first filtered number $CN_{F1}$ that corresponds to the specified first filtered column number $CN_{S1}$ to identify any first filtered content that matches the specified First Match Value. In an embodiment, for each identified match Row Filter Circuit 502 selects a sixth number ($NC_{F2}$) of first filtered content from the same matching first record $R_{F1}$, where $NC_{F2}$=($NC_D$−1). In an embodiment, Row Filter Circuit 502 identifies a seventh number ($NM_{F1}$) of first filtered content that matches the specified First Match Value.

In an embodiment, for each matching first record $R_{F1}$, Row Filter Circuit 502 selects the first filtered content from all first filtered columns associated with first filtered column numbers $CN_{F1}$ other than the specified first filtered column number $CN_{S1}$. In an embodiment, Row Filter Circuit 502 provides the selected first filtered content as second filtered content to Data Filter Circuit 504. In an embodiment, Row Filter Circuit 502 provides second filtered columns of second filtered content.

Continuing the example above, a user wants to determine from the database file depicted in FIG. 4A an average number of cancelled flights by Delta Airlines in all Colorado airports during the time period included in the CSV file. As described above, the first filtered content of the first filtered columns associated with first filtered column numbers $CN_{F1}$=0, 1 and 2 correspond to US state, airline code and number of cancelled flights, respectively. Thus, Row Filter Circuit 502 may be used to sort based on US state (CO) or airline code (DL).

For sorting based on US state, the second filtering criteria includes a specified first filtered column number $CN_{S1}$=0 and a corresponding specified First Match Value="CO".

Referring again to FIG. 4F, for all $NR_f=6$ first records $R_{F1}=0$-6, Row Filter Circuit 502 searches the first filtered column associated with the first filtered column number $CN_{F1}=0$ that corresponds to the specified first filtered column number $CN_{S1}=0$ and identifies $NM_{F1}=3$ matches in first records $R_{F1}=1$, 3, 4.

Row Filter Circuit 502 selects $NC_{F2}=(3-1)=2$ first filtered content from each of matching first records $R_{F1}=1$, 3, 4. For each of matching first records $R_{F1}=1$, 3, 4, Row Filter Circuit 502 selects the first filtered content from all first filtered columns that are associated with first filtered column numbers $CN_{F1}$ other than the specified first filtered column number (i.e., other than $CN_{S1}=0$). Thus, for each of matching first records $R_{F1}=1$, 3, 4, Row Filter Circuit 502 selects the first filtered content from all first filtered columns that are associated with $CN_{F1}=1$ and $CN_{F1}=2$ and provides the selected first filtered content as a third amount of second filtered content to Data Filter Circuit 504.

In an embodiment, Row Filter Circuit 502 provides second filtered columns of second filtered content. In an embodiment, Row Filter Circuit 502 associates the second filtered columns of second filtered content with corresponding second filtered column numbers $CN_{F2}$, and provides the second filtered content and corresponding second filtered column numbers $CN_{F2}$ to Data Filter Circuit 504.

In an embodiment, Row Filter Circuit 502 provides second records $R_{F2}$ of second filtered content to Data Filter Circuit 504. In an embodiment, a number of second records $R_{F2}$ of second filtered content is equal to the number of first filtered content that matches the specified First Match Value ($NM_{F1}$). In an embodiment, each second record $R_{F2}$ includes second filtered content selected from a corresponding one of the matching first records $R_{F1}$. FIG. 4G depicts the second filtered content and corresponding second records $R_{F2}$ and second filtered column numbers $CN_{F2}$ for the example described above.

In an embodiment, each second record $R_{F2}$ includes $NC_{F2}$ second filtered columns, and each second filtered column includes $NM_{F1}$ second filtered cells. In an embodiment, Row Filter Circuit 502 provides second filtered content that includes an eighth number ($NE_{F2}$) of second filtered cells, where $NE_{F2}=(NM_{F1} \times NC_{F2})$. In embodiments, the eighth number of second filtered cells is less than the fifth number of first filtered cells (i.e., $NE_{F2}<NE_{F1}$).

Thus, in the example described above, there are $NC_{F2}=2$ second filtered column numbers $CN_{F2}=0$, 1. The second filtered content of the second filtered column associated with second filtered column number $CN_{F2}=0$ is "DL", "UA", "DL", and the second filtered content of the second filtered column associated with second filtered column number $CN_{F2}=1$ is "8", "117", "42". Thus, the second filtered content of the second filtered columns associated with second filtered column numbers $CN_{F2}=0$ and 1 correspond to airline code and number of cancelled flights, respectively.

Referring again to the example of FIG. 4G, second record $R_{F2}=0$ includes second filtered content "DL", "8" (selected from first record $R_{F1}=1$ of FIG. 4F), second record $R_{F2}=1$ includes second filtered content "UA", "117" (selected from first record $R_{F1}=3$ of FIG. 4F), and second record $R_{F2}=2$ includes second filtered content "DL", "42" (selected from first record $R_{F1}=4$ of FIG. 4F). In this example, the eighth number $NE_{F2}=3 \times 2=6$ of second filtered cells is less than the fifth number $NE_{F1}=18$ of first filtered cells.

In an embodiment, Row Filter Circuit 502 receives the second amount of first filtered content from Column Filter Circuit 500 at the second data rate lower than the first data rate, implements the second filter operation on the received first filtered content at the second data rate, and provides the third amount of second filtered content (data) less than the second amount of first filtered content at the second data rate.

In an embodiment, Data Filter Circuit 504 may perform more advanced matching and may perform various math functions such as counting, summing, hashing, etc., on the incoming second filtered content and corresponding second filtered column numbers $CN_{F2}$ from Row Filter Circuit 502.

In an embodiment, Data Filter Circuit 504 implements the third filter operation. In particular, in an embodiment Data Filter Circuit 504 receives the third amount of second filtered content from Row Filter Circuit 502 at a third data rate lower than the second data rate. In an embodiment, Data Filter Circuit 504 also receives a third filtering criteria (e.g., from host device 102 of FIG. 1) that specifies the content to be selected from the second filtered content.

In an embodiment, the third filtering criteria includes a specified second filtered column number $CN_{S2}$ and a corresponding specified Second Match Value. In an embodiment, the specified Second Match Value is a desired value of second filtered content in the second filtered column associated with the specified second filtered column number $CN_{S2}$. Persons of ordinary skill in the art will understand that third filtering criteria may include additional or different criteria, such as a match length that specifies a length (e.g., number of bytes), a content type (e.g., string, integer, float, etc.) of the second filtered content to be matched.

In an embodiment, for all $NM_{F1}$ second records $R_{F2}$, Data Filter Circuit 504 searches the second filtered column associated with the second filtered column number $CN_{F2}$ that corresponds to the specified second filtered column number $CN_{S2}$ to identify any second filtered content that matches the specified Second Match Value. In an embodiment, for each match Data Filter Circuit 504 selects a ninth number ($NC_{F3}$) of second filtered content from the same matching second record $R_{F2}$, where $NC_{F3}=(NC_{F2}-1)$. In an embodiment, Data Filter Circuit 504 identifies a tenth number ($NM_{F2}$) of second filtered content that matches the specified Second Match Value.

In an embodiment, for each matching first record $R_{F2}$, Data Filter Circuit 504 selects the second filtered content from all second filtered columns associated with second filtered column numbers $CN_{F2}$ other than the specified second filtered column number $CN_{S2}$. In an embodiment, Data Filter Circuit 504 provides the selected second filtered content as third filtered content. In an embodiment, Data Filter Circuit 504 provides third filtered content at the third data rate.

Continuing the example above, a user wants to determine from the database file depicted in FIG. 4A an average number of cancelled flights by Delta Airlines in all Colorado airports during the time period included in the CSV file. As described above, the second filtered content of the second filtered columns associated with second filtered column numbers $CN_{F1}=0$ and 2 correspond to airline code and number of cancelled flights, respectively. Thus, Data Filter Circuit 504 may be used to sort based on airline code (DL).

For sorting based on airline code, the third filtering criteria includes a specified second filtered column number $CN_{S1}=0$ and a corresponding specified Second Match Value="DL". Referring again to FIG. 4G, Data Filter Circuit 504 searches the specified second filtered column number $CN_{F2}=0$ that corresponds to the specified second filtered column number $CN_{S2}=0$ and identifies matches in $NM_{F2}=2$ second records $R_{F2}=0$, 2.

Data Filter Circuit 504 selects $NC_{F3}=(2-1)=1$ second filtered content from each of matching second records $R_{F2}=0, 2$. For each matching second record $R_{F2}=0, 2$, Data Filter Circuit 504 selects the second filtered content from all second filtered columns associated with second filtered column numbers $CN_{F2}$ other than the specified second filtered column number (i.e., other than $CN_{S2}=0$). Thus, for each matching first record $R_{F2}=0, 2$, Data Filter Circuit 504 selects the second filtered content from all second filtered columns associated with second filtered column number $CN_{F2}=1$, and provides the selected second filtered content as third filtered content.

In an embodiment, Data Filter Circuit 504 provides third records $R_{F3}$ of third filtered content. In an embodiment, a number of third records $R_{F3}$ of third filtered content is equal to the number of second filtered content that matches the specified Second Match Value ($NM_{F2}$). In an embodiment, each third record $R_{F3}$ includes second filtered content selected from a corresponding one of the matching second records $R_{F2}$. FIG. 4H depicts the third filtered content and corresponding third records $R_{F3}$ and third filtered column numbers $CN_{F3}$ for the example described above.

In an embodiment, each third record $R_{F3}$ includes $NC_{F3}$ third filtered columns, and each third filtered column includes $NM_{F2}$ third filtered cells. In an embodiment, Data Filter Circuit 504 provides a fourth amount of third filtered content that includes an eleventh number ($NE_{F3}$) of third filtered cells, where $NE_{F3}=(NM_{F2} \times NC_{F3})$. In embodiments, the eleventh number of third filtered cells is less than the eighth number of second filtered cells (i.e., $NE_{F3}<NE_{F2}$).

In an embodiment, Data Filter Circuit 504 provides $NM_{F2}=2$ third records $R_{F3}$ of third filtered content, where each third record $R_{F3}$ includes second filtered content from the same second record $R_{F2}$ as the matching second filtered content. In this example, the third filtered content is "8" and "42". FIG. 4H depicts the third filtered content for this example.

In an embodiment, Data Filter Circuit 504 may include circuitry that is configured to perform various math functions such as counting, summing, etc., the third filtered content. For example, Data Filter Circuit 504 may include a summing circuit that may add the values of the third filtered content. In an embodiment, Data Filter Circuit 504 may include a metadata computation block.

In an embodiment, the metadata block is configured to compute assist data such as a number of rows selected, a number of cells selected, a sum of numerical data, or other similar assist data. In some embodiments, such as determining a sum of a data column, the metadata computation block functions as a 100% data reduction block and only the desired result is provided to host device 102 without needing any further processing.

Continuing the example from above, in an embodiment Data Filter Circuit 504 may add third filtered content 8+42=50, and may provide the result to host device 102. The resulting sum requires two bytes of data to be transferred to host device 102. Host device 102 may then divide the received sum (50) by the number of days (e.g., 6) covered in the example CSV file of FIG. 4A to provide the resulting average: 8.33.

In an embodiment, the output of Data Filter Circuit 504 is provided directly to host device 102 for final filtering. In other embodiments, the output of Data Filter 504 is provided as input to an optional data processor (e.g., a CPU) in controller 104 that can perform final filtering and provide the completed result to host device 102.

In the simple example described above, hardware accelerator circuit 122 received a first amount of input data (79 bytes), implemented filtering operations on the first amount of input data, and provided as output to host device 102 a second amount of output data (2 bytes). Thus, this simple example demonstrated that hardware accelerator circuit 122 reduced the amount of data required to be transferred to host device 102 to perform the search function.

In an embodiment, Data Filter Circuit 504 receives the third amount of second filtered content at the third data rate less than the second data rate, implements a third filter operation on the received second filtered content at the third data rate, and provides a fourth amount of third filtered content (data) less than the third amount of second filtered content at the third data rate.

In an embodiment, Column Filter Circuit 500, Row Filter Circuit 502 and Data Filter Circuit 504 can collectively keep up with the data rate from an SSD, such as memory system 100. In an embodiment, Column Filter Circuit 500 operates at the first data rate, Row Filter Circuit 502 operates at the second data rate that is lower than the first data rate, and Data Filter Circuit 504 operates at the third data rate lower than the second data rate. In an embodiment, the first data rate is substantially the same as the data rate from an SSD, such as memory system 100.

In an embodiment, Row Filter Circuit 502 is configured to perform more complex filtering functionality than Column Filter Circuit 500. In an embodiment, Data Filter Circuit 504 is configured to perform more complex filtering functionality than Row Filter Circuit 502.

In embodiment, a memory controller (e.g., memory controller 104 of FIG. 1) receives filter parameters from a host device (e.g., host device 102 of FIG. 1). In an embodiment, the filter parameters includes the first filtering criteria, second filtering criteria and third filtering criteria described above. In an embodiment, hardware accelerator circuit 122 receives the first amount of input data and the filter parameters from memory controller 104. In an embodiment, hardware accelerator circuit 122 filters the first amount of input data in accordance with the filter parameters to provide the second amount of output data.

Figure 6A:
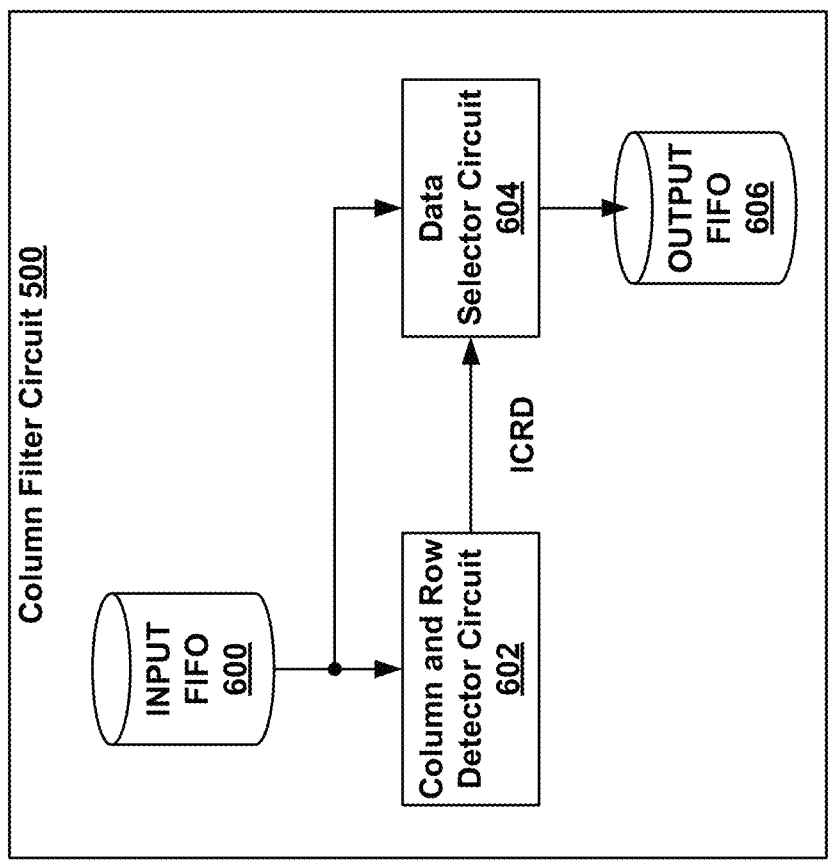
FIG. 6A is a diagram depicting an embodiment of a Column Filter Circuit.

In the following description, example embodiments of Column Filter Circuit 500, Row Filter Circuit 502 and Data Filter Circuit 504 are described. FIG. 6A is a diagram depicting an embodiment of a Column Filter Circuit 500 of FIG. 5. Column Filter Circuit 500 includes an Input FIFO Circuit 600, a Column and Row Detector Circuit 602, a Data Selector Circuit 604, and an Output FIFO Circuit 606.

In an embodiment, Input FIFO Circuit 600, Column and Row Detector Circuit 602, Data Selector Circuit 604, and Output FIFO Circuit 606 each are electrical circuits. In other embodiments, Column Filter Circuit 500 may include circuits in addition to or other than the example circuits depicted in FIG. 6A.

In an embodiment, Input FIFO Circuit 600 has an output terminal coupled to an input terminal of Column and Row Detector Circuit 602 and to a first input terminal of Data Selector Circuit 604. In an embodiment, Column and Row Detector Circuit 602 provides at an output terminal Identified Column and Row Data (ICRD) at a second input terminal of Data Selector Circuit 604. In an embodiment, Data Selector Circuit 604 has an output terminal coupled to an input terminal of Output FIFO Circuit 606.

In an embodiment, Input FIFO Circuit 600 receives an input byte stream to be filtered (e.g., the example byte stream of FIG. 4B). As described above, in an embodiment each byte in the input byte stream is one of a regular symbol, a column delimiter symbol, a row delimiter symbol, or an ignore symbol.

In an embodiment, Input FIFO Circuit 600 is a buffer that stores data read from one or more memory die 106 of FIG. 1. For example, Input FIFO Circuit 600 may have a width W of one byte and a depth of 32 bytes, such as depicted in the example of FIG. 4B. In other embodiments, Input FIFO Circuit 600 may have a depth greater than or less than 32 bytes. In an embodiment, Column and Row Detector Circuit 602 receives the input byte stream from Input FIFO Circuit 600 at the first data rate. Persons of ordinary skill in the art will understand that Input FIFO Circuit 600 alternatively may have a width W greater than one byte, and that Column Filter Circuit 500 may be configured to simultaneously process multiple bytes in parallel (e.g., W bytes in parallel).

In an embodiment, Column and Row Detector Circuit 602 receives one or more column delimiter symbols, one or more row delimiter symbols, and one or more ignore symbols that are used to identify column delimiter symbols, row delimiter symbols, and ignore symbols in the input bytes. For example, host device 102 of FIG. 1 may provide Column and Row Detector Circuit 602 with the one or more column delimiter symbols, one or more row delimiter symbols, and one or more ignore symbols.

In an embodiment, Column and Row Detector Circuit 602 searches the input byte stream for column delimiter symbols and row delimiter symbols to identify $NC_I$ input columns and $NR_I$ input rows. In an embodiment, Column and Row Detector Circuit 602 associates a corresponding input column number $CN_I$ with each identified input column in each identified row. In an embodiment, each identified input row includes a same number of columns (i.e., $NC_I$ columns), and Column and Row Detector Circuit 602 associates the same input column number $CN_I$ with the same identified input column in each identified row.

In an embodiment, Column and Row Detector Circuit 602 begins at input column number $CN_I=0$, although another number may be used. FIG. 4C depicts example input column numbers $CN_I$ associated with corresponding identified input columns from the example byte stream of FIG. 4B. In an embodiment, each identified input column in each identified input row has a corresponding start byte and byte width.

In an embodiment, Column and Row Detector Circuit 602 determines the start byte and byte width of each identified input column in each identified input row. In an embodiment, Column and Row Detector Circuit 602 associates the corresponding start byte and byte width of each identified input column with the corresponding input column number $CN_I$ associated with the identified input column. FIG. 4E depicts corresponding input column number $CN_I$, start byte and byte width associated with each input column of the example byte stream of FIG. 4B and the example table of FIG. 4D.

In an embodiment, Column and Row Detector Circuit 602 generates a row start detected (RSD) signal to indicate the start of each identified row in the input byte stream. In an embodiment, Column and Row Detector Circuit 602 provides Data Selector Circuit 604 with Identified Column and Row Data.

In an embodiment, Identified Column and Row Data includes the RSD signal, and corresponding input column numbers $CN_I$, start bytes and byte widths associated with each identified input column. Persons of ordinary skill in the art will understand that Identified Column and Row Data may include information in addition to or other than the RSD signal, and corresponding input column numbers $CN_I$, start bytes and byte widths associated with each identified input column.

In an embodiment, Data Selector Circuit 604 receives an input byte stream from Input FIFO Circuit 600 at the first data rate. In an embodiment, Data Selector Circuit 604 receives (e.g., from host device 102 of FIG. 1) first filtering criteria that specifies the content to be selected from the input byte stream and provided to Output FIFO Circuit 606.

In an embodiment, the first filtering criteria includes $NC_D$ desired input column numbers $CN_D$ that specify the identified input columns whose content is to be selected from the input byte stream and provided to Output FIFO Circuit 606. In an embodiment, Output FIFO Circuit 606 is a buffer that stores data received from Data Selector Circuit 604.

In an embodiment, Data Selector Circuit 604 filters the input content by selecting input content of the identified input columns associated with input column numbers $CN_I$ that match the desired input column numbers $CN_D$. In embodiments in which the number of desired input column numbers $NC_D$ is less than the number of input columns $NC_I$, Data Selector Circuit 604 reduces the amount of data provided to Output FIFO Circuit 606.

Using the example described above, Column and Row Detector Circuit 602 receives as an input byte stream the example byte stream of FIG. 4B that includes $NC_I=4$ input columns. In an embodiment, host device 102 provides first filtering criteria to Column and Row Detector Circuit 602. In this example, the first filtering criteria includes $NC_D=3$ desired input column numbers $CN_D$ (e.g., $CN_D=0, 2, 3$) (corresponding to US state, airline code and number of cancelled flights).

In an embodiment, Column and Row Detector Circuit 602 identifies input columns and input rows in the received input byte stream, and associates an input column number (e.g., $CN_I=0, 1, 2, 3$) with each identified input column. In an embodiment, Column and Row Detector Circuit 602 determines for each identified input row a corresponding start byte and byte width of each identified input column, and associates the corresponding start byte and byte width with the associated column number $CN_I$, such as the information included in FIG. 4E.

In an embodiment, Data Selector Circuit 604 uses the Identified Column and Row Data provided by Column and Row Detector Circuit 602 to filter the content of the input byte stream. In an embodiment, Data Selector Circuit 604 selects content of the identified input columns associated with input column numbers $CN_I=0, 1, 2, 3$ that match desired input column numbers $CN_D=0, 2, 3$, and provides the selected content as first filtered content to Output FIFO Circuit 606.

Thus, in the example described above, Data Selector Circuit 604 selects the content of the identified input columns associated with input column numbers $CN_I=0, 2, 3$, and provides the selected content as first filtered content to Output FIFO Circuit 606 at the first data rate.

In an embodiment, Data Selector Circuit 604 provides first filtered columns of the selected input content. In an embodiment, Data Selector Circuit 604 associates the first filtered columns of the selected input content with corresponding first filtered column numbers $CN_{F1}$, and provides the selected input content as first filtered content to Output FIFO Circuit 606.

In an embodiment, Data Selector Circuit 604 provides the first filtered content and corresponding first filtered column numbers $CN_{F1}$ to Output FIFO Circuit 606. In an embodiment, Data Selector Circuit 604 provides $NR_I$ first records $R_{F1}$ of first filtered content to Output FIFO Circuit 606. FIG. 4F depicts the first filtered content and corresponding first filtered column numbers $CN_{F1}$ for the example described above.

Figure 6B:
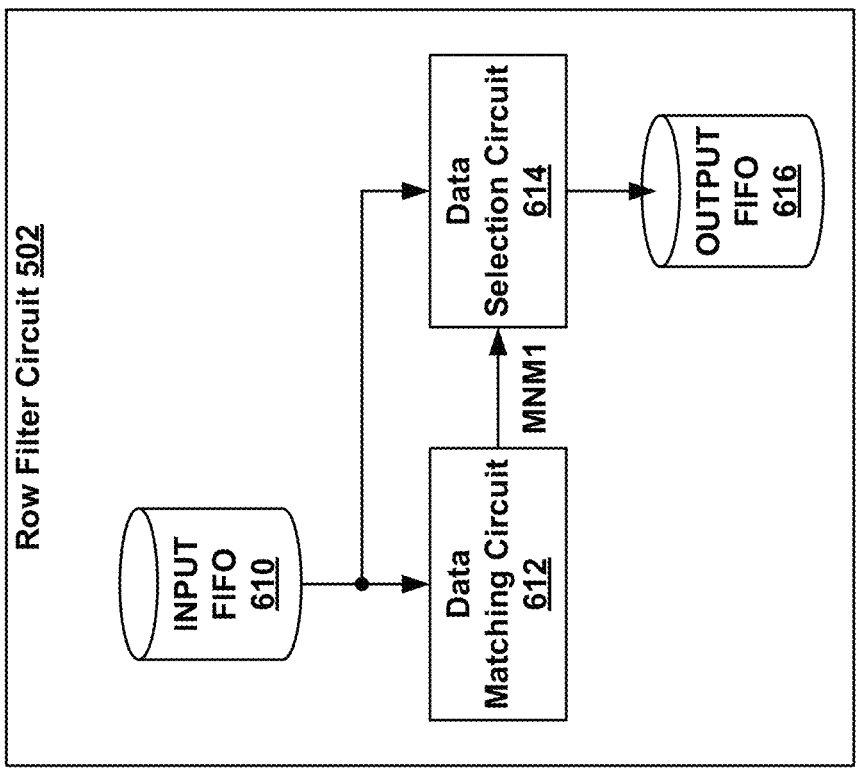
FIG. 6B is a diagram depicting an embodiment of a Row Filter Circuit.

FIG. 6B is a diagram depicting an embodiment of a Row Filter Circuit 502 of FIG. 5. Row Filter Circuit 602 includes an Input FIFO Circuit 610, a Data Matching Circuit 612, a Data Selection Circuit 614, and an Output FIFO Circuit 616. In an embodiment, Input FIFO Circuit 610, Data Matching Circuit 612, Data Selection Circuit 614, and Output FIFO Circuit 616 each are electrical circuits. In other embodiments, Row Filter Circuit 502 may include circuits in addition to or other than the example circuits depicted in FIG. 6B.

In an embodiment, Input FIFO Circuit 610 has an output terminal coupled to an input terminal of Data Matching Circuit 612 and to a first input terminal of Data Selection Circuit 614. In an embodiment, Data Matching Circuit 612 provides at an output terminal a first sequence MNM1 at a second input terminal of Data Selection Circuit 614. In an embodiment, Data Selection Circuit 614 has an output terminal coupled to an input terminal of Output FIFO Circuit 606.

In an embodiment, Input FIFO Circuit 610 is a buffer that stores first filtered content received from Output FIFO Circuit 606 of Column Filter Circuit 500. As described above, Data Selector Circuit 604 provides first filtered content to Output FIFO Circuit 606 at the first data rate. In an embodiment, Data Matching Circuit 612 receives first filtered content from Input FIFO Circuit 610 at the second data rate lower than the first data rate.

In an embodiment, Data Matching Circuit 612 also receives (e.g., from host device 102 of FIG. 1) second filtering criteria that specifies the content to be selected from the first filtered content and provided to Data Filter Circuit 504. In an embodiment, the second filtering criteria includes a specified first filtered column number $CN_{S1}$ and a corresponding specified First Match Value. Persons of ordinary skill in the art will understand that second filtering criteria may include additional or different criteria, such as a match length that specifies a length (e.g., number of bytes), a content type (e.g., string, integer, float, etc.) of the first filtered content to be matched.

In an embodiment, Data Matching Circuit 612 receives $NR_I$ first records $R_{F1}$ of first filtered content and corresponding first filtered column numbers $CN_{F1}$ from Input FIFO 610. In an embodiment, Data Matching Circuit 612 determines for each received first filtered content if the corresponding first filtered column number $CN_{F1}$ equals the specified first filtered column number $CN_{S1}$.

In an embodiment, if Data Matching Circuit 612 determines that the corresponding first filtered column number $CN_{F1}$ equals the specified first filtered column number $CN_{S1}$, Data Matching Circuit 612 determines if the received first filtered content equals the specified First Match Value. In an embodiment, Data Matching Circuit 612 provides a first sequence MNM1 indicating the match results.

In an embodiment, MNM1 is a binary sequence with one bit for each corresponding first filtered content, with a bit value of 1 for each first filtered content that matches the specified First Match Value, and a bit value of 0 for each first filtered content that does not match the specified First Match Value. In an embodiment, MNM1 also has a bit value of 0 if Data Matching Circuit 612 determines that the corresponding first filtered column number $CN_{F1}$ does not equal the specified first filtered column number $CN_{S1}$.

In an embodiment, Data Selection Circuit 614 receives $NR_I$ first records $R_{F1}$ of first filtered content and corresponding first filtered column numbers $CN_{F1}$ from Input FIFO 610, and also receives first sequence MNM1 of data matching results from Data Matching Circuit 612. In an embodiment, based on the bit values of first sequence MNM1, for each matching first record $R_{F1}$, Data Selection Circuit 614 selects the first filtered content from all first filtered columns associated with first filtered column numbers $CN_{F1}$ other than the specified first filtered column number $CN_{S1}$.

In an embodiment, Data Selection Circuit 614 provides the selected first filtered content as second filtered content to Output FIFO 616. In an embodiment, Data Selection Circuit 614 provides second filtered columns of second filtered content to Output FIFO 616. In an embodiment, Data Selection Circuit 614 associates the second filtered columns of second filtered content with corresponding second filtered column numbers $CN_{F2}$, and provides the second filtered content and corresponding second filtered column numbers $CN_{F2}$ to Output FIFO 616.

In an embodiment, Data Selection Circuit 614 provides second records $R_{F2}$ of second filtered content to Output FIFO 616. In an embodiment, a number of second records $R_{F2}$ of second filtered content is equal to the number of first filtered content that matches the specified First Match Value ($NM_{F1}$). In an embodiment, each second record $R_{F2}$ includes second filtered content selected from a corresponding one of the matching first records $R_{F1}$.

Figure 6C:
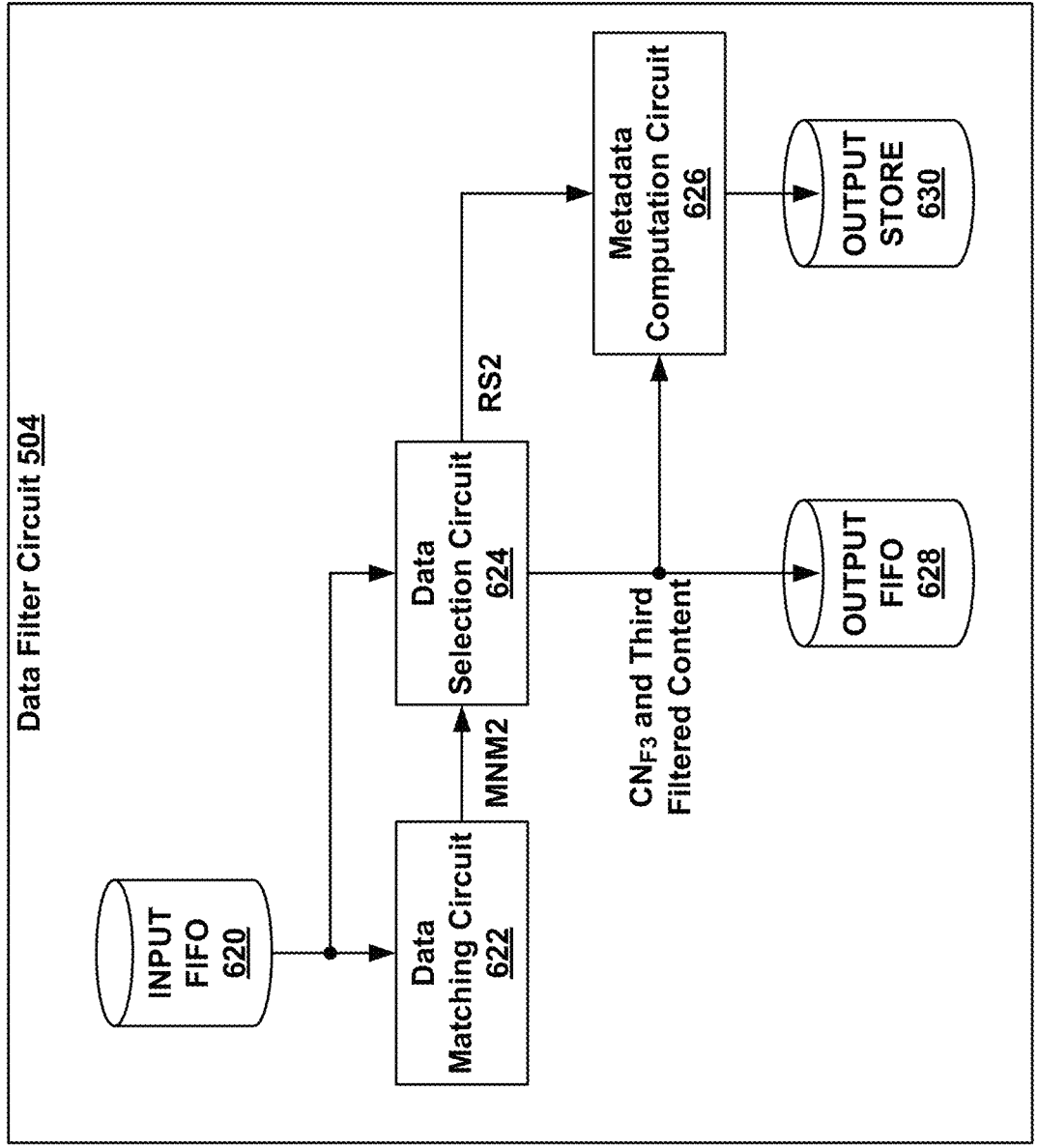
FIG. 6C is a diagram depicting an embodiment of a Data Filter Circuit.

FIG. 6C is a diagram depicting an embodiment of a Data Filter Circuit 504 of FIG. 5. Data Filter Circuit 504 includes an Input FIFO Circuit 620, a Data Matching Circuit 622, a Data Selection Circuit 624, a Metadata Computation Circuit 626, an Output FIFO Circuit 628 and an Output Store Circuit 630. In an embodiment, Input FIFO Circuit 620, Data Matching Circuit 622, Data Selection Circuit 624, Metadata Computation Circuit 626, Output FIFO Circuit 628 and Output Store Circuit 630 each are electrical circuits. In other embodiments, Data Filter Circuit 504 may include circuits in addition to or other than the example circuits depicted in FIG. 6C.

In an embodiment, Input FIFO Circuit 620 has an output terminal coupled to an input terminal of Data Matching Circuit 622 and to a first input terminal of Data Selection Circuit 624. In an embodiment, Data Matching Circuit 622 provides at an output terminal a second sequence MNM2 at a second input terminal of Data Selection Circuit 624.

In an embodiment, Data Selection Circuit 624 has a first output terminal coupled to an input terminal of Output FIFO Circuit 628, and to an input terminal of Metadata Computation Circuit 626. In an embodiment, Data Selection Circuit 624 also provides control signal RS2 to Metadata Computation Circuit 626.

In an embodiment, Input FIFO Circuit 620 is a buffer that stores second filtered content received from Output FIFO Circuit 616 of Row Filter Circuit 502. In an embodiment, Data Selector Circuit 614 provides second filtered content to Output FIFO Circuit 616 at the second data rate. In an embodiment, Data Matching Circuit 612 receives second filtered content from Input FIFO Circuit 620 at the third data rate lower than the second data rate.

In an embodiment, Data Matching Circuit 622 also receives (e.g., from host device 102 of FIG. 1) third filtering criteria that specifies the content to be selected from the second filtered content and provided to Output FIFO 628. In an embodiment, the third filtering criteria includes a specified second filtered column number $CN_{S2}$ and a corresponding specified Second Match Value. Persons of ordinary skill in the art will understand that third filtering criteria may include additional or different criteria, such as a match length that specifies a length (e.g., number of bytes), a content type (e.g., string, integer, float, etc.) of the second filtered content to be matched.

In an embodiment, Data Matching Circuit 622 receives $NM_{F1}$ second records $R_{F2}$ of second filtered content and corresponding second filtered column numbers $CN_{F2}$ from Input FIFO 620. In an embodiment, Data Matching Circuit 612 determines for each received second filtered content if the corresponding second filtered column number $CN_{F2}$ equals the specified second filtered column number $CN_{S2}$.

In an embodiment, if Data Matching Circuit 622 determines that the corresponding second filtered column number $CN_{F2}$ equals the specified second filtered column number $CN_{S2}$, Data Matching Circuit 622 determines if the received second filtered content equals the specified Second Match Value. In an embodiment, Data Matching Circuit 622 provides a second sequence MNM2 indicating the match results.

In an embodiment, MNM2 is a binary sequence with one bit for each corresponding second filtered content, with a bit value of 1 for each second filtered content that matches the specified Second Match Value, and a bit value of 0 for each second filtered content that does not match the specified Second Match Value. In an embodiment, MNM2 also has a bit value of 0 if Data Matching Circuit 622 determines that the corresponding second filtered column number $CN_{F2}$ does not equal the specified second filtered column number $CN_{S2}$.

In an embodiment, Data Selection Circuit 624 receives $NM_{F1}$ second records $R_{F2}$ of second filtered content and corresponding second filtered column numbers $CN_{F2}$ from Input FIFO 620, and also receives second sequence MNM2 of data matching results from Data Matching Circuit 622. In an embodiment, based on the bit values of second sequence MNM2, for each matching second record $R_{F2}$, Data Selection Circuit 624 selects the second filtered content from all second filtered columns associated with second filtered column numbers $CN_{F2}$ other than the specified second filtered column number $CN_{S2}$.

In an embodiment, Data Selection Circuit 624 generates control signal RS2 that has a value of 1 only for second filtered content that is associated with second filtered column numbers $CN_{F2}=0$, and that have a value that matches the specified Second Match Value, and otherwise has a value of 0. In an embodiment, Data Selection Circuit 624 provides control signal RS2 to Metadata Computation Circuit 624.

In an embodiment, Data Selection Circuit 624 provides the selected second filtered content as third filtered content to Output FIFO 628. In an embodiment, Data Selection Circuit 624 associates the third filtered content with corresponding third filtered column numbers $CN_{F3}$, and provides the third filtered content and corresponding third filtered column numbers $CN_{F3}$ to Output FIFO 628 and Metadata Computation Circuit 626.

In an embodiment, Data Selection Circuit 624 provides third records $R_{F3}$ of third filtered content to Output FIFO 628. In an embodiment, a number of third records $R_{F3}$ of third filtered content is equal to the number of second filtered content that matches the specified Second Match Value ($NM_{F2}$). In an embodiment, each third record $R_{F3}$ includes second filtered content selected from a corresponding one of the matching second records $R_{F2}$.

In an embodiment, Metadata Computation Circuit 626 receives third filtered column numbers $CN_{F3}$ and third records $R_{F3}$ of third filtered content and control signal RS2 from Data Selection Circuit 624, and has an output terminal coupled to an input terminal of Output Store 630.

In an embodiment, Metadata Computation Circuit 626 receives (e.g., from host device 102 of FIG. 1) with desired third filtered content numbers $CND_{F3}$ that specify the third filtered content on which various metadata may be determined. In an embodiment, Metadata Computation Circuit 626 determines if the received third filtered column numbers $CN_{F3}$ match the desired third filtered content numbers $CND_{F3}$.

In an embodiment, if the received third filtered column numbers $CN_{F3}$ matches the desired third filtered content numbers $CND_{F3}$, Metadata Computation Circuit 626 Compare Block 772 provides the corresponding third filtered content to any of a variety of different functions, such as a hash function, a summation function, or other similar function. In other embodiments, Metadata Computation Circuit 626 may calculate a number of third filtered content by summing the bits in signal RS2.

In the following description, an example embodiment of Column and Row Detector Circuit 602 of FIG. 6A is described. FIG. 7A1 is a simplified block diagram of an embodiment of Column and Row Detector Circuit 602 of FIG. 6A. The embodiment of Column and Row Detector Circuit 602 of FIG. 7A1 is configured to process an input byte stream of data. As described above, in an embodiment each input byte is one of a regular symbol, a column delimiter symbol, a row delimiter symbol, or an ignore symbol. A person of ordinary skill in the art will understand that Column and Row Detector Circuit 602 also can configured to process multiple bytes in parallel.

In an embodiment Column and Row Detector Circuit 602 of FIG. 7A1 receives an input byte stream from Input FIFO Circuit 600 of FIG. 6A, searches the input byte stream for row delimiter symbols to identify $NR_I$ input rows, and searches the input byte stream for column delimiter symbols to identify $NC_I$ input columns in each identified row. In an embodiment, each identified row has a same number of identified input columns (i.e., $NC_I$ columns), and Column and Row Detector Circuit 602 associates a corresponding input column number $CN_I$ with each identified input column.

In an embodiment, Column and Row Detector Circuit 602 also determines a corresponding start byte and byte width for each identified input column of each identified row. In an embodiment, Column and Row Detector Circuit 602 associates the corresponding input column number $CN_I$ with the determined start byte and determined byte width for each identified input column of each identified row. In an embodiment, Column and Row Detector Circuit 602 also generates the RSD signal to indicate the start of each identified row in the input byte stream.

In an embodiment, Column and Row Detector Circuit 602 provides Data Selector Circuit 604 of FIG. 6A with Identified Column and Row Data that includes the RSD signal, and corresponding input column numbers $CN_I$, start bytes and byte widths associated with each identified input column.

Column and Row Detector Circuit 602 includes Compare Blocks 700a, 702 and 704 and a Byte Counter 706, each having a first input terminal coupled to receive an input byte stream from Input FIFO Circuit 600 of FIG. 6A. Compare Block 700a has a second input terminal coupled to an Ignore Symbol Store 708, Compare Block 702 has a second input terminal coupled to a Row Delimiter Store 710, and Compare Block 704 has a second input terminal coupled to a Column Delimiter Store 712.

Compare Block 700*a* has an output terminal coupled to an input terminal of an ignore toggle block 700*b*, which has an output terminal coupled to a first input terminal of each of NAND gates 714*a* and 714*b*. Compare Block 702 has an output terminal coupled to a second input terminal of NAND gate 714*a*, and Compare Block 704 has an output terminal coupled to a second input terminal of NAND gate 714*b*.

NAND gate 714*a* generates an RSD signal at an output terminal that is coupled to a first input terminal of an OR gate 716, and a reset terminal of an Input Column Counter 718. NAND gate 714*b* generates a signal CSD at an output terminal that is coupled to a second input terminal of OR gate 716, and an input terminal of Input Column Counter 718, which has an output terminal coupled to an input terminal of an input column number $CN_I$ Register 720. OR gate 716 generates a signal TR at an output terminal that is coupled to an input terminal of an Edge Detector 722, which has an output terminal coupled to a control terminal of a DEMUX 724.

Byte Counter 706 provides an output signal $BC_a$ at an output terminal coupled to an input terminal of DEMUX 724. DEMUX 724 has a first output terminal coupled to an input terminal of Start Byte Register 726, and a second output terminal coupled to a positive input terminal of a Summing Circuit 728. Summing Circuit 728 has a negative input terminal coupled to an output terminal of Start Byte Register 726, and an output terminal coupled to an input terminal of Byte Width Register 730.

In an embodiment, Ignore Symbol Store 708, Row Delimiter Store 710, and Column Delimiter Store 712 each constitute a memory that stores one or more ignore symbols, row delimiter symbols, and column delimiter symbols, respectively. For example, Ignore Symbol Store 708, Row Delimiter Store 710, and Column Delimiter Store 712 each may constitute local memory in Column and Row Detector Circuit 602.

In an embodiment, Ignore Symbol Store 708, Row Delimiter Store 708, and Column Delimiter Store 712 are separate memories, or may be a single memory. In an embodiment, a host device (e.g., host device 102 of FIG. 1) loads Ignore Symbol Store 708, Row Delimiter Store 710 and Column Delimiter Store 712 with one or more predetermined ignore symbols, row delimiter symbols, and column delimiter symbols, respectively.

In an embodiment, each regular symbol, column delimiter symbol, row delimiter symbol, and ignore symbol is a single-byte symbol. In the example described below, host device 102 loads Ignore Symbol Store 708, Row Delimiter Store 710 and Column Delimiter Store 712 with a double quote symbol ("), a carriage return symbol (\r) and a comma symbol (,), respectively. Persons of ordinary skill in the art will understand that host device 102 may load additional and/or different symbols into Ignore Symbol Store 708, Row Delimiter Store 710 and Column Delimiter Store 712. Persons of ordinary skill in the art will understand that in other embodiments each regular symbol, column delimiter symbol, row delimiter symbol, and ignore symbol may be a multi-byte symbol (e.g., a UTF-encoded symbol).

In an embodiment, each of Compare Blocks 700*a*-704, ignore toggle block 700*b*, Byte Counter 706, Input Column Counter 718, input column number $CN_I$ Register 720, Edge Detector 722, DEMUX 724, Start Byte Register 726 and Byte Width Register 730 are coupled to an input clock signal (not shown). In an embodiment, on each cycle of the input clock signal, Compare Blocks 700*a*-704, ignore toggle block 700*b*, Byte Counter 706, Input Column Counter 718, input column number $CN_I$ Register 720, Edge Detector 722, DEMUX 724, Start Byte Register 726 and Byte Width Register 730 operate one byte at a time on each byte of the input byte stream received from Input FIFO Circuit 600.

In an embodiment, Compare Block 700*a* performs a byte-wise comparison between each byte of the input byte stream received from Input FIFO Circuit 600 and the one or more ignore symbols stored in Ignore Symbol Store 708. In an embodiment, Compare Block 700*a* provides a first output value (e.g., 1 or HIGH) for each input byte that matches one or more ignore symbols, and provides a second output value (e.g., 0 or LOW) for each input byte that does not match one or more ignore symbols. In other words, the output terminal of Compare Block 700*a* is HIGH for each input byte that is an ignore symbol, and is LOW for each input byte that is a regular symbol, a column delimiter symbol or a row delimiter symbol.

In an embodiment, ignore toggle block 700*b* provides an output signal IG that has either a first value (e.g., 1 or HIGH) or a second value (e.g., 0 or LOW). In an embodiment, each time the output of Compare Block 700*a* is HIGH (i.e., when Compare Block 700*a* detects a byte that matches an ignore symbol) signal IG toggles (e.g., changes from HIGH to LOW, or from LOW to HIGH). In an embodiment, on startup or reset ignore toggle block 700*b* is initialized so that signal IG is HIGH. To simplify the discussion, unless otherwise stated the following text assumes that the input byte stream does not contain any ignore symbols and thus signal IG is HIGH.

In an embodiment, Compare Block 702 performs a byte-wise comparison between each byte of the input byte stream received from Input FIFO Circuit 600 and the one or more row delimiter symbols stored in Row Delimiter Store 710. In an embodiment, Compare Block 702 provides a first output value (e.g., 1 or HIGH) for each input byte that matches one or more row delimiter symbols, and provides a second output value (e.g., 0 or LOW) for each input byte that does not match one or more row delimiter symbols. In other words, the output terminal of Compare Block 702 is HIGH for each input byte that is a row delimiter symbol, and is LOW for each input byte that is a regular symbol, a column delimiter symbol or an ignore symbol.

In an embodiment, Compare Block 704 performs a byte-wise comparison between each byte of the input byte stream received from Input FIFO Circuit 600 and the one or more column delimiter symbols stored in Column Delimiter Store 712. In an embodiment, Compare Block 704 provides a first output value (e.g., 0 or LOW) for each input byte that does not match one or more column delimiter symbols, and provides a second output value (e.g., 1 or HIGH) for each input byte that matches one or more column delimiter symbols. In other words, the output terminal of Compare Block 704 is HIGH for each input byte that is a column delimiter symbol, and is LOW for each input byte that is a regular symbol, a row delimiter symbol or an ignore symbol.

As discussed above, the following text assumes that the input byte stream does not contain any ignore symbols, and thus signal IG is always HIGH. Thus, in an embodiment the output of NAND gate 714*a* (RSD signal) has a first value (e.g., 1 or HIGH) for each input byte that is a row delimiter symbol, and has a second value (e.g., 0 or LOW) for each input byte that is regular symbol or a column delimiter symbol. In an embodiment, the output of NAND gate 714*b* (signal CSD) has a first value (e.g., 1 or HIGH) for each input byte that is a column delimiter symbol, and has a second value (e.g., 0 or LOW) for each input byte that is a regular symbol or a row delimiter symbol.

In an embodiment, on startup or reset Byte Counter 706 is initialized to $BC_a=0$, and increments by 1 for each byte of the input byte stream received from Input FIFO Circuit 600. In other words, $BC_a$ is the current byte number being processed by Column and Row Detector Circuit 602. In other embodiments, Byte Counter 706 may be initialized to some other value, e.g., $BC_a=1$ or some other initial value.

In an embodiment, OR gate 716 provides an output signal TR that has a first value (e.g., 1 or HIGH) for each input byte that is a row delimiter symbol or a column delimiter symbol, and has a second value (e.g., 0 or LOW) for each input byte that is a regular symbol. Thus, when a row delimiter symbol or a column delimiter symbol follows a regular symbol, signal TR will transition from LOW to HIGH. Conversely, when a regular symbol follows a row delimiter symbol or a column delimiter symbol, signal TR will transition from HIGH to LOW.

In an embodiment, Input Column Counter 718 determines an associated input column number $CN_I$ for each identified input column in the input byte stream. In an embodiment, on startup or reset Input Column Counter 718 is initialized to 0, and increments by one when the output of NAND gate 714b (signal CSD) is HIGH. In other embodiments, Input Column Counter 718 may be initialized to some other value, e.g., 1 or some other initial value. In an embodiment, Input Column Counter 718 resets to 0 when the output of NAND gate 714a (RSD signal) is HIGH.

In other words, Input Column Counter 718 increments by one for each input byte that is a column delimiter symbol, and resets to 0 for each input byte that is a row delimiter symbol. Thus, the input column count always begins at input column number $CN_I=0$, and increments by one each time Compare Block 704 detects a column delimiter symbol in the input byte stream.

In an embodiment, Edge Detector 722 generates a first output signal (e.g., 1 or +HIGH) for one half clock cycle on each transition of signal TR from LOW to HIGH (e.g., when a row delimiter symbol or a column delimiter symbol follows a regular symbol), and generates a second output signal (e.g., −1 or −HIGH) for one half clock cycle each time signal TR transitions from HIGH to LOW (e.g., when a regular symbol follows a row delimiter symbol or a column delimiter symbol). In an embodiment, Edge Detector 722 otherwise generates a third output signal (e.g., 0).

In other words, the output of Edge Detector 722 is normally 0, but goes +HIGH on each rising edge (RE) of signal TR, and goes −HIGH on each falling edge (FE) of signal TR. In an embodiment, on the falling edge of signal TR input column number $CN_I$ Register 720 is loaded with the current count stored in Input Column Counter 718.

In an embodiment, the output of Edge Detector 722 controls DEMUX 724. In an embodiment, when the output of Edge Detector 722 is 0, DEMUX 724 provides no output to Start Byte Register 726 or Summing Circuit 728. In an embodiment, on the falling edge of signal TR, the output of Edge Detector 722 is −HIGH and DEMUX 724 will pass current byte number $BC_a$ of Byte Counter 706 to Start Byte Register 726.

In other words, the current byte count corresponding to a regular symbol that follows a row delimiter symbol or a column delimiter symbol will be loaded into Start Byte Register 726 as the start byte associated with the input column number $CN_I$ currently stored in input column number $CN_I$ Register 720.

In an embodiment, on the rising edge of signal TR, the output of Edge Detector 722 is +HIGH and DEMUX 724 will pass current byte number $BC_a$ of Byte Counter 706 to Summing Circuit 728, which will subtract the start byte stored in Start Byte Register 726 from the current byte count corresponding to the input byte that is a row delimiter symbol or a column delimiter, and provide the output to Byte Width Register 730.

In other words, when a row delimiter symbol or a column delimiter symbol follows a regular symbol, the byte width associated with the input column number CM currently stored in input column number CM Register 720 is determined by subtracting the start byte from the current byte count, and the result is stored in Byte Width Register 730. A person of ordinary skill would understand that DEMUX 724 alternatively can be replaced with load enables on Start Byte Register 726 and Byte Width Register 730.

In an embodiment, on startup or reset input column number CM Register 720, Start Byte Register 726 and Byte Width Register 730 are each initialized to 0, and signal IG is initialized to HIGH. In an embodiment, byte width register is loaded on the rising edge of signal TR, and input column number $CN_I$ Register 720 and Start Byte Register 726 are loaded on the falling edge of signal TR.

An example operation of Column and Row Detector Circuit 602 will be described with reference to example input byte stream data depicted in FIG. 4B, described above. As described in more detail below, Column and Row Detector Circuit 602 searches the input byte stream for row delimiter symbols to identify input rows, and searches the input byte stream for column delimiter symbols to identify input columns for each identified row.

As described in more detail below, in an embodiment Column and Row Detector Circuit 602 receives an input byte stream, such as the example byte stream of FIG. 4B, generates the RSD signal, and determines corresponding input column numbers $CN_I$, start bytes and byte widths associated with each identified input column of each identified row. In an embodiment, Column and Row Detector Circuit 602 provides Data Selector Circuit 604 with Identified Column and Row Data that includes the generated RSD signal, and the corresponding input column numbers $CN_I$, start bytes and byte widths associated with each identified input column.

In particular, referring again to FIGS. 7A1 and 4B, an example operation of Column and Row Detector Circuit 602 will be described. As previously mentioned, on startup Byte Counter 706, Input Column Counter 718, input column number $CN_I$ Register 720, start byte Register 726 and byte width Register 730 are each initialized to 0, and signal IG is initialized to HIGH.

As also described above, on each cycle of the input clock signal, Compare Blocks 700a-704, ignore toggle block 700b, Byte Counter 706, Input Column Counter 718, input column number $CN_I$ Register 720, Edge Detector 722, DEMUX 724, start byte Register 726 and byte width Register 730 operate one byte at a time on each byte of the input byte stream received from Input FIFO Circuit 600.

In addition, on startup in this example Ignore Symbol Store 708 is loaded with a double quote symbol ("), Row Delimiter Store 710 is loaded with a carriage return symbol (\r), and Column Delimiter Store 712 is loaded with a comma symbol (,). The example byte stream of FIG. 4B does not include any ignore symbols, so in the following description signal IG is always HIGH.

On clock cycle $P_0$ of the input clock signal, Column and Row Detector Circuit 602 operates on byte $B_0$ (symbol P). Byte $B_0$ is not a carriage return symbol or a comma symbol, so the signal at the output terminal of Compare Block 702 is LOW, the signal at the output terminal of Compare Block 704 is LOW, Byte Counter 706 is initialized to a value $BC_a=0$, the RSD signal at the output terminal of NAND gate 714a is LOW, signal CSD at the output terminal of NAND gate 714b is LOW, signal TR at the output terminal of OR gate 716 is LOW. The output of Edge Detector 722 is LOW, and DEMUX 724 does not pass current byte number $BC_a$ of Byte Counter 706. Input column number $CN_I$ Register 720 has a value 0, start byte Register 726 has a value 0, and byte width Register 730 has a value 0. In an embodiment, input column number $CN_I=0$ always has an associated start byte=0.

On clock cycle $P_1$ of the input clock signal, Column and Row Detector Circuit 602 operates on byte $B_1$ (symbol A). Byte $B_1$ is not a carriage return symbol or a comma symbol, so the signal at the output terminal of Compare Block 702 is LOW, the signal at the output terminal of Compare Block 704 is LOW, Byte Counter 706 increments by one to a value of $BC_a=1$, the RSD signal at the output terminal of NAND gate 714a is LOW, signal CSD at the output terminal of NAND gate 714b is LOW, signal TR at the output terminal of OR gate 716 is LOW. The output of Edge Detector 722 is LOW, and DEMUX 724 does not pass current byte number $BC_a$ of Byte Counter 706. Input column number $CN_I$ Register 720 has a value 0, start byte Register 726 has a value 0, and byte width Register 730 has a value 0.

On clock cycle $P_2$ of the input clock signal, Column and Row Detector Circuit 602 operates on byte $B_2$ (symbol ,). Byte $B_2$ is a comma symbol, so the signal at the output terminal of Compare Block 702 is LOW, the signal at the output terminal of Compare Block 704 is HIGH (indicating that a column delimiter has been detected), Byte Counter 706 increments by one to a value of $BC_a=2$, the RSD signal at the output terminal of NAND gate 714a is LOW, signal CSD at the output terminal of NAND gate 714b is HIGH, and signal TR at the output terminal of OR gate 716 goes from LOW to HIGH. Input Column Counter 718 increments by one to a value 1.

Edge Detector 722 detects a rising edge on signal TR and the output of Edge Detector 722 goes +HIGH for one half clock cycle. DEMUX 724 passes current byte number $BC_a$ of Byte Counter 706 ($BC_a=2$) to Summing Circuit 728, which subtracts the value in start byte Register 726 (0) from current byte number $BC_a$ of Byte Counter 706 ($BC_a=2$), and the difference (2−0=2) is loaded in byte width Register 730 as the byte width associated with the column number stored in input column number $CN_I$ Register 720 (0).

Thus, on the rising edge of signal TR, the values stored in input column number $CN_I$ Register 720, start byte Register 726 and byte width Register 730 are (0, 0, 2). These values constitute the corresponding input column number $CN_I$ and associated start byte and byte width for the first identified input column of the first identified row (same as listed in the first row of FIG. 4E).

On clock cycle $P_3$ of the input clock signal, Column and Row Detector Circuit 602 operates on byte $B_3$ (symbol P). Byte $B_3$ is not a carriage return symbol or a comma symbol, so the signal at the output terminal of Compare Block 702 is LOW, the signal at the output terminal of Compare Block 704 is LOW, Byte Counter 706 increments by one to a value of $BC_a=3$, the RSD signal at the output terminal of NAND gate 714a is LOW, signal CSD at the output terminal of NAND gate 714b is LOW, signal TR at the output terminal of OR gate 716 goes from HIGH to LOW.

Edge Detector 722 detects a falling edge on signal TR and the output of Edge Detector 722 goes −HIGH for one half clock cycle. DEMUX 724 passes current byte number $BC_a$ of Byte Counter 706 ($BC_a=3$) which is loaded into start byte Register 726. Also on the falling edge of signal TR, input column number $CN_I$ Register 720 is loaded with the value in Input Column Counter 718 (1). The value in start byte Register 726 (3) is the start byte associated with the column number stored in input column number $CN_I$ Register 720 (1). Byte width Register 730 has a value 2.

On clock cycle $P_4$ of the input clock signal, Column and Row Detector Circuit 602 operates on byte $B_4$ (symbol H). Byte $B_4$ is not a carriage return symbol or a comma symbol, so the signal at the output terminal of Compare Block 702 is LOW, the signal at the output terminal of Compare Block 704 is LOW, Byte Counter 706 increments by one to a value of $BC_a=4$, the RSD signal at the output terminal of NAND gate 714a is LOW, signal CSD at the output terminal of NAND gate 714b is LOW, signal TR at the output terminal of OR gate 716 is LOW. The output of Edge Detector 722 is LOW, and DEMUX 724 does not pass current byte number $BC_a$ of Byte Counter 706. Input column number $CN_I$ Register 720 has a value 1, start byte Register 726 has a value 3, and byte width Register 730 has a value 2.

On clock cycle $P_5$ of the input clock signal, Column and Row Detector Circuit 602 operates on byte $B_5$ (symbol L). Byte $B_5$ is not a carriage return symbol or a comma symbol, so the signal at the output terminal of Compare Block 702 is LOW, the signal at the output terminal of Compare Block 704 is LOW, Byte Counter 706 increments by one to a value of $BC_a=5$, the RSD signal at the output terminal of NAND gate 714a is LOW, signal CSD at the output terminal of NAND gate 714b is LOW, signal TR at the output terminal of OR gate 716 is LOW. The output of Edge Detector 722 is LOW, and DEMUX 724 does not pass current byte number $BC_a$ of Byte Counter 706. Input column number $CN_I$ Register 720 has a value 1, start byte Register 726 has a value 3, and byte width Register 730 has a value 2.

On clock cycle $P_6$ of the input clock signal, Column and Row Detector Circuit 602 operates on byte $B_6$ (symbol ,). Byte $B_6$ is a comma symbol, so the signal at the output terminal of Compare Block 702 is LOW, the signal at the output terminal of Compare Block 704 is HIGH (indicating that a column delimiter has been detected), Byte Counter 706 increments by one to a value of 6, the RSD signal at the output terminal of NAND gate 714a is LOW, signal CSD at the output terminal of NAND gate 714b is HIGH, and signal TR at the output terminal of OR gate 716 goes from LOW to HIGH. Input Column Counter 718 increments by one to a value 2.

Edge Detector 722 detects a rising edge on signal TR and the output of Edge Detector 722 goes +HIGH for one half clock cycle. DEMUX 724 passes current byte number $BC_a$ of Byte Counter 706 ($BC_a=6$) to Summing Circuit 728, which subtracts the value in start byte Register 726 (3) from current byte number $BC_a$ of Byte Counter 706 ($BC_a=6$), and the difference (6−3=3) is loaded in byte width Register 730 as the byte width associated with the input column number $CN_I$ stored in input column number $CN_I$ Register 720 (1).

Thus, on the rising edge of signal TR, the values stored in input column number $CN_I$ Register 720, start byte Register 726 and byte width Register 730 are (1, 3, 3). These values constitute the corresponding input column number $CN_I$ and associated start byte and byte width for the second identified input column of the first identified row (same as listed in the second row of FIG. 4E).

On clock cycle $P_7$ of the input clock signal, Column and Row Detector Circuit 602 operates on byte $B_7$ (symbol A). Byte $B_7$ is not a carriage return symbol or a comma symbol, so the signal at the output terminal of Compare Block 702 is LOW, the signal at the output terminal of Compare Block 704 is LOW, Byte Counter 706 increments by one to a value of $BC_a=7$, the RSD signal at the output terminal of NAND gate 714a is LOW, signal CSD at the output terminal of NAND gate 714b is LOW, signal TR at the output terminal of OR gate 716 goes from HIGH to LOW.

Edge Detector 722 detects a falling edge on signal TR and the output of Edge Detector 722 goes −HIGH for one half clock cycle. DEMUX 724 passes current byte number $BC_a$ of Byte Counter 706 ($BC_a=7$) which is loaded into start byte Register 726. Also on the falling edge of signal TR, input column number $CN_I$ Register 720 is loaded with the value in Input Column Counter 718 (2). The value in start byte Register 726 (7) is the start byte associated with the column number stored in input column number $CN_I$ Register 720 (2). Byte width Register 730 has a value 3.

On clock cycle $P_8$ of the input clock signal, Column and Row Detector Circuit 602 operates on byte $B_8$ (symbol C). Byte $B_8$ is not a carriage return symbol or a comma symbol, so the signal at the output terminal of Compare Block 702 is LOW, the signal at the output terminal of Compare Block 704 is LOW, Byte Counter 706 increments by one to a value of $BC_a=8$, the RSD signal at the output terminal of NAND gate 714a is LOW, signal CSD at the output terminal of NAND gate 714b is LOW, signal TR at the output terminal of OR gate 716 is LOW. The output of Edge Detector 722 is LOW, and DEMUX 724 does not pass current byte number $BC_a$ of Byte Counter 706. Input column number $CN_I$ Register 720 has a value 2, start byte Register 726 has a value 7, and byte width Register 730 has a value 3.

On clock cycle $P_9$ of the input clock signal, Column and Row Detector Circuit 602 operates on byte $B_9$ (symbol ,). Byte $B_9$ is a comma symbol, so the signal at the output terminal of Compare Block 702 is LOW, the signal at the output terminal of Compare Block 704 is HIGH (indicating that a column delimiter has been detected), Byte Counter 706 increments by one to a value of $BC_a=9$, the RSD signal at the output terminal of NAND gate 714a is LOW, signal CSD at the output terminal of NAND gate 714b is HIGH, and signal TR at the output terminal of OR gate 716 goes from LOW to HIGH. Input Column Counter 718 increments by one to a value 3.

Edge Detector 722 detects a rising edge on signal TR and the output of Edge Detector 722 goes +HIGH for one half clock cycle. DEMUX 724 passes current byte number $BC_a$ of Byte Counter 706 ($BC_a=9$) to Summing Circuit 728, which subtracts the value in start byte Register 726 (7) from current byte number $BC_a$ of Byte Counter 706 ($BC_a=9$), and the difference (9−7=2) is loaded in byte width Register 730 as the byte width associated with the column number stored in input column number $CN_I$ Register 720 (2).

Thus, on the rising edge of signal TR, the values stored in input column number $CN_I$ Register 720, start byte Register 726 and byte width Register 730 are (2, 7, 2). These values constitute the corresponding input column number $CN_I$ and associated start byte and byte width for the third identified input column of the first identified row (same as listed in the third row of FIG. 4E).

On clock cycle $P_{10}$ of the input clock signal, Column and Row Detector Circuit 602 operates on byte $B_{10}$ (symbol 1). Byte $B_7$ is not a carriage return symbol or a comma symbol, so the signal at the output terminal of Compare Block 702 is LOW, the signal at the output terminal of Compare Block 704 is LOW, Byte Counter 706 increments by one to a value of $BC_a=10$, the RSD signal at the output terminal of NAND gate 714a is LOW, signal CSD at the output terminal of NAND gate 714b is LOW, signal TR at the output terminal of OR gate 716 goes from HIGH to LOW.

Edge Detector 722 detects a falling edge on signal TR and the output of Edge Detector 722 goes −HIGH for one half clock cycle. DEMUX 724 passes current byte number $BC_a$ of Byte Counter 706 ($BC_a=10$) which is loaded into start byte Register 726. Also on the falling edge of signal TR, input column number $CN_I$ Register 720 is loaded with the value in Input Column Counter 718 (3). The value in start byte Register 726 (10) is the start byte associated with the column number stored in input column number $CN_I$ Register 720 (3). Byte width Register 730 has a value 2.

On clock cycle $P_{11}$ of the input clock signal, Column and Row Detector Circuit 602 operates on byte $B_{11}$ (symbol 3). Byte $B_{11}$ is not a carriage return symbol or a comma symbol, so the signal at the output terminal of Compare Block 702 is LOW, the signal at the output terminal of Compare Block 704 is LOW, Byte Counter 706 increments by one to a value of $BC_a=11$, the RSD signal at the output terminal of NAND gate 714a is LOW, signal CSD at the output terminal of NAND gate 714b is LOW, signal TR at the output terminal of OR gate 716 is LOW. The output of Edge Detector 722 is LOW, and DEMUX 724 does not pass current byte number $BC_a$ of Byte Counter 706. Input column number $CN_I$ Register 720 has a value 3, start byte Register 726 has a value 10, and byte width Register 730 has a value 2.

On clock cycle $P_{12}$ of the input clock signal, Column and Row Detector Circuit 602 operates on byte $B_{12}$ (symbol \r). Byte $B_{12}$ is a carriage return symbol, so the signal at the output terminal of Compare Block 702 is HIGH (indicating that a row delimiter has been detected), the signal at the output terminal of Compare Block 704 is LOW, Byte Counter 706 increments by one to a value of $BC_a=12$, the RSD signal at the output terminal of NAND gate 714a is HIGH, signal CSD at the output terminal of NAND gate 714b is LOW, and signal TR at the output terminal of OR gate 716 goes from LOW to HIGH. Input Column Counter 718 resets to a value 0.

Edge Detector 722 detects a rising edge on signal TR and the output of Edge Detector 722 goes +HIGH for one half clock cycle. DEMUX 724 passes current byte number $BC_a$ of Byte Counter 706 ($BC_a=12$) to Summing Circuit 728, which subtracts the value in start byte Register 726 (10) from current byte number $BC_a$ of Byte Counter 706 ($BC_a=12$), and the difference (12−10=2) is loaded in byte width Register 730 as the byte width associated with the column number stored in input column number $CN_I$ Register 720 (3).

Thus, on the rising edge of signal TR, the values stored in input column number $CN_I$ Register 720, start byte Register 726 and byte width Register 730 are (3, 10, 2). These values constitute the corresponding input column number $CN_I$ and associated start byte and byte width for the fourth identified input column of the first identified row (same as listed in the third row of FIG. 4E). Thus on the thirteenth clock cycle, Column and Row Detector Circuit 602 has completed detecting input column numbers $CN_I=0-3$ of the first identified row (corresponding to row $r_0$ in FIG. 4C) of data.

On clock cycle $P_{13}$ of the input clock signal, Column and Row Detector Circuit 602 operates on byte $B_{13}$ (symbol C), which is the first byte of the next row (corresponding to row $r_1$ in FIGS. 4C-4D). Byte $B_{13}$ is not a carriage return symbol or a comma symbol, so the signal at the output terminal of Compare Block 702 is LOW, the signal at the output terminal of Compare Block 704 is LOW, Byte Counter 706 increments by one to a value of $BC_a=13$, the RSD signal at the output terminal of NAND gate 714a is LOW, signal CSD at the output terminal of NAND gate 714b is LOW, signal TR at the output terminal of OR gate 716 goes from HIGH to LOW.

Edge Detector 722 detects a falling edge on signal TR and the output of Edge Detector 722 goes –HIGH for one half clock cycle. DEMUX 724 passes current byte number $BC_a$ of Byte Counter 706 ($BC_a$=13) which is loaded into start byte Register 726. Also on the falling edge of signal TR, input column number $CN_I$ Register 720 is loaded with the value in Input Column Counter 718 (0). The value in start byte Register 726 (13) is the start byte associated with the column number stored in input column number $CN_I$ Register 720 (0). Byte width Register 730 has a value 2.

Column and Row Detector Circuit 602 continues processing the remaining 64 bytes $B_{14}$-$B_{78}$ of the example byte stream of FIG. 4B, determining the RSD signal, and corresponding input column numbers $CN_I$ and associated start bytes and byte widths associated with input column numbers $CN_I$=0-3 shown in FIG. 4E.

As described above, Column and Row Detector Circuit 602 includes Compare Block 700 and Ignore Symbol Store 708. The purpose of these two blocks will now be described in more detail. In some instances, the input bytes to Column and Row Detector Circuit 602 may include symbols that match column delimiters or row delimiters, but are not intended to be interpreted as such.

For example, suppose a CSV file included the following:
PA, "PHL
PIT, AVP", AC, 13

Figure 8:
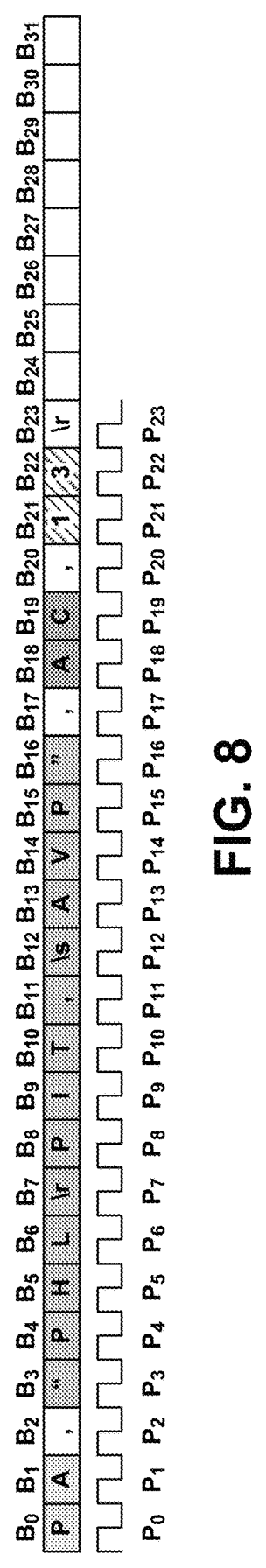

FIG. 8 depicts the byte stream for such data. The data includes four input columns separated by commas, but the second input column from byte $B_3$ through byte $B_{16}$ that includes fourteen symbols including a first double quote symbol at byte $B_3$, a carriage return symbol at byte $B_7$, a comma symbol at byte $B_{11}$ and a second double quote symbol at byte $B_{16}$.

In the above example, Column and Row Detector Circuit 602 uses a comma symbol as a column delimiter and a carriage return symbol as a row delimiter. Thus, unless some provision were made to account for such a scenario, Column and Row Detector Circuit 602 would incorrectly interpret byte $B_7$ as a row delimiter, and byte $B_{11}$ as a column delimiter. Compare Block 700 and Ignore Symbol Store 708 are used to prevent such errors.

As described above, in an example operation of Column and Row Detector Circuit 602 on startup Ignore Symbol Store 708 is loaded with a double quote symbol. In addition, as described above on clock cycle $P_2$ of the input clock signal, Column and Row Detector Circuit 602 operates on byte $B_2$ (symbol ,). Byte $B_2$ is not a double quote symbol or a carriage return symbol, but is a comma symbol, so the signal at the output terminal of Compare Block 700a is HIGH, and signal IG is HIGH.

The signal at the output terminal of Compare Block 702 is LOW, the signal at the output terminal of Compare Block 704 is HIGH (indicating that a column delimiter has been detected), and Byte Counter 706 increments by one to a value of $BC_a$=2. The RSD signal at the output terminal of NAND gate 714a is LOW, signal CSD at the output terminal of NAND gate 714b is HIGH, and signal TR at the output terminal of OR gate 716 goes from LOW to HIGH. Input column number $CN_I$ Register 720 has a value 0, start byte Register 726 has a value 0, byte width Register 730 has a value 0 and Input Column Counter 718 increments by one to a value 1.

Edge Detector 722 detects a rising edge on signal TR and the output of Edge Detector 722 goes +HIGH for one half clock cycle. DEMUX 724 passes current byte number $BC_a$ of Byte Counter 706 ($BC_a$=2) to Summing Circuit 728, which subtracts the value in start byte Register 726 (0) from current byte number $BC_a$ of Byte Counter 706 ($BC_a$=2), and the difference (2–0=2) is loaded in byte width Register 730 as the byte width associated with the column number stored in input column number $CN_I$ Register 720 (0).

Thus, on the rising edge of signal TR, the values stored in input column number $CN_I$ Register 720, start byte Register 726 and byte width Register 730 are (0, 0, 2). These values constitute the corresponding input column number $CN_I$ and associated start byte and byte width for the first identified input column of the first identified row.

On clock cycle $P_3$ of the input clock signal, Column and Row Detector Circuit 602 operates on byte $B_3$ (symbol "). Byte $B_3$ is a double quote symbol, so the signal at the output terminal of Compare Block 700a is HIGH, and ignore toggle block 700b toggles the output IG from HIGH to LOW. The signal at the output terminal of Compare Block 702 is LOW, the signal at the output terminal of Compare Block 704 is LOW, the RSD signal at the output terminal of NAND gate 714a is LOW, and signal CSD at the output terminal of NAND gate 714b is LOW.

Because ignore toggle block 700b toggles signal IG only when Compare Block 700a detects an ignore symbol (a double quote "in this example,) signal IG will remain LOW for all clock cycles from $P_3$ through $P_{16}$, when Column and Row Detector Circuit 602 operates on byte $B_{16}$ (symbol "). As a result, by keeping signal IG LOW throughout these clock cycles, the RSD signal at the output terminal of NAND gate 714a and signal CSD at the output terminal of NAND gate 714b are always LOW, regardless of whether Compare Blocks 702 and 704 detect row limiters or column delimiters in the input byte stream. Thus, the carriage return symbol at byte $B_7$ and the comma symbol at byte $B_{11}$ are effectively ignored.

On clock cycle $P_{16}$ of the input clock signal, Column and Row Detector Circuit 602 operates on byte $B_{16}$ (symbol "). Byte $B_{16}$ is a double quote symbol, so the signal at the output terminal of Compare Block 700a is HIGH, and ignore toggle block 700b toggles the output IG from LOW to HIGH. Thus, Column and Row Detector Circuit 602 resumes "normal" operation, and detects the column delimiters at bytes $B_{17}$ and $B_{20}$, and detects the row delimiter at byte $B_{23}$.

In the following description, an example embodiment of Data Selector Circuit 604 of FIG. 6A is described. FIG. 7A2 is a simplified block diagram of an embodiment of Data Selector Circuit 604 of FIG. 6A. As described in more detail below, in an embodiment Data Selector Circuit 604 receives the input byte stream from Input FIFO Circuit 600, and receives from Column and Row Detector Circuit 602 Identified Column and Row Data for each identified row of the input byte stream.

In an embodiment, Data Selector Circuit 604 also receives (e.g., from host device 102 of FIG. 1) first filtering criteria that specifies the content to be selected from the received input byte stream and provided to Output FIFO Circuit 606. In an embodiment, the first filtering criteria includes $NC_D$ desired input column numbers $CN_D$ that specify the identified input columns whose content is to be selected from the input byte stream and provided to Output FIFO Circuit 606.

In an embodiment, Data Selector Circuit 604 selects from the input byte stream the content of the identified input columns associated with input column numbers $CN_I$ that match the desired input column numbers $CN_D$. In addition, Data Selector Circuit 604 associates the selected content with corresponding first filtered column number $CN_{F1}$, and provides the selected content as first filtered content and corresponding first filtered column numbers $CN_{F1}$ to Output FIFO Circuit 606.

Continuing the example from above, with desired input column numbers $CN_D$=0, 2 and 3, Data Selector Circuit 604 selects from the input byte stream the content of the identified input columns associated with input column numbers $CN_I$=0, 2 and 3 that match the desired input column numbers $CN_D$=0, 2 and 3.

In addition, Data Selector Circuit 604 associates the selected content of the identified input column associated with input column number $CN_I$=0 with a corresponding first filtered column number $CN_{F1}$=0, associates the selected content of the identified input column associated with input column number $CN_I$=2 with a corresponding first filtered column number $CN_{F1}$=1, and associates the selected content of the identified input column associated with input column number $CN_I$=3 with a corresponding first filtered column number $CN_{F1}$=2.

Data Selector Circuit 604 associates the selected content with corresponding first filtered column number $CN_{F1}$, and provides the selected content as first filtered content and corresponding first filtered column numbers $CN_{F1}$ to Output FIFO Circuit 606. In an embodiment, Data Selector Circuit 604 provides first records $R_{F1}$ of first filtered content. In an embodiment, a number of first records $R_{F1}$ of first filtered content is equal to the number of identified input rows $NR_I$. In an embodiment, each first record $R_{F1}$ includes first filtered content selected from the corresponding identified input row.

Data Selector Circuit 604 includes a First Filtered Column Counter 732, a Desired Input Column Store 734, a Column Match Block 736, a DEMUX 738, a Byte Counter 740, Compare Blocks 742a and 742b, a Summing Circuit 744, a Gating Device 746, a MUX 748, and a Selected Column Store 750.

In an embodiment, First Filtered Column Counter 732 receives at a first input terminal the RSD signal from Column and Row Detector Circuit 602 of FIG. 7A1, and provides at an output terminal a first filtered column number $CN_{F1}$ at an input terminal of Desired Input Column Store 734 and at a first input terminal of MUX 748.

In an embodiment, Column Match Block 736 receives at a first input terminal the corresponding input column number $CN_I$, start byte and byte width associated with each identified input column for each identified row of the input byte stream from Column and Row Detector Circuit 602.

In an embodiment, Column Match Block 736 receives at a second input terminal desired input column numbers $CN_D$ from Desired Input Column Store 734. In an embodiment, Column Match Block 736 receives at a third input terminal a signal SP from an output terminal of Compare Block 742b.

In an embodiment, Column Match Block 736 has a first output terminal that provides a signal SBBW to an input terminal of DEMUX 738, and a second output terminal that provides a signal SCS to a control terminal of DEMUX 738 and to a second input terminal of First Filtered Column Counter 732.

DEMUX 738 provides a first signal STB at a first output terminal coupled to a first input terminal of Compare Block 742a and a first input terminal of Summing Circuit 744, and provides a second signal BW at a second output terminal coupled to a second input terminal of Summing Circuit 744. Summing Circuit 744 provides a signal SPB at an output terminal coupled to a first input terminal of Compare Block 742b.

Byte Counter 740 has an input terminal coupled to an input byte stream received from Input FIFO Circuit 600 of FIG. 6A, which is also provided at a first input terminal of Gating Device 746. Byte Counter 740 has an output terminal that provides an output signal $BC_b$ to a second input terminal of each of Compare Blocks 742a and 742b.

Compare Block 742a provides a signal ST at an output coupled to a second input terminal of Gating Device 746, and Compare Block 742b provides a signal SP at an output coupled to a third input terminal of Gating Device 746 and to third input terminal of Column Match Block 736.

MUX 748 has a second input terminal coupled to an output terminal of Gating Device 746, and an output terminal coupled to an input terminal of Selected Column Store 750. Selected Column Store 750 has an output terminal coupled to an input terminal of Output FIFO Circuit 606 of FIG. 6A.

In an embodiment, each of Byte Counter 740, Compare Blocks 742a and 742b, Gating Device 746, MUX 748, and Selected Column Store 750, are coupled to an input clock signal (not shown). In an embodiment, on each cycle of the input clock signal, Byte Counter 740, Compare Blocks 742a and 742b, Gating Device 746, and MUX 748 sequentially operate on each byte of the input byte stream received from Input FIFO Circuit 600.

In an embodiment, Data Selector Circuit 604 receives $NC_I$ input columns of content from the input byte stream from Input FIFO Circuit 600 of FIG. 6A, filters the content and provides $NC_D$ filtered columns of filtered content to Output FIFO Circuit 606 of FIG. 6A, where $NC_D < NC_I$. For example, as described above the example byte stream of FIG. 4B includes data in $NC_I$=4 input columns $CN_I$=0, 1, 2 and 3.

In an embodiment, a host device (e.g., host device 102 of FIG. 1) loads Desired Input Column Store 734 with first filtering criteria that specifies the content to be selected from the received input byte stream and provided to Output FIFO Circuit 606. In an embodiment, the first filtering criteria includes desired input column numbers $CN_D$ that specify the identified input columns whose content is to be selected from the input byte stream and provided to Output FIFO Circuit 606.

For example, if host device 102 loads Desired Input Column Store 734 with desired input column numbers $CN_D$=0, 2 and 3, Data Selector Circuit 604 filters content from identified input columns 0, 2 and 3 of the input byte stream and provides $NC_D$=3 columns of filtered content to Output FIFO Circuit 606.

In an embodiment, Desired Input Column Store 734 is an indexed memory that specifies first filtered column numbers $CN_{F1}$ and corresponding desired input column numbers $CN_D$. For example, Desired Input Column Store 734 may be a lookup table that lists first filtered column numbers $CN_{F1}$ and corresponding desired input column numbers $CN_D$.

For example, host device 102 may load Desired Input Column Store 734 with desired input column numbers $CN_D$=0, 2 and 3, and Desired Input Column Store 734 may have the values shown in Table 1:

TABLE 1

| First Filtered Column Number $CN_{F1}$ | Desired Input Column Number $CN_D$ |
|---|---|
| 0 | 0 |
| 1 | 2 |
| 2 | 3 |

That is, first filtered column number $CN_{F1}=0$ has a corresponding desired input column number $CN_D=0$, first filtered column number $CN_{F1}=1$ has a corresponding desired input column number $CN_D=2$, and first filtered column number $CN_{F1}=3$ has a corresponding desired input column number $CN_D=3$.

In an embodiment, on startup or reset First Filtered Column Counter 732 is initialized to output first filtered column number $CN_{F1}=0$, signal SCS is initialized to a first value (e.g., 0 or LOW), signal SP is initialized to a second value (e.g., 1 or HIGH), DEMUX 738 is OFF, and the output of Gating Device 746 is OPEN and coupled to the second input terminal of MUX 748. Desired Input Column Store 734 outputs to Column Match Block 736 the desired input column number $CN_D$ corresponding to first filtered column number $CN_{F1}=0$.

Referring to FIGS. 7A2, 4B and 4E and Table 1 above, an example operation of Data Selector Circuit 604 will be described. Using the example values from Table 1 above, first filtered column number $CN_{F1}=0$ has a corresponding desired input column number $CN_D=0$, and thus Desired Input Column Store 734 provides desired input column number $CN_D=0$ to Column Match Block 736.

In an embodiment, Column Match Block 736 begins scanning the input column numbers $CN_I$ received from Column and Row Detector Circuit 602 of FIG. 7A1 to find an input column number $CN_I$ matching the received desired input column number $CN_D=0$. In an embodiment, Column Match Block 736 scans the received input column numbers $CN_I$ until a match is detected. Using the example of FIG. 7E, Column Match Block 736 finds the first match at the first row, with $CN_I=0$, and associated start byte=0 and byte width=2.

In an embodiment, upon detecting a match Column Match Block 736 stops scanning the received input column numbers $CN_I$ and outputs to DEMUX 738 a signal SBSW that includes the start byte and byte width associated with the matching input column number $CN_I$. In this example, signal SBSW includes start byte=0 and byte width=2. In addition, upon detecting a match Column Match Block 736 changes signal SCS to a second value (e.g., 1 or HIGH).

In an embodiment, SCS going HIGH causes DEMUX 738 to output the start byte from signal SBSW as signal STB and output the byte width from signal SBSW as signal BW. Thus, in this example, STB=0 and BW=2.

In an embodiment, Summing Circuit 744 generates signal SPB=STB+BW−1. In other words, the value of SPB is the final byte number of the matching input column number $CN_I$. So in this example, SPB=0+2−1=1. As depicted in FIG. 4B, the first input column number $CN_I=0$ in the byte stream begins at byte $B_0$ and ends at byte $B_1$.

Referring again to FIG. 7A2, in an embodiment on startup or reset Byte Counter 740 is initialized to $BC_b=0$, and increments by 1 for each byte of the input byte stream received from Input FIFO Circuit 600. In other words, $BC_b$ is the current byte number being processed by Data Selector Circuit 604.

In an embodiment, Compare Block 742a compares current byte number $BC_b$ to signal STB. In an embodiment, Compare Block 742a sets signal ST at the output terminal of Compare Block 742a to a first value (e.g., 1 or HIGH) when $BC_b$=STB, and sets signal ST a second value (e.g., 0 or LOW) when $BC_b$ STB. In other words, signal ST is HIGH when the current byte number being processed is the start byte of the matching input column number $CN_I$, and is otherwise LOW.

In an embodiment, Compare Block 742b compares current byte number $BC_b$ to signal SPB. In an embodiment, Compare Block 742b sets signal SP at the output terminal of Compare Block 742b to a second value (e.g., 0 or LOW) when $BC_b$=SPB, and sets signal SP HIGH when $BC_b \neq$SPB. In other words, signal SP is LOW when the current byte being processed is the last byte of the matching input column number $CN_I$, and is otherwise HIGH.

In an embodiment, when signal ST goes from LOW to HIGH and signal SP is HIGH, Gating Device 746 begins receiving input bytes from the input byte stream and provides the received bytes as inputs to the second input terminal of MUX 748. In an embodiment, when signal SP goes from HIGH to LOW, Gating Device 746 stops receiving input bytes from the input byte stream and stops providing the received bytes as inputs to the second input terminal of MUX 748.

In other words, in this example Gating Device 746 provides as inputs to the second input terminal of MUX 748 all bytes from start byte (byte 0) to the last byte (byte 1) of the input byte stream. That is, Gating Device 746 provides as inputs to the second input terminal of MUX 748 the content of the identified input column associated with the matching input column number $CN_I$. In an embodiment, the provided content constitutes first filtered content.

Thus, MUX 748 receives at its first and second input terminals the first filtered column number $CN_{F1}$ (0) and associated first filtered content (PA), respectively. In an embodiment, MUX 748 stores the first filtered column number $CN_{F1}$ (0) and first filtered content (PA) in Selected Column Store 750.

In an embodiment, when signal SP goes from HIGH to LOW Column Match Block 736 changes signal SCS to LOW. On the falling edge of SCS, First Filtered Column Counter 732 increments first filtered column number $CN_{F1}$ by 1, so $CN_{F1}=1$, and causes DEMUX 738 to stop outputting the start byte and byte width from signal SBSW as signal STB and signal BW, respectively. Using the example values from Table 1, above, first filtered column number $CN_{F1}=1$ has a corresponding desired input column number $CN_D=2$, and thus Desired Input Column Store 734 provides desired input column number $CN_D=2$ to Column Match Block 736.

In an embodiment, Column Match Block 736 resumes scanning the input column numbers $CN_I$ received from Column and Row Detector Circuit 602 of FIG. 7A1 to find an input column number $CN_I$ matching the received desired input column number $CN_D=2$. In an embodiment, Column Match Block 736 resumes scanning where it previously stopped, and scans until a match is detected. Using the example list of FIG. 7E, Column Match Block 736 finds the first match at the third row, with $CN_I=2$, and associated start byte=7 and byte width=2.

In an embodiment, upon detecting a match Column Match Block 736 stops scanning received input column numbers $CN_I$ and outputs to DEMUX 738 a signal SBSW that includes the start byte and byte width associated with the matching input column number $CN_I$. In this example, signal SBSW includes start byte=7 and byte width=2. In addition, upon detecting a match Column Match Block 736 changes signal SCS to HIGH.

In an embodiment, SCS going HIGH causes DEMUX 738 to output the start byte from signal SBSW as signal STB and output the byte width from signal SBSW as signal BW. Thus, in this example, STB=7 and BW=2.

In an embodiment, Summing Circuit 744 generates signal SPB=STB+BW−1, the final byte number of the matching input column number $CN_I$. So in this example, SPB=7+2−

1=8. As depicted in FIG. 4B, the first input column number $CN_I$=2 in the byte stream begins at byte $B_7$ and ends at byte $B_8$.

Referring again to FIG. 7A2, Byte Counter 740 continues to increment by 1 for each byte of the input byte stream received from Input FIFO Circuit 600.

In an embodiment, Compare Block 742a compares current byte number $BC_b$ to signal STB, and sets signal ST at the output terminal of Compare Block 742a HIGH when $BC_b$=STB, and LOW when $BC_b \neq$STB. In other words, signal ST is HIGH when the current byte number being processed is the start byte of the matching input column number $CN_I$, and is otherwise LOW.

In an embodiment, Compare Block 742b compares current byte number $BC_b$ to signal SPB, and sets signal SP at the output terminal of Compare Block 742b LOW when $BC_b$=SPB, and HIGH when $BC_b \neq$SPB. In other words, signal SP is LOW when the current byte being processed is the last byte of the matching input column number $CN_I$, and is otherwise HIGH.

In an embodiment, when signal ST goes from LOW to HIGH and signal SP is HIGH, Gating Device 746 begins receiving input bytes from the input byte stream and provides the received bytes as inputs to the third input terminal of MUX 748. In an embodiment, when signal SP goes from HIGH to LOW, Gating Device 746 stops receiving input bytes from the input byte stream and stops providing the received bytes as inputs to the third input terminal of MUX 748.

In other words, in this example Gating Device 746 provides as inputs to the second input terminal of MUX 748 all bytes from start byte (7) to the last byte (8) of the input byte stream. That is, Gating Device 746 provides as inputs to the second input terminal of MUX 748 the content of the identified input column associated with the matching input column number $CN_I$ (2). In an embodiment, the provided content constitutes first filtered content.

Thus, MUX 748 receives at its first and second input terminals the first filtered column number $CN_{F1}$ (2) and associated first filtered content (DL), respectively. In an embodiment, MUX 748 stores the first filtered column number $CN_{F1}$ (2) and first filtered content (DL) in Selected Column Store 750.

In an embodiment, when signal SP goes from HIGH to LOW Column Match Block 736 changes signal SCS to LOW. On the falling edge of SCS, First Filtered Column Counter 732 increments first filtered column number $CN_{F1}$ by 1, so $CN_F$=2, and causes DEMUX 738 to stop outputting the start byte and byte width from signal SBSW as signal STB and signal BW, respectively. Using the example values from Table 1, above, first filtered column number $CN_{F1}$=2 has a corresponding desired input column number $CN_D$=3, and thus Desired Input Column Store 734 provides desired input column number $CN_D$=3 to Column Match Block 736.

In an embodiment, Column Match Block 736 resumes scanning the input column numbers $CN_I$ received from Column and Row Detector Circuit 602 of FIG. 7A1 to find an input column number $CN_I$ matching the received desired input column number $CN_D$=3. In an embodiment, Column Match Block 736 resumes scanning where it previously stopped, and scans until a match is detected. Using the example list of FIG. 7E, Column Match Block 736 finds the first match at the fourth row, with $CN_I$=3, and associated start byte=10 and byte width=2.

In an embodiment, upon detecting a match Column Match Block 736 stops scanning received input column numbers $CN_I$ and outputs to DEMUX 738 a signal SBSW that includes the start byte and byte width associated with the matching input column number $CN_I$. In this example, signal SBSW includes start byte=10 and byte width=2. In addition, upon detecting a match Column Match Block 736 changes signal SCS to HIGH.

In an embodiment, SCS going HIGH causes DEMUX 738 to output the start byte from signal SBSW as signal STB and output the byte width from signal SBSW as signal BW. Thus, in this example, STB=10 and BW=2.

In an embodiment, Summing Circuit 744 generates signal SPB=STB+BW−1, the final byte number of the matching input column number $CN_I$. So in this example, SPB=10+2−1=11. As depicted in FIG. 4B, the first input column number $CN_I$=3 in the byte stream begins at byte $B_{10}$ and ends at byte $B_{11}$.

Referring again to FIG. 7A2, Byte Counter 740 continues to increment by 1 for each byte of the input byte stream received from Input FIFO Circuit 600. In an embodiment, Compare Block 742a compares current byte number $BC_b$ to signal STB, and sets signal ST at the output terminal of Compare Block 742a HIGH when $BC_b$=STB, and LOW when $BC_b \neq$STB. In other words, signal ST is HIGH when the current byte number being processed is the start byte of the matching input column number $CN_I$, and is otherwise LOW.

In an embodiment, Compare Block 742b compares current byte number $BC_b$ to signal SPB, and sets signal SP at the output terminal of Compare Block 742b LOW when $BC_b$=SPB, and HIGH when $BC_b \neq$SPB. In other words, signal SP is LOW when the current byte being processed is the last byte of the matching input column number $CN_I$, and is otherwise HIGH.

In an embodiment, when signal ST goes from LOW to HIGH and signal SP is HIGH, Gating Device 746 begins receiving input bytes from the input byte stream and provides the received bytes as inputs to the second input terminal of MUX 748. In an embodiment, when signal SP goes from HIGH to LOW, Gating Device 746 stops receiving input bytes from the input byte stream and stops providing the received bytes as inputs to the second input terminal of MUX 748.

In other words, in this example Gating Device 746 provides as inputs to the second input terminal of MUX 748 all bytes from start byte (10) to the last byte (11) of the input byte stream. That is, Gating Device 746 provides as inputs to the second input terminal of MUX 748 the content of the identified input column associated with the matching input column number $CN_I$ (3). In an embodiment, the provided content constitutes first filtered content.

Thus, MUX 748 receives at its first and second input terminals the first filtered column number $CN_{F1}$ (3) and associated first filtered content (13), respectively. In an embodiment, MUX 748 stores the first filtered column number $CN_{F1}$ (3) and first filtered content (13) in Selected Column Store 750.

In an embodiment, when signal SP goes from HIGH to LOW Column Match Block 736 changes signal SCS to LOW. On the falling edge of SCS, First Filtered Column Counter 732 increments filtered column number $CN_F$ by 1, so $CN_F$=2, and causes DEMUX 738 to stop outputting the start byte and byte width from signal SBSW as signal STB and signal BW, respectively.

As described above, the RSD signal in Column and Row Detector Circuit 602 goes from LOW to HIGH when a row delimiter is detected. In an embodiment, when RSD signal goes from LOW to HIGH, First Filtered Column Counter 732 resets filtered column number $CN_F$, so $CN_F$=0.

Using the example values from Table 1 above, first filtered column number $CN_{F1}=0$ has a corresponding desired input column number $CN_D=0$, and thus Desired Input Column Store 734 provides desired input column number $CN_D=0$ to Column Match Block 736. The process described above continues, with Column Match Block 736 resuming scanning to find the next match is at the fifth row, with $CN_I=0$, and associated start byte=13 and byte width=2, and so on. This process continues, storing first filtered column numbers $CN_{F1}$ and associated first filtered content in Selected Column Store 750.

In an embodiment, Selected Column Store 750 provides Output FIFO Circuit 606 with $NR_I$ first records $R_{F1}$ of first filtered content. In an embodiment, the number of first records $R_{F1}$ of first filtered content is equal to the number of identified input rows (i.e., $NR_I$). In an embodiment, each first record $R_{F1}$ includes first filtered content selected from the corresponding identified input row.

Referring again to the example of FIG. 4F, first record $R_{F1}=0$ includes first filtered content "PA", "DL", "13" (selected from identified input row $r_0$), first record $R_{F1}=1$ includes first filtered content "CO", "DL", "8" (selected from identified input row $r_1$), first record $R_{F1}=2$ includes first filtered content "NY", "AA", "104" (selected from identified input row $r_2$), first record $R_{F1}=3$ includes first filtered content "CO", "UA", "117" (selected from identified input row $r_3$), first record $R_{F1}=4$ includes first filtered content "CO", "DL", "42" (selected from identified input row $r_4$), and first record $R_{F1}=5$ includes first filtered content "NY", "AA", "86" (selected from identified input row $r_5$).

The example Column and Row Detector Circuit 602 and Data Selector Circuit 604 described above each operate one byte at a time on the input data stream from Input FIFO 600, and Data Selector Circuit 604 outputs filtered bytes one byte at a time to Output FIFO 606. Persons of ordinary skill in the art will understand that Column and Row Detector Circuit 602 and Data Selector Circuit 604 alternatively may be configured to operate on more than one byte at a time on the input data stream from Input FIFO 600, and Data Selector Circuit 604 alternatively may be configured to output filtered bytes at more than one byte at a time to Output FIFO 606.

In the following description, an example embodiment of Data Matching Circuit 612 of FIG. 6B is described. FIG. 7B1 is a simplified block diagram of an embodiment of Data Matching Circuit 612 of FIG. 6B. Data Matching Circuit 612 includes a Compare Block 756a and a Match Store 754a. Compare Block 756a has a first input terminal coupled to Input FIFO 610 of FIG. 6B. Match Store 754a provides a specified first filtered column number $CN_{S1}$ to a second input terminal of Compare Block 756a, and a specified First Match Value to a third input terminal of Compare Block 756a. Compare Block 756a provides an output signal MNM1 at an output terminal coupled to an input terminal of Data Selection Circuit 614.

In an embodiment, Match Store 754a is a memory that receives second filtering criteria (e.g., from host device 102 of FIG. 1) that specifies the content to be selected from the first filtered content and provided to Data Filter Circuit 504. In an embodiment, the second filtering criteria includes a specified first filtered column number $CN_{S1}$ and a corresponding specified First Match Value. Persons of ordinary skill in the art will understand that second filtering criteria may include additional or different criteria, such as a match length that specifies a length (e.g., number of bytes), a content type (e.g., string, integer, float, etc.) of the first filtered content to be matched.

In an embodiment, Compare Block 756a receives $NR_I$ first records $R_{F1}$ of first filtered content and corresponding first filtered column numbers $CN_{F1}$ from Input FIFO 610. In an embodiment, Compare Block 756a determines for each received first filtered content if the corresponding first filtered column number $CN_{F1}$ equals the specified first filtered column number $CN_{S1}$.

In an embodiment, if Compare Block 756a determines that the corresponding first filtered column number $CN_{F1}$ equals the specified first filtered column number $CN_{S1}$, Compare Block 756a determines if the received first filtered content equals the specified First Match Value. In an embodiment, Compare Block 756a provides a first sequence MNM1 indicating the match results. In an embodiment, MNM1 is a binary sequence of $B=NR_I \times NC_D$ bits, with one bit for each corresponding first filtered content.

In an embodiment, if Compare Block 756a determines that the corresponding first filtered column number $CN_{F1}$ equals the specified first filtered column number $CN_{S1}$, Compare Block 756a sets the corresponding bit of first sequence MNM1 to 1 for each first filtered content that matches the specified First Match Value, and to 0 for each first filtered content that does not match the specified First Match Value.

In an embodiment, if Compare Block 756a determines that the corresponding first filtered column number $CN_{F1}$ does not equal the specified first filtered column number $CN_{S1}$, Compare Block 756a sets the corresponding bit of first sequence MNM1 to 0 for each first filtered content.

Referring to the example described above, Table 2 below illustrates example contents of Match Store 754a:

TABLE 2

| Specified First Filtered Column Number $CN_{S1}$ | Specified First Match Value |
| --- | --- |
| 0 | "CO" |

In this example, the specified first filtered column number $CN_{S1}=0$, and a specified First Match Value="CO".

FIG. 4I depicts the example $NR_I=6$ first records $R_{F1}$ of first filtered content and corresponding first filtered column numbers $CN_{F1}$ for the example described above, and also lists the corresponding $B=6 \times 3=18$ bit values of first sequence MNM1 for each first filtered content.

For example, beginning with first record $R_{F1}=0$, $CN_{F1}=0$ equals the specified first filtered column number $CN_{S1}=0$, so Compare Block 756a determines if the received first filtered content "PA" equals the specified First Match Value "CO". Because there is no match, Compare Block 756a sets the corresponding bit of first sequence MNM1 to 0 for the corresponding first filtered content.

Next, for first record $R_{F1}=0$, $CN_{F1}=1$ does not equal the specified first filtered column number $CN_{S1}=0$, so Compare Block 756a sets the corresponding bit of first sequence MNM1 to 0 for the corresponding first filtered content.

Next, for first record $R_{F1}=0$, $CN_{F1}=2$ does not equal the specified first filtered column number $CN_{S1}=0$, so Compare Block 756a sets the corresponding bit of first sequence MNM1 to 0 for the corresponding first filtered content.

Next, for first record $R_{F1}=1$, $CN_{F1}=0$ equals the specified first filtered column number $CN_{S1}=0$, so Compare Block 756a determines if the received first filtered content "CO" equals the specified First Match Value "CO". Because there is a match, Compare Block 756a sets the corresponding bit of first sequence MNM1 to 1 for the corresponding first filtered content.

Next, for first record $R_{F1}=1$, $CN_{F1}=1$ does not equal the specified first filtered column number $CN_{S1}=0$, so Compare Block 756a sets the corresponding bit of first sequence MNM1 to 0 for the corresponding first filtered content.

Compare Block 756a continues processing the remaining received first records $R_{F1}$ of first filtered content and corresponding first filtered column numbers $CN_{F1}$ from Input FIFO 610, and provides Data Selection Circuit 614 the bits of first sequence MNM1 for each corresponding first filtered content, such as the values shown in FIG. 4I.

In the following description, an example embodiment of Data Selection Circuit 614 of FIG. 6B is described. FIG. 7B2 is a simplified block diagram of an embodiment of Data Selection Circuit 614 of FIG. 6B. Data Selection Circuit 614 includes a Mask Store 758a having an output terminal coupled to input terminals of inverters $760a_0$-$760a_{B-1}$, each of which have an output terminal coupled to a first input terminal of OR gates $762a_0$-$762a_{B-1}$, respectively. Each of OR gates $762a_0$-$762a_{B-1}$ has a second input terminal coupled to a corresponding bit of first sequence MNM1 from Data Matching Circuit 612 of FIG. 7B1.

In an embodiment, Mask Store 758a is a memory that receives B first mask bits m1[0], m1[1], . . . , m1[B−1] (e.g., from host device 102 of FIG. 1), where each first mask bit corresponds to one of the B first filtered content in Input FIFO 610. In an embodiment, a first mask bit has a value of 0 for each corresponding first filtered content associated with first filtered column numbers $CN_{F1}$ that are not the specified first filtered column number $CN_{S1}$, and has a value of 1 for each corresponding first filtered content from first filtered column numbers $CN_{F1}$ that are equal to the specified first filtered column number $CN_{S1}$.

To simplify the description, the embodiment of Data Selection Circuit 614 FIG. 7B2 includes B inverters $760a_0$-$760a_{B-1}$ and OR gates $762a_0$-$762a_{B-1}$, one for each of the B first filtered content in Input FIFO 610. Persons of ordinary skill in the art will understand that Data Selection Circuit 614 may include more than B inverters $760a_0$-$760a_{B-1}$ and OR gates $762a_0$-$762a_{B-1}$ to accommodate a larger number of first filtered content.

In an embodiment, each of inverters $760a_0$, $760a_1$, . . . , $760a_{B-1}$ receives a corresponding one of first mask bits m1[0], m1[1], . . . , m1[B−1], respectively, and provides a corresponding one of inverted first mask bits mb1[0], mb1[1], . . . , mb1[B−1], respectively. Using the example from above, with $CN_{S1}=0$, FIG. 4I lists values for first mask bits m1[0], m1[1], . . . , m1[17] and inverted first mask bits mb1[0], mb1[1], . . . , mb1[17].

In the example described above, the specified first filtered column number $CN_{S1}=0$. Thus, first filtered content associated with first filtered column numbers $CN_{F1}=0$ have corresponding first mask bits=1, and all other first filtered content associated with first filtered column numbers $CN_{F1}=1, 2$ have corresponding first mask bits=0. Accordingly, first filtered content associated with first filtered column numbers $CN_{F1}=0$ have corresponding inverted first mask bits=0, and all other first filtered content associated with first filtered column numbers $CN_{F1}=1, 2$ have corresponding inverted first mask bits=1.

Each of OR gates $762a_0$-$762a_{B-1}$ has an output terminal coupled to a corresponding input terminal of AND gate 764a, which provides a control signal RS1 at an output terminal coupled to a control terminal of Gating Device 766a. In an embodiment, control signal RS1 has a value of 0 if the output of any of OR gates $762a_0$-$762a_{B-1}$ is 0, and has a value of 1 only if the output of all OR gates $762a_0$-$762a_{B-1}$ is 1. In an embodiment, control signal RS1 has a value of 1 only for first filtered content that is associated with first filtered column numbers $CN_{F1}=0$, and that have a value that matches the specified First Match Value.

In the example described above, the specified First Match Value="CO". FIG. 4I lists values for control signal RS1 corresponding to each first filtered value for this example. In this example, control signal RS1=1 for first filtered content associated with first filtered column number $CN_{F1}=0$ and that has a value CO that matches the specified First Match Value. For all other first filtered content, control signal RS1=0.

Gating Device 766a has a first input terminal coupled to Input FIFO 610 of FIG. 6B, and has an output terminal coupled to Output FIFO 616 of FIG. 6B. In an embodiment, Gating Device 766a receives $NR_I$ first records $R_{F1}$ of first filtered content and corresponding first filtered column numbers $CN_{F1}$ from Input FIFO 610.

In an embodiment, when control signals RS1 associated with a corresponding first record $R_{F1}$ all equal 0, Gating Device 766a does not select any first filtered content from the corresponding first record $R_{F1}$. In an embodiment, when at least one control signal RS1 associated with a corresponding first record $R_{F1}$ equals 1, Gating Device 766a selects the first filtered content from all first filtered columns associated with first filtered column numbers $CN_{F1}$ other than the specified first filtered column number $CN_{S1}$, and provides the selected first filtered content as second filtered content to Output FIFO 616.

Continuing the example described above, and referring to FIG. 4I, at least one control signal RS1=1 for $NM_{F1}=3$ corresponding first records $R_{F1}=1, 3$ and 4. Thus, Gating Device 766a selects the $NC_{F2}=2$ first filtered content from all first filtered columns associated with first filtered column numbers $CN_{F1}$ other than the specified first filtered column number $CN_{S1}$ for the same first records $R_{F1}=1, 3, 4$ as the matching first filtered content, and provides the selected first filtered content as second filtered content to Output FIFO 616.

In an embodiment, Gating Device 766a provides Output FIFO 616 with $NM_{F1}$ second records $R_{F2}$ of second filtered content, where each second record $R_{F2}$ includes $NC_{F2}$ first filtered content from all first filtered columns that are associated with first filtered column numbers $CN_{F1}$ other than the specified first filtered column number (i.e., other than $CN_{S1}=0$).

Referring again to the example of FIG. 4G, second record $R_{F2}=0$ includes second filtered content "DL", "8" (selected from first record $R_{F1}=1$ of FIG. 4F), second record $R_{F2}=1$ includes second filtered content "UA", "117" (selected from first record $R_{F1}=3$ of FIG. 4F), and second record $R_{F2}=2$ includes second filtered content "DL", "42" (selected from first record $R_{F1}=4$ of FIG. 4F).

In the following description, an example embodiment of Data Matching Circuit 622 of FIG. 6C is described. FIG. 7C1 is a simplified block diagram of an embodiment of Data Matching Circuit 622 of FIG. 6C. Data Matching Circuit 622 includes a Compare Block 756b and a Match Store 754b. Compare Block 756b has a first input terminal coupled to Input FIFO 620 of FIG. 6C. Match Store 754b provides a specified second filtered column number $CN_{S2}$ to a second input terminal of Compare Block 756b, and a specified Second Match Value to a third input terminal of Compare Block 756*b*. Compare Block 756*b* provides an output signal MNM2 at an output terminal coupled to an input terminal of Data Selection Circuit 624.

In an embodiment, Match Store 754*b* is a memory that receives third filtering criteria (e.g., from host device 102 of FIG. 1) that specifies the content to be selected from the second filtered content. In an embodiment, the third filtering criteria includes the specified second filtered column number $CN_{S2}$ and a corresponding specified Second Match Value. Persons of ordinary skill in the art will understand that third filtering criteria may include additional or different criteria, such as a match length that specifies a length (e.g., number of bytes), a content type (e.g., string, integer, float, etc.) of the second filtered content to be matched.

In an embodiment, Compare Block 756*b* receives $NM_{F1}$ second records $R_{F2}$ of second filtered content and corresponding second filtered column numbers $CN_{F2}$ from Input FIFO 620. In an embodiment, Compare Block 756*b* determines for each received second filtered content if the corresponding second filtered column number $CN_{F2}$ equals the specified second filtered column number $CN_{S2}$.

In an embodiment, if Compare Block 756*b* determines that the corresponding second filtered column number $CN_{F2}$ equals the specified second filtered column number $CN_{S2}$, Compare Block 756*b* determines if the received second filtered content equals the specified Second Match Value. In an embodiment, Compare Block 756*b* provides a second sequence MNM2 indicating the match results. In an embodiment, MNM2 is a binary sequence of $C=NM_{F1} \times NC_{F2}$ bits, with one bit for each corresponding second filtered content.

In an embodiment, if Compare Block 756*b* determines that the corresponding second filtered column number $CN_{F2}$ equals the specified second filtered column number $CN_{S2}$, Compare Block 756*b* sets the corresponding bit of second sequence MNM2 to 1 for each second filtered content that matches the specified Second Match Value, and to 0 for each second filtered content that does not match the specified Second Match Value.

In an embodiment, if Compare Block 756*b* determines that the corresponding second filtered column number $CN_{F2}$ does not equal the specified second filtered column number $CN_{S2}$, Compare Block 756*b* sets the corresponding bit of second sequence MNM2 to 0 for each second filtered content.

Referring to the example described above, Table 3 below illustrates example contents of Match Store 754*b*:

TABLE 3

| Specified Second Filtered Column Number $CN_{S2}$ | Specified Second Match Value |
|---|---|
| 0 | "DL" |

In this example, the specified second filtered column number $CN_{S2}=0$, and a specified Second Match Value="DL".

FIG. 4J depicts the example $NM_{F1}=3$ second records $R_{F2}$ of second filtered content and corresponding second filtered column numbers $CN_{F2}$ from the example described above, and also lists the corresponding $C=3 \times 2=6$ bit values of second sequence MNM2 for each second filtered content.

For example, beginning with first record $R_{F2}=0$, $CN_{F2}=0$ equals the specified first filtered column number $CN_{S2}=0$, so Compare Block 756*b* determines if the received second filtered content "DL" equals the specified Second Match Value "DL". Because there is a match, Compare Block 756*b* sets the corresponding bit of second sequence MNM2 to 1 for the corresponding second filtered content.

Next, for first record $R_{F2}=0$, $CN_{F2}=1$ does not equal the specified second filtered column number $CN_{S2}=0$, so Compare Block 756*b* sets the corresponding bit of second sequence MNM2 to 0 for the corresponding second filtered content.

Next, for first record $R_{F2}=1$, $CN_{F2}=0$ equals the specified second filtered column number $CN_{S2}=0$, so Compare Block 756*b* determines if the received second filtered content "UA" equals the specified Second Match Value "DL". Because there is not a match, Compare Block 756*b* sets the corresponding bit of second sequence MNM2 to 0 for the corresponding second filtered content.

Next, for first record $R_{F2}=1$, $CN_{F2}=1$ does not equal the specified second filtered column number $CN_{S2}=0$, so Compare Block 756*b* sets the corresponding bit of second sequence MNM2 to 0 for the corresponding second filtered content.

Next, for second record $R_{F2}=2$, $CN_{F2}=0$ equals the specified first filtered column number $CN_{S2}=0$, so Compare Block 756*b* determines if the received second filtered content "DL" equals the specified Second Match Value "DL". Because there is a match, Compare Block 756*b* sets the corresponding bit of second sequence MNM2 to 1 for the corresponding second filtered content.

Next, for first record $R_{F2}=2$, $CN_{F2}=1$ does not equal the specified second filtered column number $CN_{S2}=0$, so Compare Block 756*b* sets the corresponding bit of second sequence MNM2 to 0 for the corresponding second filtered content.

Compare Block 756*b* provides Data Selection Circuit 624 the bits of second sequence MNM2 for each corresponding second filtered content, such as the example values shown in FIG. 4J.

In the following description, an example embodiment of Data Selection Circuit 624 of FIG. 6C is described. FIG. 7C2 is a simplified block diagram of an embodiment of Data Selection Circuit 624 of FIG. 6C. Data Selection Circuit 624 includes a Mask Store 758*b* having an output terminal coupled to input terminals of inverters 760*b*$_0$-760*b*$_{C-1}$, each of which have an output terminal coupled to a first input terminal of OR gates 762*b*$_0$-762*b*$_{C-1}$, respectively. Each of OR gates 762*b*$_0$-762*b*$_{C-1}$ has a second input terminal coupled to a corresponding bit of second sequence MNM2 from Data Matching Circuit 622 of FIG. 7C1.

In an embodiment, Mask Store 758*b* is a memory that receives C second mask bits m2[0], m2[1], . . . , m2[C−1] (e.g., from host device 102 of FIG. 1), where each second mask bit corresponds to one of the C second filtered content in Input FIFO 620. In an embodiment, a second mask bit has a value of 0 for each corresponding second filtered content associated with second filtered column numbers $CN_{F2}$ that are not the specified second filtered column number $CN_{S2}$, and has a value of 1 for each corresponding second filtered content from second filtered column numbers $CN_{F2}$ that are equal to the specified second filtered column number $CN_{S2}$.

To simplify the description, the embodiment of Data Selection Circuit 624 FIG. 7C2 includes C inverters 760*b*$_0$-760*b*$_{C-1}$ and OR gates 762*b*$_0$-762*b*$_{C-1}$, one for each of the C second filtered content in Input FIFO 620. Persons of ordinary skill in the art will understand that Data Selection Circuit 624 may include more than C inverters 760*b*$_0$-760*b*$_{C-1}$ and OR gates 762*b*$_0$-762*b*$_{C-1}$ to accommodate a larger number of second filtered content.

In an embodiment, each of inverters 760*b*$_0$-760*b*$_{C-1}$ receives a corresponding one of second mask bits m2[0], m2[1], . . . , m2[C−1], respectively, and provides a corresponding one of inverted second mask bits mb2[0], mb2[1], . . . , mb2[C−1], respectively. Using the example from above, with $CN_{S2}=0$, FIG. 4J lists values for second mask bits m2[0], m2[1], . . . , m2[5] and inverted second mask bits mb2[0], mb2[1], . . . , mb2[5].

In the example described above, the specified second filtered column number $CN_{S2}=0$. Thus, second filtered content associated with second filtered column numbers $CN_{F2}=0$ have corresponding second mask bits=1, and all other second filtered content associated with second filtered column number $CN_{F2}=1$ have corresponding second mask bits=0. Accordingly, second filtered content associated with second filtered column numbers $CN_{F2}=0$ have corresponding inverted second mask bits=0, and all other second filtered content associated with second filtered column number $CN_{F1}=1$ have corresponding inverted second mask bits=1.

Each of OR gates $762b_0$-$762b_{C-1}$ has an output terminal coupled to a corresponding input terminal of AND gate 764b, which provides a control signal RS2 at an output terminal coupled to a control terminal of Gating Device 766b. In an embodiment, control signal RS2 has a value of 0 if the output of any of OR gates $762b_0$-$762b_{C-1}$ is 0, and has a value of 1 only if the output of all OR gates $762b_0$-$762b_{C-1}$ is 1. In an embodiment, control signal RS2 has a value of 1 only for second filtered content that is associated with second filtered column numbers $CN_{F2}=0$, and that have a value that matches the specified Second Match Value. In an embodiment, Data Selection Circuit 624 also provides control signal RS2 to Metadata Computation Circuit 624.

In the example described above, the specified Second Match Value="DL". FIG. 4J lists values for control signal RS2 corresponding to each second filtered value for this example. In this example, control signal RS2=1 for second filtered content associated with second filtered column number $CN_{F2}=0$ and that has a value DL that matches the specified Second Match Value. For all other second filtered content, control signal RS2=0.

Gating Device 766b has a first input terminal coupled to Input FIFO 620 of FIG. 6C, and has an output terminal coupled to an input terminal of Metadata Computation Circuit 626 and an input terminal of Output FIFO 628 of FIG. 6C. In an embodiment, Gating Device 766b receives $NM_{F1}$ second records $R_{F2}$ of second filtered content and corresponding second filtered column numbers $CN_{F2}$ from Input FIFO 620.

In an embodiment, when control signals RS2 associated with a corresponding second record $R_{F2}$ all equal 0, Gating Device 766b does not select any second filtered content from the corresponding second record $R_{F2}$. In an embodiment, when at least one control signal RS2 associated with a corresponding second record $R_{F2}$ equals 1, Gating Device 766b selects L=1 all other second filtered content from the same second record $R_{F2}$ as the matching second filtered content, and provides the selected second filtered content as third filtered content to Output FIFO 628.

Continuing the example described above, and referring to FIG. 4J, at least one control signal RS2=1 for S=2 corresponding second records $R_{F2}=0$ and 3. Thus, Gating Device 766b selects L=1 all other second filtered content from the same second records $R_{F2}=0$, 3 as the matching second filtered content, and provides the selected second filtered content as third filtered content.

In an embodiment, Gating Device 766b associates the third filtered content with corresponding third filtered column numbers $CN_{F3}$, and provides the third filtered content and corresponding third filtered column numbers $CN_{F3}$ to Output FIFO 628 and Metadata Computation Circuit 626.

FIG. 4H depicts the third filtered content and corresponding third filtered column numbers $CN_{F3}$ for the example described above. As depicted in the example of FIG. 4H, third record $R_{F3}=0$ includes third filtered content "8", and third record $R_{F3}=1$ includes third filtered content "42".

In the following description, an example embodiment of Metadata Computation Circuit 626 of FIG. 6C is described. FIG. 7C3 is a simplified block diagram of an embodiment of Metadata Computation Circuit 626 of FIG. 6C. Metadata Computation Circuit 626 includes a Metadata Desired Content Store 770 having an output terminal coupled to a first input terminal of a Compare Block 772, which has a second input terminal coupled to receive third filtered column numbers $CN_{F3}$ from Data Selection Circuit 624 of FIG. 7C2. Third filtered column numbers $CN_{F3}$ are also coupled to an input terminal of Output Store 630 of FIG. 6C.

A Count Matches Block 774 has a first input terminal coupled to Compare Block 772 receive control signal RS2 from Data Selection Circuit 624, and has an output terminal coupled to an input terminal of Output Store 630.

A MUX 776 has a first input terminal coupled to receive third filtered content from Data Selection Circuit 624, a second input terminal coupled to an output terminal of Compare Block 772, and an output terminal coupled to a first input terminal of a Calculate Hash Block 778, which has an output terminal coupled to an input terminal of Output Store 630.

A MUX 780 has a first input terminal coupled to receive third filtered content from Data Selection Circuit 624, a second input terminal coupled to an output terminal of Compare Block 772, and an output terminal coupled to a first input terminal of a Calculate Sum Block 782, which has an output terminal coupled to an input terminal of Output Store 630.

A DEMUX 784 has an input terminal coupled to an output terminal of Output Store 630, and has a first output terminal coupled to a second input terminal of Calculate Sum Block 782, a second output terminal coupled to a second input terminal of Calculate Hash Block 778, and a third output terminal coupled to a second input terminal of Count Matches Block 774.

In an embodiment, a host device (e.g., host device 102 of FIG. 1) loads Metadata Desired Content Store 770 with desired third filtered content numbers $CND_{F3}$ that specifies the third filtered content on which various metadata may be determined. In an embodiment, Compare Block 772 compares the received third filtered column numbers $CN_{F3}$ with the desired third filtered content numbers $CND_{F3}$.

In an embodiment, if the received third filtered column numbers $CN_{F3}$ matches the desired third filtered content numbers $CND_{F3}$, Compare Block 772 provides an output signal that causes MUX 776 to provide the corresponding third filtered content to Calculate Hash Block 778. In an embodiment, Calculate Hash Block 778 performs a hash operation on the corresponding third filtered content and content received from Output Store 630.

In an embodiment, if the received third filtered column numbers $CN_{F3}$ matches the desired third filtered content numbers $CND_{F3}$, Compare Block 772 provides an output signal that causes MUX 780 to provide the corresponding third filtered content to Calculate Sum Block 782. In an embodiment, Calculate Sum Block 782 performs a sum operation on the corresponding third filtered content and content received from Output Store 630.

In an embodiment, Count Matches Block 774 calculates a number of third filtered content by summing the bits in signal RS2.

In an embodiment, Count Matches Block 774, Calculate Hash Block 778 and Calculate Sum Block 782 provide their calculated results to be saved in Output Store 630.

Persons of ordinary skill in the art will understand that Metadata Computation Circuit 626 may include additional and/or different circuit blocks for calculating or determining various metadata related to third filtered content.

One embodiment includes an apparatus that includes a memory system that includes a memory controller coupled to a storage device capable of streaming data at a first data rate. The memory controller is configured to read a first amount of input data from the storage device at an input data rate equals the first data rate, and provide the first amount of input data at the input data rate to a hardware circuit. The hardware circuit is configured to filter the first amount of input data to provide a second amount of output data at an output data rate, the second amount of output data less than the first amount of input data, the output data rate less than the input data rate. The hardware circuit filters the first amount of input data without repeatedly moving data back and forth between the storage device, a memory buffer, and the hardware circuit.

One embodiment includes a memory system including a memory controller configured to read a first amount of input data from a storage device at a first data rate, and a hardware accelerator circuit that is coupled to the memory controller. The hardware accelerator circuit includes a first filter circuit, a second filter circuit, and a third filter circuit. The first filter circuit is configured to receive at the first data rate the first amount of input data and implement a first filter operation on the received input data to provide a second amount of first filtered data less than the first amount of input data. The second filter circuit is configured to receive at a second data rate less than the first data rate the second amount of first filtered data and implement a second filter operation on the received first filtered data to provide a third amount of second filtered data less than the second amount of first filtered data. The third filter circuit configured to receive at a third data rate less than the second data rate the third amount of second filtered data and implement a third filter operation on the received second filtered data to provide a fourth amount of third filtered data less than the third amount of second filtered data.

One embodiment includes a hardware accelerator circuit for a near storage compute system including a column filter circuit, a row filter circuit and a data filter circuit. The column filter circuit is configured to receive an input byte stream from a storage device, the input byte stream including a first amount of input data including input columns of input content, select only input content from desired input columns, and provide the selected input content as a second amount of first filtered columns of first filtered content. The row filter circuit is configured to receive the second amount of first filtered columns of first filtered content from the column filter circuit, search a specified first filtered column to identify any first filtered content that matches a specified first match value, and for each identified match select first filtered content from first filtered columns associated with the specified first filtered column, and provide the selected first filtered content as a third amount of second filtered columns of second filtered content. The data filter circuit is configured to receive the third amount of second filtered columns of second filtered content from the row filter circuit, search a specified second filtered column to identify any second filtered content that matches a specified second match value, and for each identified match select second filtered content from second filtered columns associated with the specified second filtered column, and provide the selected second filtered content as a fourth amount of third filtered columns of third filtered content.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

The invention claimed is:

1. An apparatus comprising:
a memory system comprising:
    a non-volatile storage device configured to stream data at a first data rate;
    a memory controller coupled to the non-volatile storage device; and
    a hardware circuit coupled to the memory controller, wherein:
    the memory controller is configured to:
        read a first amount of input data from the non-volatile storage device at an input data rate that equals the first data rate; and
        provide the first amount of input data at the input data rate to the hardware circuit;
    the hardware circuit is configured to filter the first amount of input data to provide a second amount of output data at an output data rate, the second amount of output data less than the first amount of input data, the output data rate less than the input data rate; and
    the hardware circuit filters the first amount of input data without repeatedly moving data back and forth between the non-volatile storage device, a memory buffer, and the hardware circuit.

2. The apparatus of claim 1, wherein:
the memory controller is further configured to receive a filter parameter from a host device; and
the hardware circuit is further configured to filter the first amount of input data in accordance with the filter parameter.

3. The apparatus of claim 1, wherein the hardware circuit is further configured to:
perform a first filter operation on the first amount of input data to provide first filtered data at the input data rate; and
perform a second filter operation on the first filtered data to provide second filtered data at a second data rate less than the input data rate.

4. The apparatus of claim 3, wherein the hardware circuit is further configured to perform a third filter operation on the second filtered data to provide third filtered data at a third data rate less than the second data rate.

5. The apparatus of claim 3, wherein the third filtered data comprises the output data.

6. The apparatus of claim 1, wherein the hardware circuit comprises a plurality of filtering circuits that collectively filter the first amount of input data to provide the second amount of output data at the output data rate.

7. The apparatus of claim 1, wherein the hardware circuit comprises:
a first filter circuit configured to filter the first amount of input data to provide a first amount of first filtered data less than the first amount of input data; and
a second filter circuit configured to filter the first amount of first filtered data to provide a second amount of second filtered data less than the first amount of first filtered data.

8. The apparatus of claim 1, wherein the hardware circuit further comprises a third filter circuit configured to filter the second amount of second filtered data to provide a third amount of third filtered data less than the second amount of second filtered data.

9. The apparatus of claim 1, wherein the third filtered data comprises the output data.

10. The apparatus of claim 1, wherein the memory system further comprises a data processor circuit configured to:
receive the second amount of output data from the hardware circuit; and
further process the received output data to provide a search result to a host device.

11. The apparatus of claim 1, wherein the first data rate is greater than or equal to 5 GB/s.

12. A memory system comprising:
a memory controller configured to read a first amount of input data from a non-volatile storage device at a first data rate;
a hardware accelerator circuit that is coupled to the memory controller and that comprises:
a first filter circuit configured to receive at the first data rate the first amount of input data and implement a first filter operation on the received input data to provide a second amount of first filtered data less than the first amount of input data;
a second filter circuit configured to receive at a second data rate less than the first data rate the second amount of first filtered data and implement a second filter operation on the received first filtered data to provide a third amount of second filtered data less than the second amount of first filtered data; and
a third filter circuit configured to receive at a third data rate less than the second data rate the third amount of second filtered data and implement a third filter operation on the received second filtered data to provide a fourth amount of third filtered data less than the third amount of second filtered data,
wherein the first data rate is a rate at which the non-volatile storage device is configured to stream data.

13. The memory system of claim 12, wherein the input data comprises a database file comprising a plurality of input columns comprising input content, and the first filter operation includes receiving a first filtering criteria that specifies desired input column numbers that specify input columns whose input content is to be selected and provided as the first filtered content.

14. The memory system of claim 13, wherein the second filter operation includes receiving a second filtering criteria that specifies first filtered content to be selected and provided as the second filtered content.

15. The memory system of claim 14, wherein the third filter operation includes receiving a third filtering criteria that specifies second filtered content to be selected and provided as the third filtered content.

16. The memory system of claim 12, wherein the hardware accelerator circuit is further configured to provide the fourth amount of third filtered data as a search result to a host device.

17. The memory system of claim 12, further comprising a data processor circuit configured to receive the fourth amount of third filtered data, further process the received third filtered data, and provide the further processed data as a search result to a host device.

18. The memory system of claim 12, wherein the first data rate is greater than or equal to 5 GB/s.

19. A hardware accelerator circuit for a near storage compute system comprising:
a column filter circuit configured to receive an input byte stream from a non-volatile storage device, the input byte stream comprising a first amount of input data comprising input columns of input content, select only input content from desired input columns, and provide the selected input content as a second amount of first filtered columns of first filtered content;
a row filter circuit configured to receive the second amount of first filtered columns of first filtered content from the column filter circuit, search a specified first filtered column to identify any first filtered content that matches a specified first match value, and for each identified match select first filtered content from first filtered columns associated with the specified first filtered column, and provide the selected first filtered content as a third amount of second filtered columns of second filtered content; and
a data filter circuit configured to receive the third amount of second filtered columns of second filtered content from the row filter circuit, search a specified second filtered column to identify any second filtered content that matches a specified second match value, and for each identified match select second filtered content from second filtered columns associated with the specified second filtered column, and provide the selected second filtered content as a fourth amount of third filtered columns of third filtered content,
wherein the column filter circuit operates at a first data rate, the row filter circuit operates at a second data rate less than the first data rate, and the data filter circuit operates at a third data rate less than the second data rate.

* * * * *